(12) United States Patent
Yamamoto et al.

(10) Patent No.: US 9,912,959 B2
(45) Date of Patent: Mar. 6, 2018

(54) IMAGE DECODING DEVICE AND IMAGE CODING DEVICE

(71) Applicant: Sharp Kabushiki Kaisha, Osaka-shi, Osaka (JP)

(72) Inventors: Tomoyuki Yamamoto, Osaka (JP); Tomohiro Ikai, Osaka (JP); Takeshi Tsukuba, Osaka (JP); Yukinobu Yasugi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 205 days.

(21) Appl. No.: 14/781,336

(22) PCT Filed: Mar. 26, 2014

(86) PCT No.: PCT/JP2014/058610
§ 371 (c)(1),
(2) Date: Sep. 30, 2015

(87) PCT Pub. No.: WO2014/162954
PCT Pub. Date: Oct. 9, 2014

(65) Prior Publication Data
US 2016/0057439 A1    Feb. 25, 2016

(30) Foreign Application Priority Data

Apr. 4, 2013    (JP) ................................ 2013-078430

(51) Int. Cl.
| | | |
|---|---|---|
| H04N 19/44 | (2014.01) | |
| H04N 19/51 | (2014.01) | |
| H04N 19/30 | (2014.01) | |
| H04N 19/426 | (2014.01) | |
| H04N 19/172 | (2014.01) | |
| H04N 19/187 | (2014.01) | |

(Continued)

(52) U.S. Cl.
CPC .......... *H04N 19/44* (2014.11); *H04N 19/172* (2014.11); *H04N 19/187* (2014.11); *H04N 19/30* (2014.11); *H04N 19/33* (2014.11); *H04N 19/426* (2014.11); *H04N 19/51* (2014.11); *H04N 19/70* (2014.11)

(58) Field of Classification Search
CPC ............................. H04N 19/44; H04N 19/172
See application file for complete search history.

(56) References Cited

U.S. PATENT DOCUMENTS

2011/0286526 A1* 11/2011 Nakagami ............ H04N 19/593
375/240.16

FOREIGN PATENT DOCUMENTS

WO    2010/095556 A1    8/2010

OTHER PUBLICATIONS

Yamamoto et al. "Description of scalable video coding technology proposal by Sharp (proposal 2)", Joint Collaboration Team on Video Coding (JCT-VC) of ITU-T SG16 WP3 and ISO/IEC JTC1/SC29/WG11 11th Meeting: Shanghai, CN, Oct. 10-19, 2012, [JCTVC-K0032r1], cols. 1, 7.*

(Continued)

*Primary Examiner* — Anand S Rao
*Assistant Examiner* — Tyler Edwards
(74) *Attorney, Agent, or Firm* — Keating & Bennett, LLP

(57) ABSTRACT

A hierarchical moving image decoding device (1) includes an inter-layer reference image list setting section (155) that derives an inter-layer reference image list and an inter-layer reference image set used in pictures on a specific target layer based on a parameter set of a target layer.

2 Claims, 30 Drawing Sheets

(51) Int. Cl.
*H04N 19/70* (2014.01)
*H04N 19/33* (2014.01)

(56) References Cited

OTHER PUBLICATIONS

Official Communication issued in International Patent Application No. PCT/JP2014/058610, dated Jun. 17, 2014.

Chen et al., "SHVC Test Model 1 (SHM 1)", Joint Collaborative Team on Video Coding (JCT-VC) of ITU-T SG16 WP3 and ISO/IEC JTC1/SC29/WG11, JCTVC-L1007, Jan. 14-23, 2013, 42 pages.

Chen et al., "SHVC Test Model 1 (SHM 1)", Joint Collaborative Team on Video Coding (JCT-VC) of ITU-T SG16 WP3 and ISO/IEC JTC1/SC29/WG11, JCTVC-L1007_v3, Jan. 14-23, 2013, 42 pages.

Bross et al., "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG11, JCTVC-L1003_v24, 12th Meeting, Jan. 14-23, 2013, 326 pages.

\* cited by examiner

FIG. 11

| seq_parameter_set_rbsp() { | Descriptor |
|---|---|
| ... | |
| log2_max_pic_order_cnt_lsb_minus4 | ue(v) |
| ... | |
| restricted_ref_pic_lists_flag | u(1) |
| if(restricted_ref_pic_lists_flag) | |
|   lists_modification_present_flag | u(1) |
| ... | |
| num_short_term_ref_pic_sets | ue(v) |
| for(i = 0;i < num_short_term_ref_pic_sets;i++) | |
|   short_term_ref_pic_set(i) | |
| long_term_ref_pics_present_flag | u(1) |
| if(long_term_ref_pics_present_flag){ | |
|   num_long_term_ref_pics_sps | ue(v) |
|   for(i = 0;i < num_long_term_ref_pics_sps;i++){ | |
|     lt_ref_pic_poc_lsb_sps[i] | u(v) |
|     used_by_curr_pic_lt_sps_flag[i] | u(1) |
|   } | |
| } | |
| ... | |
| } | |

(A) SPS SHORT-TERM RPS INFORMATION
(B) SPS LONG-TERM RP INFORMATION
(C) SPS LIST CORRECTION INFORMATION

FIG. 12

| short_term_ref_pic_set(idx) { | Descriptor |
|---|---|
| num_negative_pics | ue(v) |
| num_positive_pics | ue(v) |
| for(i = 0;i < num_negative_pics;i++){ | |
| delta_poc_s0_minus1[i] | ue(v) |
| used_by_curr_pic_s0_flag[i] | u(l) |
| } | |
| for(i = 0;i < num_positive_pics;i++){ | |
| delta_poc_s1_minus1[i] | ue(v) |
| used_by_curr_pic_s1_flag[i] | u(l) |
| } | |
| } | |

FIG. 13

| slice_header() { | Descriptor |
|---|---|
| ... | |
|   if(!dependent_slice_flag){ | |
|   ... | |
|     if(!IdrPicFlag){ | |
|       pic_order_cnt_lsb | u(v) |
|       short_term_ref_pic_set_sps_flag | u(1) |
|       if(!short_term_ref_pic_set_sps_flag) | |
|         short_term_ref_pic_set(num_short_term_ref_pic_sets) | |
|       else | |
|         short_term_ref_pic_set_idx | u(v) |
|       if(long_term_ref_pics_present_flag){ | |
|         if(num_long_term_ref_pics_sps > 0) | |
|           num_long_term_sps | ue(v) |
|         num_long_term_pics | ue(v) |
|         for(i = 0;i < num_long_term_sps + num_long_term_pics;i++){ | |
|           if(i < num_long_term_sps) | |
|             lt_idx_sps[i] | u(v) |
|           else { | |
|             poc_lsb_lt[i] | u(v) |
|             used_by_curr_pic_lt_flag[i] | u(1) |
|           } | |
|           delta_poc_msb_present_flag[i] | u(1) |
|           if(delta_poc_msb_present_flag[i]) | |
|             delta_poc_msb_cycle_lt[i] | ue(v) |
|         } | |
|       } | |
|     } | |
|   ... | |
| } | |

(A) SH SHORT-TERM RPS INFORMATION
(B) SH LONG-TERM RP INFORMATION

FIG. 14

| slice_header() { | Descriptor |
|---|---|
| ... | |
|   if(!dependent_slice_flag){ | |
|     ... | |
|     if(slice_type == P \|\| slice_type == B){ | |
|       ... | |
|       num_ref_idx_active_override_flag | u(l) |
|       if(num_ref_idx_active_override_flag){ | |
|         num_ref_idx_l0_active_minus1 | ue(v) |
|         if(slice_type == B) | |
|           num_ref_idx_l1_active_minus1 | ue(v) |
|       } | |
|       if(lists_modification_present_flag) | |
|         ref_pic_list_modification() | |
|     } | |
|   } | |
| ... | |
| } | |

Rows from num_ref_idx_active_override_flag through ref_pic_list_modification() are grouped as (C).

(C) SH LIST CORRECTION INFORMATION

FIG. 15

| ref_pic_list_modification() { | Descriptor |
|---|---|
| ref_pic_list_modification_flag_l0 | u(1) |
| if(ref_pic_list_modification_flag_l0 <br> && NumPocTotalCurr > 2) | |
| for(i = 0;i <= num_ref_idx_l0_active_minus1;i++) | |
| list_entry_l0[i] | u(v) |
| if(slice_type == B){ | |
| ref_pic_list_modification_flag_l1 | u(1) |
| if(ref_pic_list_modification_flag_l1 <br> && NumPocTotalCurr > 2) | |
| for(i = 0;i <= num_ref_idx_l1_active_minus1;i++) | |
| list_entry_l1[i] | u(v) |
| } | |
| } | |

FIG. 16

| seq_parameter_set_rbsp() { | Descriptor |
|---|---|
| ... | |
| sps_infter_inter_layer_rps_flag | u(l) |
| if(!sps_infer_inter_layer_rps_flag) | |
| { | |
| num_inter_layer_ref_pic_sets | ue(v) |
| for(i = 0;i < num_inter_layer_ref_pic_sets;i++) | |
| inter_layer_ref_pic_set(i) | |
| } | |
| ... | |
| } | |

FIG. 17

| inter_layer_ref_pic_set(idx){ | Descriptor |
|---|---|
| num_negative_il_pics | ue(v) |
| num_positive_il_pics | ue(v) |
| for(i = 0;i < num_il_negative_pics;i++){ | |
| delta_poc_il_s0_minus1[i] | ue(v) |
| used_by_curr_pic_il_s0_flag[i] | u(l) |
| } | |
| for(i = 0;i < num_positive_pics;i++){ | |
| delta_poc_il_s1_minus1[i] | ue(v) |
| used_by_curr_pic_il_s1_flag[i] | u(l) |
| } | |
| il_col_pic_in_rps_flag | u(l) |
| if(il_col_pic_in_rps_flag) | |
| used_by_curr_pic_il_col_flag | u(l) |
| } | |

(A) spans from num_negative_il_pics through the second closing brace.
(B) spans from il_col_pic_in_rps_flag through used_by_curr_pic_il_col_flag.

FIG. 18

| slice_header() { | Descriptor |
|---|---|
| ... | |
| if(!sps_infer_inter_layer_rps_flag){ | |
|   il_ref_pic_set_sps_flag | u(l) |
|   if(!il_ref_pic_set_sps_flag) | |
|     inter_layer_ref_pic_set(num_inter_layer_ref_pic_sets) | |
|   else | |
|     il_ref_pic_set_idx | u(v) |
| } | |
| ... | |
| } | |

FIG. 19

| slice_header() { | Descriptor |
|---|---|
| ... | |
|   if(!sps_infer_inter_layer_rps_flag){ | |
|     for(i = 0;i < num_negative_pics;i++){ | |
|       pic_s0_in_il_rps_flag[i] | u(1) |
|       if(pic_s0_in_il_rps_flag[i]) | |
|         used_by_curr_pic_il_s0_flag[i] | u(1) |
|     } | |
|     for(i = 0;i < num_positive_pics;i++){ | u(v) |
|       pic_s1_in_il_rps_flag[i] | |
|       if(pic_s0_in_il_rps_flag[i]) | |
|         used_by_curr_pic_il_s1_flag[i] | u(1) |
|     } | |
|   } | |
| ... | |
| } | |

FIG. 20

| slice_header() { | Descriptor |
|---|---|
| ... | |
| num_il_ref_idx_active_override_flag | u(l) |
| if(num_il_ref_idx_active_override_flag) | |
| num_il_ref_idx_active_minus1 | ue(v) |
| if(lists_modification_present_flag) | |
| il_ref_pic_list_modification() | |
| ... | |
| } | |

FIG. 21

| ref_pic_list_modification() { | Descriptor |
|---|---|
| il_ref_pic_list_modification_flag | u(l) |
| if(il_ref_pic_list_modification_flag) | |
| for(i = 0;i <= num_il_ref_idx_active_minus1;i++) | |
| list_entry_il[i] | u(v) |
| } | |
| } | |

FIG. 25

| seq_parameter_set_rbsp() { | Descriptor |
|---|---|
| ... | |
| sps_extension_flag | u(1) |
| if(sps_extension_flag){ | |
| ... | |
| no_base_sps_flag | u(1) |
| if(no_base_sps_flag){ | |
| base_recon_luma_width | u(v) |
| base_recon_luma_height | u(v) |
| base_delta_bitdepth | u(v) |
| base_color_format_idc | u(v) |
| log2_base_framerate_factor_idc | u(v) |
| base_frame_flag | u(1) |
| base_codec_idc | u(v) |
| if(base_codec_idc = AVC_CODEC){ | |
| avc_profile_level_info() | |
| } | |
| } | |
| ... | |
| } | |
| ... | |
| } | |

IMAGE DECODING DEVICE AND IMAGE CODING DEVICE

TECHNICAL FIELD

The present invention relates to an image decoding device decoding hierarchically coded data obtained by hierarchically coding an image and an image coding device generating hierarchically coded data by hierarchically coding an image.

BACKGROUND ART

As one piece of information transmitted with a communication system or information recorded in an accumulation device, there is an image or a moving image. In the related art, technologies for coding images are known to transmit and accumulate such images (hereafter including moving images).

As a moving image coding scheme, AVC (H.264/MPEG-4 Advanced Video Coding) and High-Efficiency Video Coding (HEVC), which is a succession codec, are known (NPL 1).

In such a moving image coding scheme, normally, a predicted image is generated based on a local decoded image obtained by coding/decoding an input image, and a predicted residual (also referred to as a "difference image" or a "residual image" in some cases) obtained by subtracting the predicted image from an input image (original image) is coded. An inter-screen prediction (inter-prediction) and in-screen prediction (intra-prediction) are exemplified as a method of generating a predicted image.

In intra-prediction, predicted images are sequentially generated in a picture based on a local decoded image in the same picture.

In inter-prediction, a predicted image is generated through inter-picture motion compensation. In most cases, information regarding motion compensation (motion compensation parameter) is not directly coded to reduce a coding amount. Accordingly, in inter-prediction, the motion compensation parameter based on a decoding situation or the like in the periphery of a target block is estimated.

In recent years, hierarchy coding technologies for hierarchically encoding images according to necessary data rates have been proposed. As one of the representative hierarchical coding schemes, Scalable HEVC (SHVC) is known (NPL 2).

In SHVC, spatial scalability, temporal scalability, and SNR scalability are supported. For example, in the case of the spatial scalability, an image subjected to down-sampling to a desired resolution from an original image is coded as a lower layer. Next, in a higher layer, inter-layer prediction is performed in order to remove inter-layer redundancy.

As inter-layer prediction, there is inter-layer motion information prediction in which information regarding motion prediction is predicted from information regarding of a lower layer of the same time and inter-layer image prediction (inter-layer texture prediction) in which a predicted image is generated from a decoded image of a lower layer of the same time.

In SHVC, any one of inter-prediction, intra-prediction, and the inter-layer image prediction can be used to generate a predicted image.

In inter-layer image prediction of SHVC, a decoding target picture and a decoded image of the lower layer of the same time are used. Therefore, the decoded image of the lower layer is retained in a buffer for reference.

CITATION LIST

Non Patent Literature

NPL 1: JCTVC-L1003_v24 "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG 11 12th Meeting: Geneva, CH, 14 to 23 Jan. 2013 (disclosed on 25 Feb. 2013)

NPL 2: JCTVC-L1007_v1 "SHVC Test Model 1 (SHM1)", Joint Collaborative Team on Video Coding (JCT-VC) of ITU-T SG 16 WP 3 and ISO/IEC JTC 1/SC 29/WG 11 12th Meeting: Geneva, CH, 14 to 23 Jan. 2013 (disclosed on 15 Feb. 2013)

SUMMARY OF INVENTION

Technical Problem

However, in SHVC exemplified as a technology of the related art, a decoded image of a lower layer available in the inter-layer image prediction is restricted to a decoded image of the same time as a decoding target picture. For this reason, in the inter-layer image prediction or a prediction image generation process referring to the decoded image of the lower layer, there is a problem that a mechanism referring to a decoded image of a lower layer in which a display time is different from that of a decoding target picture is not clearly described. By generating a predicted image with reference to the decoded image of the lower layer in which the display time is different from that of the decoding target picture, a predicted image closer to an input image can be generated compared to a case in which a predicted image is generated by referring to only a decoded image of a lower layer in which a display time is the same as that of a decoding target picture. However, in the technology of the related art, the decoded image of the lower layer in which the display time is different cannot be referred to.

The present invention is devised in view of the foregoing problems and an object of the present invention is to provide a structure for generating a predicted image by using a decoded image of a lower layer in which a display time is different from that of a decoding target picture in a hierarchical coding scheme. Accordingly, there has been realized an image coding device and an image decoding device which code/decode coded data for which a coding amount is small by generating a predicted image closer to an input image compared to the technology of the related art.

Solution to Problem

An image decoding device that restores a decoded image of a higher layer using coded data of the higher layer included in coded data that is hierarchically coded, the image decoding device including: variable-length decoding means for decoding a parameter set from the coded data of the higher layer; a base decoded image buffer that records a decoded image of a lower layer in association with a picture display order of the higher layer derived from the parameter set; base control means for reading an image decoded by external means as a base decoded sequence and recording the image in the base decoded image buffer; and an inter-layer image prediction section that selects a base reference image from base decoded images included in the base decoded sequence and generates a predicted image through inter-layer prediction using the base reference image.

An image coding device that generates coded data of a higher layer from an input image, the image coding device including: variable-length coding means for coding a parameter set included in the coded data of the higher layer; a base decoded image buffer that records a decoded image of a lower layer in association with a picture display order of the higher layer derived from the parameter set; base control means for reading images decoded by external means as a base decoded sequence and recording the images in the base decoded image buffer; and an inter-layer image prediction section that selects a base reference image from base decoded images included in the base decoded sequence and generates a predicted image through inter-layer prediction using the base reference image.

An image decoding device that restores a decoded image of a higher layer by decoding coded data of the higher layer included in coded data that is hierarchically coded, the image decoding device including: a base reference image buffer that records a decoded image of a lower layer; inter-layer reference image list setting means for setting an inter-layer reference image set used to decode pictures of the higher layer; and predicted image generation means for generating a predicted image of the picture of the higher layer using a base reference image included in the inter-layer reference image set and recorded in the base reference image buffer.

Advantageous Effects of Invention

The image decoding device according to the present invention includes the inter-layer reference image list setting section that derives the inter-layer reference image set. Accordingly, the image decoding device according to the present invention can use the inter-layer reference image set to reproduce the decoded image of the target picture from the coded data coded with a small coding amount by using the predicted image generated by the use of the decoded image of the reference layer of which the display order is different from the decoding target picture. By using the inter-layer reference image set, it is possible to specify a timing so that the decoded image of the reference layer is not used to generate the predicted image of the target layer and to erase the base decoded image from the base decoded image buffer. Therefore, it is possible to reduce the memory amount.

The image coding device according to the present invention includes the inter-layer reference image list setting section that derives the inter-layer reference image set. Accordingly, the image coding device according to the present invention can use the inter-layer reference image set to generate the coded data having the smaller coding amount by using the predicted image generated by the use of the decoded image of the reference layer of which the display order is different from the decoding target picture. By using the inter-layer reference image set, it is possible to specify a timing so that the decoded image of the reference layer is not used to generate the predicted image of the target layer and to erase the base decoded image from the base decoded image buffer. Therefore, it is possible to reduce the memory amount.

BRIEF DESCRIPTION OF DRAWINGS

FIG. 2(a) illustrates the side of a hierarchical moving image coding device, and FIG. 2(b) illustrates the side of the hierarchical moving image decoding device.

FIG. 3(a) illustrates a sequence layer defining a sequence SEQ, FIG. 3(b) illustrates a picture layer defining a picture PICT, FIG. 3(c) illustrates a slice layer defining a slice S, FIG. 3(d) illustrates a CTU layer defining a coding tree unit CTU, and FIG. 3(e) illustrates a CU layer defining a coding unit (CU) included in the coding tree unit CTU.

FIG. 6(a) is a diagram illustrating pictures included in a moving image and arranged in a display order, FIG. 6(b) is a diagram illustrating an example of RPS information applied to a target picture, FIG. 6(c) is a diagram illustrating an example of current RPS information derived when the RPS information exemplified in FIG. 6(b) is applied when the POC of the target picture is 0, and FIGS. 6(d) and 6(e) are diagrams illustrating an example of reference picture lists generated from a reference picture included in the current RPS.

FIG. 7(a) is a diagram illustrating the state of an L0 reference image list before correction, FIG. 7(b) is a diagram illustrating content of correction information of the reference image list, and FIG. 7(c) is a diagram illustrating the state of the L0 reference image list after correction.

FIG. 8(a) is a diagram illustrating an example of inter-layer image prediction in which base decoded images with the same display order are used, and FIG. 8(b) is a diagram illustrating an example of inter-layer image prediction in which base decoded images with different display orders are used.

FIG. 11 is a diagram illustrating a portion which is a part of a syntax table used at the time of the decoding of an SPS by a variable-length decoding section of the hierarchical moving image decoding device and which is related to the reference image set and the reference image list.

FIG. 12 is a diagram illustrating a syntax table used at the time of the decoding of short-term reference image set information by the variable-length decoding section of the hierarchical moving image decoding device.

FIG. 13 is a diagram illustrating a portion which is a part of a syntax table used at the time of the decoding of a slice header by the variable-length decoding section of the hierarchical moving image decoding device and which is related to the reference image set.

FIG. 14 is a diagram illustrating a portion which is a part of a syntax table used at the time of the decoding of the slice header by the variable-length decoding section of the hierarchical moving image decoding device and which is related to the reference image list.

FIG. 15 is a diagram illustrating a syntax table used at the time of the decoding of reference image list correction information by the variable-length decoding section of the hierarchical moving image decoding device.

FIG. 16 is a diagram illustrating a portion which is a part of a syntax table used at the time of the decoding of the SPS by the variable-length decoding section of the hierarchical moving image decoding device and which is related to the inter-layer reference image list.

FIG. 17 is a diagram illustrating a syntax table used at the time of the decoding of inter-layer reference image set information by the variable-length decoding section of the hierarchical moving image decoding device.

FIG. 18 is a diagram illustrating a portion which is a part of a syntax table used at the time of the decoding of a slice header by the variable-length decoding section of the hierarchical moving image decoding device and which is related to the inter-layer reference image set.

FIG. 19 is a diagram illustrating another example of the portion which is the part of a syntax table used at the time of the decoding of the slice header by the variable-length decoding section of the hierarchical moving image decoding device and which is related to the inter-layer reference image set.

FIG. 20 is a diagram illustrating a portion which is a part of a syntax table used at the time of the decoding of the slice header by the variable-length decoding section of the hierarchical moving image decoding device and which is related to the inter-layer reference image list.

FIG. 21 is a diagram illustrating a syntax table used at the time of the decoding of inter-layer reference image list correction information by the variable-length decoding section of the hierarchical moving image decoding device.

FIG. 25 is a diagram illustrating a portion which is a part of a syntax table used at the time of the decoding of SPS by a variable-length decoding section of the hierarchical moving image decoding device and which is related to base control information.

DESCRIPTION OF EMBODIMENTS

A hierarchical moving image decoding device 1 and a hierarchical moving image coding device 2 according to an embodiment will be described below with reference to FIGS. 1 to 23.

[Overview]

A hierarchical moving image decoding device (image decoding device) 1 according to the embodiment decodes coded data subjected to hierarchical coding by a hierarchical moving image coding device (image coding device) 2. Hierarchical coding refers to a coding scheme of hierarchically coding a moving image with low quality to a moving image having high quality. Hierarchical coding is standardized in, for example, SVC or SHVC. The quality of a moving image mentioned herein broadly means an element that influences on a moving image volume subjectively and objectively. The quality of a moving image includes, for example, a "resolution", a "frame rate", "image quality", and "pixel expression precision". Accordingly, differences in the quality of a moving image refers to difference in, for example, "resolution" and the like, but the present invention is not limited thereto. For example, even in the case of moving images quantized in different quantization steps (that is, the case of moving images coded with different coding noise), the quality of a moving images can be said to be mutually different.

From the viewpoint of kinds of hierarchized information, hierarchy coding technologies are also classified into (1) spatial scalability, (2) temporal scalability and (3) signal-to-noise ratio (SNR) scalability in some cases. Spatial scalability refers to a technology for performing hierarchization in regard to the resolution or the size of an image. Temporal scalability refers to a technology for performing hierarchization in regard to a frame rate (the number of frames per unit time). SNR scalability refers to a technology for performing hierarchization in regard to coding noise.

Before the hierarchical moving image coding device 2 and the hierarchical moving image decoding device 1 according to the embodiment are described in detail, (1) a layer structure of hierarchically coded data generated by the hierarchical moving image coding device 2 and decoded by the hierarchical moving image decoding device 1 will be described first, and (2) a specific example of a data structure adopted in each layer will be described subsequently.

[Layer Structure of Hierarchically Coded Data]

Figure 2:
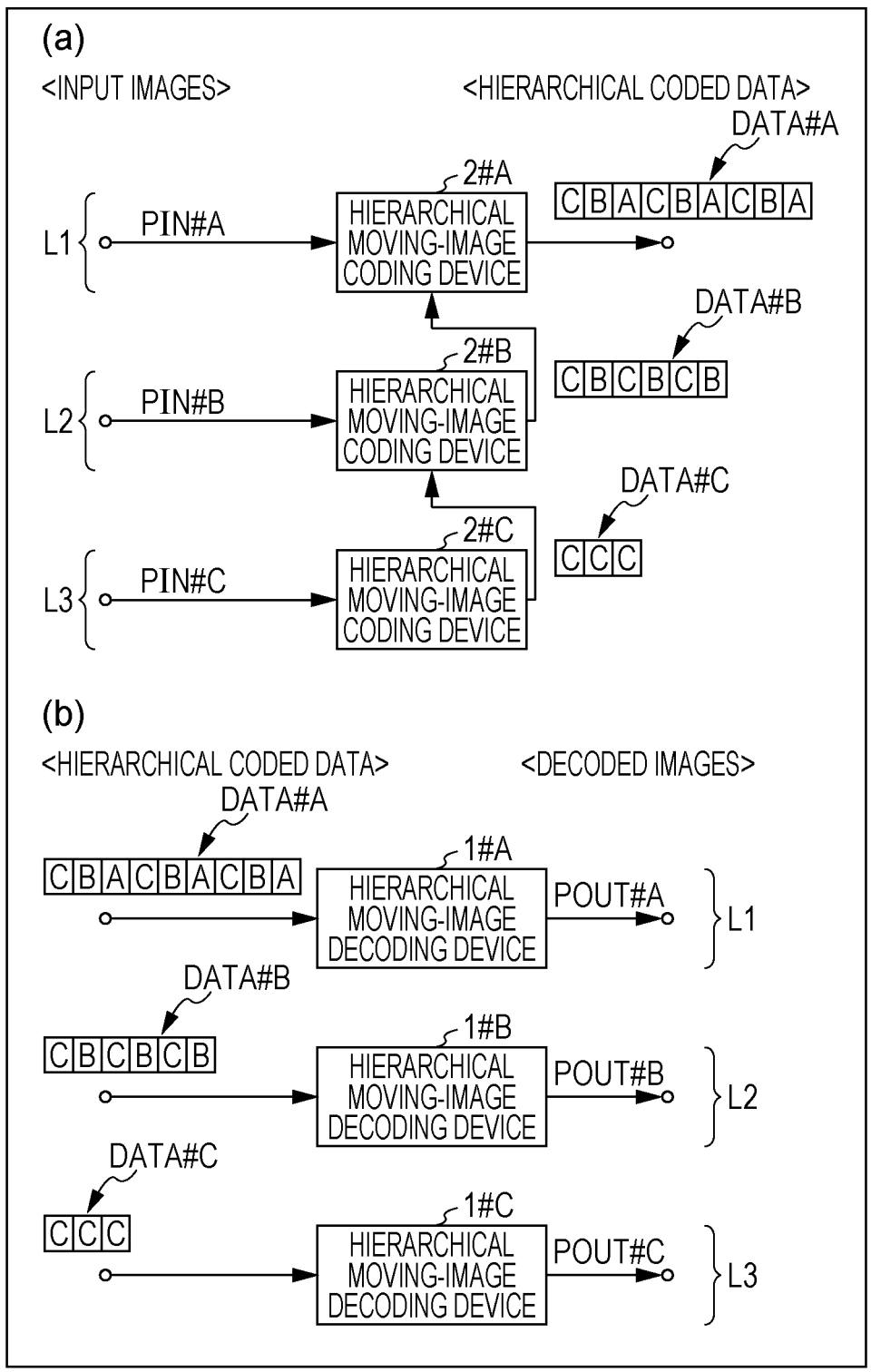
FIG. 2 is a diagram for describing the layer structure of hierarchically coded data according to the embodiment.

Here, coding and decoding of hierarchically coded data will be described below with reference to FIG. 2. FIG. 2 is a diagram schematically illustrating a case in which a moving image is hierarchically coded/decoded in three layers, a lower layer L3, an intermediate layer L2, and a higher layer L1. That is, in examples illustrated in (a) and FIG. 2(b), the higher layer L1 is the highest layer and the lower layer L3 is the lowest layer among the three layers.

Hereinafter, a decoded image corresponding to specific quality which can be decoded from hierarchically coded data is referred to as a decoded image of a specific layer (or a coded image corresponding to a specific layer) (for example, a decoded image POUT#A of the higher layer L1).

FIG. 2(a) illustrates hierarchical moving image coding devices 2#A to 2#C that hierarchically code input images PIN#A to PIN#C to generate pieces of coded data DATA#A to DATA#C, respectively. FIG. 2(b) illustrates hierarchical moving image decoding devices 1#A to 1#C that decode the pieces of coded data DATA#A to DATA#C hierarchically coded to generate decoded images POUT#A to POUT#C, respectively.

First, the coding device side will be described with reference to FIG. 2(a). The input images PIN#A, PIN#B, PIN#C input to the coding device side are the same as original images, but have different qualities (resolution, a frame rate, image quality, and the like) from the original images. The quality of the images decreases in the order of the input images PIN#A, PIN#B, and PIN#C.

The hierarchical moving image coding device 2#C of the lower layer L3 codes the input image PIN#C of the lower layer L3 to generate the coded data DATA#C of the lower layer L3. The coded data DATA#C includes basic information necessary to decode the decoded image POUT#C of the lower layer L3 (which is indicated by "C" in FIG. 2). Since the lower layer L3 is the lowest layer, the coded data DATA#C of the lower layer L3 is referred to as basic coded data.

The hierarchical moving image coding device 2#B of the intermediate layer L2 codes the input image PIN#B of the intermediate layer L2 with reference to the coded data DATA#C of the lower layer to generate the coded data DATA#B of the intermediate layer L2. The coded data DATA#B of the intermediate layer L2 includes not only basic information "C" included in the coded data DATA#C but also additional information (which is indicated by "B" in FIG. 2) necessary to decode the decoded image POUT#B of the intermediate layer.

The hierarchical moving image coding device 2#A of the higher layer L1 codes the input image PIN#A of the higher layer L1 with reference to the coded data DATA#B of the intermediate layer L2 to generate the coded data DATA#A of the higher layer L1. The coded data DATA#A of the higher layer L1 includes not only the basic information "C" necessary to decode the decoded image POUT#C of the lower layer L3 and the additional information "B" necessary to decode the decoded image POUT#B of the intermediate layer L2 but also additional information (which is indicated by "A" in FIG. 2) necessary to decode the decoded image POUT#A of the higher layer.

Thus, the coded data DATA#A of the higher layer L1 includes information regarding the decoded images having a plurality of different qualities.

Next, the decoding device side will be described with reference to FIG. 2(b). On the decoding device side, the decoding devices 1#A, 1#B, and 1#C according to the layers, the higher layer L1, the intermediate layer L2, and the lower layer L3, decode the coded data DATA#A, DATA#B, and DATA#C and output the decoded images POUT#A, POUT#B, and POUT#C, respectively.

Further, a moving image having specific quality can also be reproduced by extracting information regarding a part of upper hierarchically coded data and decoding the extracted information in a specific lower decoding device.

For example, the hierarchical decoding device 1#B of the intermediate layer L2 may extract information (that is, "B" and "C" included in the hierarchically coded data DATA#A) necessary to decode the decoded image POUT#B from the hierarchically coded data DATA#A of the higher layer L1 and decode the decoded image POUT#B. In other words, on the decoding device side, the decoded images POUT#A, POUT#B, and POUT#C can be decoded based on the information included in the hierarchically coded data DATA#A of the higher layer L1.

The present invention is not limited to the foregoing hierarchically coded data of the three layers. The hierarchically coded data may be coded hierarchically in two layers or may be coded hierarchically in a number of layers greater than three layers.

Some or all of the pieces of coded data regarding the decoded image of a specific layer may be coded independently from the other layers, and the hierarchically coded data may be configured so that the information of the other layers is not referred to at the time of the decoding of the specific layer. For example, in the example described above with reference to FIGS. 2(a) and 2(b), it has been described that "C" and "B" are referred to in the decoding of the decoded image POUT#B, but the present invention is not limited thereto. The hierarchically coded data may be configured such that the decoded image POUT#B can be decoded using only "B". For example, a hierarchical moving image decoding device can be configured such that the hierarchical coded data formed from "B" and the decoded image POUT#C are used as inputs to decode the decoded image POUT#B.

When the SNR scalability is realized, the hierarchically coded data can be generated so that the same original image is used as the input images PIN#A, PIN#B, and PIN#C, and subsequently the decoded images POUT#A, POUT#B, and POUT#C have different image qualities. In this case, the hierarchical moving image coding device of the lower layer generates the hierarchically coded data by quantizing a prediction residual by using a larger quantization width than in the hierarchical moving image coding device of the higher layer.

In the present specification, the following terms will be defined to facilitate the description. The following terms are used to describe the following technical factors unless otherwise mentioned.

Higher layer: A layer located to be higher than a certain layer is referred to as a higher layer. For example, higher layers of the lower layer L3 in FIG. 2 are the intermediate layer L2 and the higher layer L1. A decoded image of a higher layer refers to a decoded image having higher quality (for example, higher resolution, a higher frame rate, or higher image quality).

Lower layer: A layer located lower than a certain layer is referred to as a lower layer. For example, lower layers of the higher layer L1 in FIG. 2 are the intermediate layer L2 and the lower layer L3. A decoded image of a lower layer refers to a decoded image having lower quality.

Target layer: A target layer refers to a layer which is a decoding or coding target.

Reference layer: A specific lower layer referred to in decoding of a decoded image corresponding to the target layer is referred to as a reference layer.

In the example illustrated in FIGS. 2(a) and (b), reference layers of the higher layer L1 are the intermediate layer L2 and the lower layer L3. However, the present invention is not limited thereto, and the hierarchically coded data can also be configured such that none of the lower layers are referred to in the decoding of the specific layer. For example, the hierarchically coded data can also be configured so that the reference layer of the higher layer L1 is one of the intermediate layer L2 and the lower layer L3.

Base layer: A layer located lowest is referred to as a base layer. A decoded image of the base layer is a decoded image having the lowest quality which can be decoded from the coded data and is referred to as a base decoded image. In other words, the base decoded image is a decoded image corresponding to the lowest layer. Partially coded data of the hierarchically coded data necessary to decode the base decoded image is referred to as base coded data. For example, the basic information "C" included in the hierarchically coded data DATA#A of the higher layer L1 is the base coded data.

Enhancement layer: A layer higher than the base layer is referred to as an enhancement layer.

Layer identifier: A layer identifier is used to identify a layer and has a one-to-one correspondence relation with a layer. The hierarchically coded data includes a hierarchical identifier used to select the partially coded data necessary to decode the decoded image of a specific layer. A subset of the hierarchically coded data associated with the layer identifier corresponding to a specific layer is referred to as a layer notation.

In general, in the decoding of the decoded image of a specific layer, the layer notation of the specific layer and/or the layer notation corresponding to a lower layer of the specific layer can be used. That is, in the decoding of the decoded image of a target layer, the layer notation of the target layer and/or the layer notation of one or more layers included in the lower layer of the target layer can be used.

Inter-layer prediction: Inter-layer prediction is prediction in which syntax element values of the target layer, coding parameters used to decode the target layer, or the like are predicted based on syntax element values included in the layer notation of a layer (reference layer) that are different from the layer notation of the target layer, values derived from the syntax element values, and the decoded image. Inter-layer prediction in which information regarding motion prediction is predicted from information regarding the reference layer is also referred to as motion information prediction in some cases. Inter-layer prediction in which prediction is performed from the decoded image of the lower layer is referred to as inter-layer image prediction (or inter-layer texture prediction) in some cases. A layer used for the inter-layer prediction is, for example, a lower layer of the target layer. Prediction performed in the target layer without using the reference layer is also referred to as intra-layer prediction in some cases.

The foregoing terms are terms merely used to facilitate the description, and the foregoing technical factors may be expressed by other terms.

[Data Structure of Hierarchically Coded Data]

Hereinafter, a case will be exemplified in which HEVC and an expansion scheme of HEVC are used as coding schemes for generating coded data of each layer. However, the present invention is not limited thereto, but the coded data of each layer may be generated in conformity to a coding scheme such as MPEG-2 or H.264/AVC.

The lower layer and the higher layer may be coded according to different coding schemes. The coded data of each layer may be supplied to the hierarchical moving image decoding device 1 via mutually different transmission paths or may be supplied to the hierarchical moving image decoding device 1 via the same transmission path.

For example, when an ultra-high resolution image (a moving image or 4K video data) is subjected to scalable coding in the base layer and one enhancement layer and transmitted, video data obtained by performing downscaling and interlacing on the 4K video data may be coded in conformity to MPEG-2 or H.264/AVC and transmitted in the base layer via a television broadcast network, and a 4K video (progressive) may be coded in conformity to HEVC and transmitted in the enhancement layer via the Internet.

(Base Layer)

Figure 3:
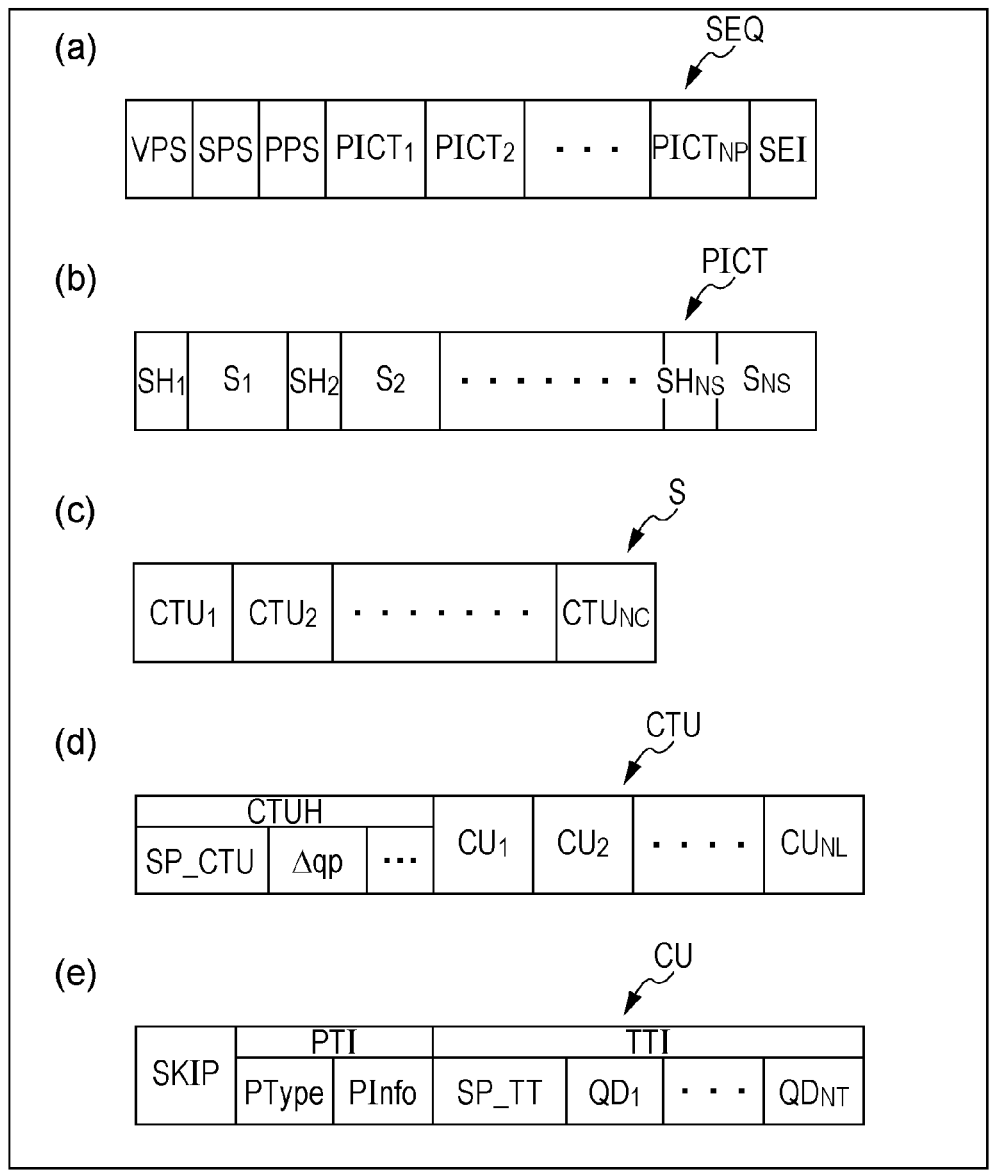
FIG. 3 is a diagram for describing the structure of the hierarchically coded data according to the embodiment of the present invention.

FIG. 3 is a diagram exemplifying the data structure of the coded data (the hierarchically coded data DATA#C in the example of FIG. 2) which can be adopted in the base layer. The hierarchically coded data DATA#C includes, for example, a sequence and a plurality of pictures included in the sequence.

The hierarchical structure of the data in the hierarchically coded data DATA#C is illustrated in FIG. 3. FIGS. 3(a) to 3(e) are diagrams illustrating a sequence layer defining a sequence SEQ, a picture layer defining a picture PICT, a slice layer defining a slice S, a CTU layer defining a coding tree unit (CTU), and a coding unit (CU) layer defining a CU included in the coding tree unit CTU, respectively.

(Sequence Layer)

In the sequence layer, a set of data referred to by the hierarchical moving image decoding device 1 is defined to decode a processing target sequence SEQ (hereinafter also referred to as a target sequence). As illustrated in FIG. 3(a), the sequence SEQ includes a video parameter set VPS, a sequence parameter set SPS, a picture parameter set PPS, pictures $PICT_1$ to $PICT_{NP}$ (where NP is a total number of pictures included in the sequence SEQ), and supplemental enhancement information SEI.

In the video parameter set VPS, the number of layers included in the coded data and a dependence relation between the layers are defined.

In the sequence parameter set SPS, a set of coding parameters referred to by the hierarchical moving image decoding device 1 is defined to decode the target sequence of the target layer. The plurality of SPSs may be present in the coded data. In this case, the SPS used for the decoding for each target sequence of the target layer is selected from a plurality of candidates. The SPS used to decode a specific sequence is also referred to as an active SPS. Hereinafter, the SPS means the active SPS for the target sequence of the target layer, unless otherwise mentioned.

In the picture parameter set PPS, a set of coding parameters referred to by the hierarchical moving image decoding device 1 is defined to decode each picture in the target sequence. The plurality of PPSs may be present in the coded data. In this case, one of the plurality of PPSs is selected from the pictures in the target sequence. The PPS used to decode a specific picture is also referred to as an active PPS. Hereinafter, the PPS means the active PPS for the target picture, unless otherwise mentioned.

(Picture Layer)

In the picture layer, a set of data referred to by the hierarchical moving image decoding device 1 is defined to decode the processing target picture PICT (hereafter also referred to as a target picture). As illustrated in FIG. 3(b), the picture PICT includes slice headers $SH_1$ to $SH_{NS}$ and a plurality of slices, that is, slices $S_1$ to $S_{NS}$ (where NS is a total number of slices included in the picture PICT).

When it is not necessary to distinguish the slice headers $SH_1$ to $SH_{NS}$ or the slices $S_1$ to $S_{NS}$ from each other, the slices are described below in some cases by omitting the subscripts of the codes. The same also applies to data which is data included in the hierarchically coded data DATA#C to be described below and is other data to which subscripts are appended.

A slice header $SH_k$ includes a coding parameter group referred to by the hierarchical moving image decoding device 1 to decide a method of decoding a corresponding slice $S_k$. For example, an SPS identifier (seq_parameter_set_id) designating the SPS or a PPS identifier (pic_parameter_set_id) designating the PPS are included. Further, slice type designation information (slice_type) designating the type of slice is an example of the coding parameter included in the slice header SH.

As the types of slices which can be designated by the slice type designation information, for example, (1) an I slice using only intra-prediction at the time of the coding, (2) a P slice using uni-directional prediction or intra-prediction at the time of the coding, and (3) a B slice using uni-directional prediction, bi-directional prediction, or intra-prediction at the time of the coding can be exemplified.

(Slice Layer)

In the slice layer, a set of data referred to by the hierarchical moving image decoding device 1 is defined to decode the processing target slice S (also referred to as a target slice). As illustrated in FIG. 3(c), the slice S includes a sequence of coding tree blocks $CTU_1$ to $CTU_{NC}$ (where NC is a total number of CTUs included in the slice S).

(CTU Layer)

In the CTU layer, a set of data referred to by the hierarchical moving image decoding device 1 is defined to decode the coding tree unit CTU (hereinafter also referred to as a target CTU) of the processing target. Further, the coding tree unit is also referred to as a coding tree block (CTB) or a largest cording unit (LCU) in some cases.

The coding tree unit CTU includes a CTU header CTUH and pieces of coding unit information $CU_1$ to $CU_{NL}$ (where NL is a total number of pieces of coding unit information included in the CTU). Here, a relation between the coding tree unit CTU and the coding unit information CU will be described as follows.

The coding tree unit CTU is split into units for specifying block sizes for the purpose of each process of the intra-prediction or the inter-prediction and transform.

The units of the coding tree unit CTU are split through recursive quadtree splitting. Hereinafter, a tree structure obtained through the recursive quadtree splitting is referred to as a coding tree.

Hereinafter, a unit corresponding to a leaf which is an end node of the coding tree is referred as a coding node. Further, since the coding node is a basic unit of a coding process, the coding node is also referred to as a coding unit (CU).

That is, the coding unit information (hereinafter referred to as CU information) $CU_1$ to $CU_{NL}$ is information corresponding to each coding node (coding unit) obtained by performing the recursive quadtree splitting on the coding tree unit CTU.

A root of a coding tree matches the coding tree unit CTU. In other words, the coding tree unit CTU matches a highest node of a tree structure of quadtree splitting that includes a plurality of coding nodes recursively.

Each coding node has a size of half of the horizontal and vertical sizes of a coding node (that is, a node located in the immediately higher layer of the coding node) serving as a master node of the coding node.

The size of the coding tree unit CTU and the size of each coding unit depend on size designation information of the minimum coding node included in the sequence parameter set SPS and a difference between hierarchy depths of the maximum coding node and the minimum coding node. For example, when the size of the minimum coding node is 8×8 pixels and the difference between the hierarchy depths of the maximum coding node and the minimum coding node is 3, the size of the coding tree unit CTU is 64×64 pixels and the size of the coding node can be one of four sizes, that is, 64×64 pixels, 32×32 pixels, 16×16 pixels, and 8×8 pixels.

(CTU Header)

The CTU header CTUH includes coding parameters referred to by the hierarchical moving image decoding device 1 to decide a method of decoding a target CTU. Specifically, as illustrated in FIG. 3(d), the CTU header CTUH includes a CTU splitting information SP_CTU designating a splitting pattern of the target CTU into each CU, and a quantization parameter difference Δqp (qp_delta) designating the magnitude of a quantization step.

The CTU splitting information SP_CTU is information indicating a coding tree for splitting the CTU and is specifically information designating the shape, and the size of each CU included in the target CTU and the position of each CU in the target CTU.

The CTU splitting information SP_CTU may not explicitly include the shape or the size of the CU. For example, the CTU splitting information SP_CTU may be a set of flags indicating whether the entire target CTU or a partial region of the CTU is subjected to quad-splitting. In this case, the shape and the size of each CU can be specified by using the shape and the size of the CTU together.

The quantization parameter difference Δqp is a difference "qp−qp'" between a quantization parameter qp in the target CTU and a quantization parameter qp' in the CTU coded immediately before the target CTU.

(CU Layer)

In the CU layer, a set of data referred to by the hierarchical moving image decoding device 1 is defined to decode a processing target CU (hereinafter also referred to as a target CU).

Here, a tree structure of data included in the CU will be described before the description of the specific contents of the data included in the CU information CU. A coding node is a node of the roots of a prediction tree (PT) and a transform tree (TT). The prediction tree and the transform tree will be described as follows.

In the prediction tree, the coding node is split into one prediction block or a plurality of prediction blocks, and the position and size of each prediction block are defined. In other words, the prediction block is one region or a plurality of non-overlapping regions included in the coding node. The prediction tree includes one prediction block or a plurality of prediction block obtained through the above-described splitting.

A prediction process is performed for each prediction block. Hereinafter, the prediction block which is a unit of prediction is also referred to as a prediction unit (PU).

Roughly speaking, the kinds of splitting (hereinafter abbreviated as PU splitting) in the prediction tree are two kinds of a case of intra-prediction and a case of inter-prediction.

In the case of the intra-prediction, as splitting methods, there are 2N×2N (the same size as the coding node) and N×N.

In the case of the inter-prediction, as splitting methods, there are 2N×2N (the same size as the coding node), 2N×N, 2N×nU, 2N×nD, N×2N, nL×2N, and nR×2N.

In the transform tree, the coding node is split into one transform block or a plurality of transform blocks, and the position and size of each transform block are defined. In other words, the transform block is one region or a plurality of non-overlapping regions included in the coding node. The transform tree includes one transform block or the plurality of transform blocks obtained through the above-described splitting.

As the splitting of the transform tree, there are splitting in which a region having the same size is allocated as the coding node as a transform block and splitting which is performed by the recursive quadtree splitting as in the splitting of the above-described tree block.

A transform process is performed for each transform block. Hereinafter, the transform block which is a unit of transform is also referred to as a transform unit (TU).

(Data Structure of CU Information)

Subsequently, specific content of the data included in the CU information CU will be described with reference to FIG. 3(e). As illustrated in FIG. 3(e), specifically, the CU information CU includes a skip flag SKIP, prediction tree information (hereinafter abbreviated as PT information) PTI, and transform tree information (hereinafter abbreviated as TT information TTI.

The skip flag SKIP is a flag that indicates whether a skip mode is applied to the target PU. When the value of the skip flag SKIP is 1, that is, the skip mode is applied to the target CU, a part of the PT information PTI and the TT information TTI in the CU information CU are omitted. The skip flag SKIP is omitted in the I slice.

[PT Information]

The PT information PTI is information regarding prediction tree (hereinafter abbreviated as a PT) included in the CU. In other words, the PT information PTI is a set of information regarding one PU or a plurality of PUs included in the PT and is referred to when a predicted image is generated by the hierarchical moving image decoding device 1. As illustrated in FIG. 3(e), the PT information PTI includes prediction type information PType and prediction information PInfo.

The prediction type information PType is information designating a method of generating a predicted image in regard to the target PU. In the base layer, the prediction type information PType is information designating whether to use the intra-prediction or the inter-prediction.

The prediction information PInfo is prediction information used in the prediction method of designating the prediction type information PType. In the base layer, intra-prediction information PP_Intra is included in the case of the intra-prediction. Further, inter-prediction information PP_Inter is included in the case of the inter-prediction.

The inter-prediction information PP_Inter includes prediction information referred to when the hierarchical moving image decoding device 1 generates an inter-predicted image through the inter-prediction. More specifically, the inter-prediction information PP_Inter includes inter-PU splitting information designating a splitting pattern of the target CU into each inter-PU and inter-prediction parameters (motion compensation parameters) in regard to each inter-PU. The inter-prediction parameters include, for example, a merge flag (merge_flag), a merge index (merge_idx), an estimated motion vector index (mvp_idx), a reference image index (ref_idx), an inter-prediction flag (inter_pred_flag), and a motion vector residual (mvd).

The intra-prediction information PP_Intra includes coding parameters referred to when the hierarchical moving image decoding device 1 generates an intra-predicted image through the intra-prediction. More specifically, the intra-prediction information PP_Intra includes intra-PU splitting information designating a splitting pattern of the target CU into each intra-PU and intra-prediction parameters in regard to each intra-PU. The intra-prediction parameters are parameters for designating an intra-prediction method (prediction mode) in regard to each intra-PU.

Here, the intra-prediction parameters are parameters for restoring the intra-prediction (prediction mode) in regard to each intra-PU. The parameters for restoring the prediction mode include mpm_flag which is a flag related to a most probable mode (MPM) (the same applies below), mpm_idx which is an index for selecting the MPM, and rem_idx which is an index for designating a prediction mode other than the MPM. Here, the MPM is an estimated prediction mode which is most likely to be selected in a target partition. For example, the MPM can include an estimated prediction mode estimated based on the prediction mode allocated to a neighboring partition of the target partition, and a DC mode and a planar mode which are generally highly likely to occur.

Hereinafter, when a mode is described simply as a "prediction mode", the mode is assumed to be a luminance prediction mode unless otherwise mentioned. In regard to a chroma prediction mode, a mode is described as a "chroma prediction mode" to distinguish the mode from the luminance prediction mode. The parameters for restoring the prediction mode include chroma_mode which is a parameter for designating the chroma prediction mode.

[TT Information]

The TT information TTI is information regarding the transform tree (hereinafter abbreviated as a TT) included in the CU. In other words, the TT information TTI is a set of information regarding one transform block or a plurality of transform blocks included in the TT and is referred to when the hierarchical moving image decoding device 1 decodes residual data.

As illustrated in FIG. 3(e), the TT information TTI includes TT splitting information SP_TT designating a splitting pattern of the target CU into each transform block and quantization prediction residuals $QD_1$ o $QD_{NT}$ (where NT is a total number of blocks included in the target CU).

Specifically, the TT splitting information SP_TT is information for deciding the shape of each transform block included in the target CU and the position of each transform block in the target CU. For example, the TT splitting information SP_TT can be realized from information (split_transform_unit_flag) indicating whether the splitting of the target node is performed and information (trafoDepth) indicating a depth of the splitting.

For example, when the size of the CU is 64×64, each transform block obtained through the splitting can have a size from 32×32 pixels to 4×4 pixels.

Each quantization prediction residual QD is coded data generated by causing the hierarchical moving image coding device 2 to perform the following processes 1 to 3 on a target block which is a processing target transform block.

Process 1: A prediction residual obtained by subtracting a predicted image from a coding target image is subjected to frequency transform (for example, discrete cosine transform (DCT), discrete sine transform (DST), or the like).

Process 2: A transform coefficient obtained in the process 1 is quantized.

Process 3: The transform coefficient quantized in the process 2 is subjected to variable-length coding.

The above-described quantization parameter qp indicates the magnitude of a quantization step QP used when the hierarchical moving image coding device 2 quantizes the transform coefficient ($QP=2^{qp/6}$).

(PU Splitting Information)

As the types of PU splitting designated by the PU splitting information, there are the following total of eight kinds of patterns when the size of the target CU is assumed to be 2N×2N pixels. That is, there are four symmetric splittings of 2N×2N pixels, 2N×N pixels, N×2N pixels, and N×N pixels and there are four asymmetric splittings of 2N×nU pixels, 2N×nD pixels, nL×2N pixels, and nR×2N pixels. Further, N is meant to be equal to $2^m$ (where m is any integer equal to or greater than 1). Hereinafter, a prediction unit obtained by splitting the target CU is referred to as a prediction block or a partition.

(Enhancement Layer)

For example, a data structure which is the substantially the same as the data structure illustrated in FIG. 3 can be adopted for coded data included in the layer notation of the enhancement layer (hereinafter referred to as enhancement layer coded data). However, additional information may be added or omitted or parameters may be omitted for the enhancement layer coded data, as will be described below.

In the slice layer, identification information (dependency_id, temporal_id, quality_id, and view_id) of layers of the spatial scalability, the temporal scalability, and the SNR scalability, and view scalability may be coded.

The prediction type information PType included in the CU information CU is information designating one of the intra-prediction, the inter-prediction, and the inter-layer image prediction as the method of generating the predicted image in regard to the target CU. The prediction type information PType includes a flag (inter-layer image prediction flag) designating whether to apply the inter-layer image prediction mode. The inter-layer image prediction flag is also referred to as texture_rl_flag, inter_layer_pred_flag, or base_mode_flag in some cases.

In the enhancement layer, it may be designated whether the CU type of the target CU is the intra-CU, the inter-layer CU, the inter-CU, or the skip CU.

The intra-CU can be defined similarly with the intra-CU in the base layer. In the intra-CU, the inter-layer image prediction flag is set to "0" and the prediction mode flag is set to "0".

The inter-layer CU can be defined as the CU for which a decoded image of a picture in the reference layer is used to generate a predicted image. In the inter-layer CU, the inter-layer image prediction flag is set to "1" and the prediction mode flag is set to "0".

The skip CU can be defined similarly with the case of the HEVC scheme described above. For example, in the skip CU, the skip flag is set to "1".

The inter-CU may be defined as the CU in which non-skip and motion compensation (MC) is applied. In the inter-CU, for example, the skip flag is set to "0" and the prediction mode flag is set to "1".

As described above, the coded data in the enhancement layer may be generated according to a coding scheme different from the coding scheme of the lower layer. That is, the coding and decoding processes of the enhancement layer do not depend on the kinds of codec of the lower layer.

The lower layer may be coded according to, for example, the MPEG-2 or H.264/AVC scheme.

In the enhancement layer coded data, the VPS may be enhanced and a parameter indicating a reference structure between layers may be included.

In the enhancement layer coded data, the SPS, the PPS, and the slice header may be enhanced and information (for example, a syntax for directly or indirectly deriving an inter-layer reference image set, an inter-layer reference image list, base control information, or the like to be described below) related to the decoded image of the reference layer used for inter-layer image prediction may be included.

The above-described parameters may be coded singly or the plurality of parameters may be coded compositely. When the plurality of parameters are coded compositely, indexes can be allocated to combinations of the values of the parameters and the allocated indexes are coded. Since the parameters can be derived from other parameters or the decoded information, the coding of the parameters can be omitted.

[Hierarchical Moving Image Decoding Device]

Hereinafter, the configuration of the hierarchical moving image decoding device 1 according to the embodiment will be described with reference to FIGS. 1 to 21.

(Configuration of Hierarchical Moving Image Decoding Device)

Figure 4:
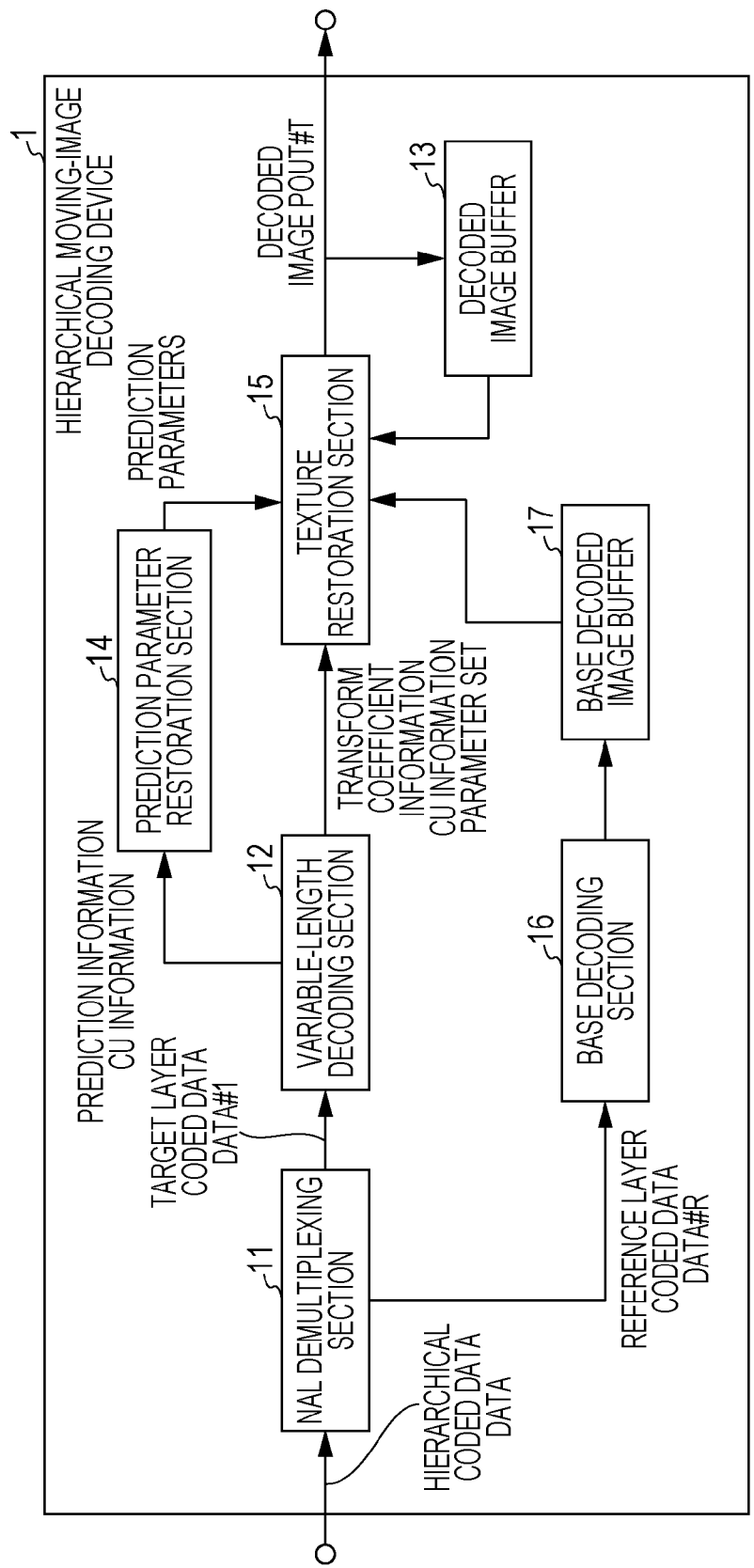
FIG. 4 is a functional block diagram illustrating a schematic configuration of the hierarchical moving image decoding device.

The schematic configuration of the hierarchical moving image decoding device 1 will be described as follows with reference to FIG. 4. FIG. 4 is a functional block diagram illustrating the schematic configuration of the hierarchical moving image decoding device 1. The hierarchical moving image decoding device 1 decodes hierarchically coded data DATA supplied from the hierarchical moving image coding device 2 to generate decoded image POUT#T of a target layer. Hereinafter, the description will be described on the assumption that the target layer is an enhancement layer. Therefore, the target layer is also a layer higher than the reference layer. Conversely, the reference layer is a lower layer of the target layer.

As illustrated in FIG. 4, the hierarchical moving image decoding device 1 includes an NAL demultiplexing section 11, a variable-length decoding section 12, a decoded image buffer 13, a prediction parameter restoration section 14, a texture restoration section 15, a base decoding section 16, and a base decoded image buffer 17.

The NAL demultiplexing section 11 demultiplexes hierarchically coded data DATA transmitted in a network abstraction layer (NAL) in a NAL unit.

The NAL is a layer that is provided to abstract communication between a video coding layer (VCL) and a lower system that transmits and accumulates coded data.

The VCL is a layer in which a moving image coding process is performed. The coding is performed in the VCL.

On the other hand, the lower system mentioned herein corresponds to the file format of H.264/AVC and HEVC or an MPEG-2 system.

In the NAL, a bit stream generated in the VCL is partitioned in a unit called an NAL unit and is transmitted to a lower system which is a destination. The NAL unit includes coded data coded in the VCL and a header used to properly deliver the coded data to the lower system which is a destination. The coded data in each layer is stored in the NAL unit to be subjected to NAL multiplexing and transmitted to the hierarchical moving image decoding device 1.

The NAL demultiplexing section 11 demultiplexes the hierarchically coded data DATA and extracts target layer coded data DATA#T and reference layer coded data DATA#R. The NAL demultiplexing section 11 supplies the target layer coded data DATA#T to the variable-length decoding section 12 and supplies the reference layer coded data DATA#R to the base decoding section 16.

The variable-length decoding section 12 decodes various syntax values from binary included in the target layer coded data DATA#T. The decoded syntax values are classified and output. The classification of the syntax values includes prediction information corresponding to the PTI in FIG. 3(*e*) and transform coefficient information corresponding to the TTI in FIG. 3(*e*).

The variable-length decoding section 12 decodes the CU information from the target layer coded data DATA#T. The CU information includes information used to specify the shape, the size, and the position of the CU.

The variable-length decoding section 12 decodes the parameter set used to decode a target layer from the target layer coded data DATA#T. The parameter set includes the VPS, the SPS, the PPS, and the slice header.

The variable-length decoding section 12 supplies the decoded prediction information and CU information to the prediction parameter restoration section 14. The variable-length decoding section 12 supplies the decoded transform coefficient information, CU information, and parameter set to the texture restoration section 15.

The decoded image buffer 13 is a picture buffer that records a decoded image of each picture of a target layer restored by the texture restoration section 15. The decoded image buffer 13 records the decoded image corresponding to each picture of the target layer in association with an output order (picture order count (POC)). Hereinafter, the decoded image buffer 13 is also referred to as a decoded picture buffer (DPB). The DPB records the decoded image of the target layer.

The base decoding section 16 decodes a base decoded image which is a decoded image of a reference layer referred to at the time of the decoding of the decoded image corresponding to the target layer from the reference layer coded data DATA#R. The base decoding section 16 supplies the decoded base decoded image to the texture restoration section 15.

The base decoding section 16 may decode a base prediction parameter corresponding to the prediction parameter in the reference layer from the reference layer coded data #R and supply the base prediction parameter to the prediction parameter restoration section 14.

The base decoded image buffer 17 is a picture buffer that records the decoded image of each picture of the reference layer restored by the base decoding section 16. The base decoded image buffer 17 records the decoded image corresponding to each picture of the reference layer in association with the output order (POC). Hereinafter, the base decoded image buffer 17 is also referred to as a base decoded picture buffer (BASE_DPB).

The prediction parameter restoration section 14 restores the prediction parameters by using the CU information and the prediction information. The prediction parameter restoration section 14 supplies the restored prediction parameters to the texture restoration section 15.

The texture restoration section 15 generates the decoded image POUT#T by using the CU information, the transform coefficient information, the base decoded image, and the prediction parameters and outputs the decoded image POUT#T to the outside. The texture restoration section 15 stores information regarding the restored decoded image in the decoded image buffer 13.

Hereinafter, the details of the texture restoration section 15, the variable-length decoding section 12, and the base decoding section 16 will be described.

(Texture Restoration Section)

Figure 1:
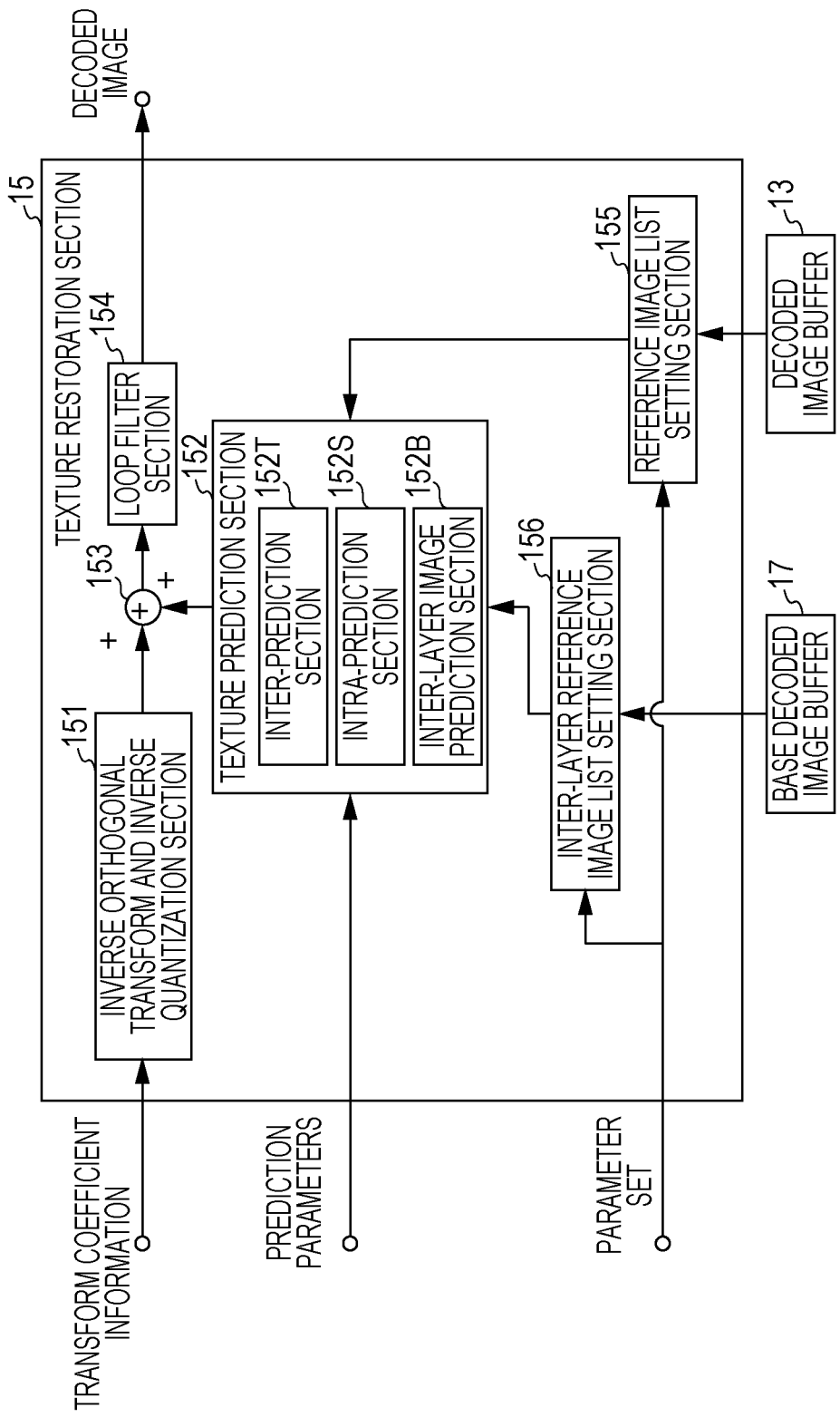
FIG. 1 is a functional block diagram exemplifying the configuration of a texture restoration section included in a hierarchical moving image decoding device according to an embodiment of the present invention.

The detailed configuration of the texture restoration section 15 will be described with reference to FIG. 1. FIG. 1 is a functional block diagram exemplifying the configuration of the texture restoration section 15.

As illustrated in FIG. 1, the texture restoration section 15 includes an inverse orthogonal transform and inverse quantization section 151, a texture prediction section 152, an adder 153, a loop filter section 154, a reference image list setting section 155, and an inter-layer reference image list setting section 156. The texture prediction section 152 includes an inter-prediction section 152T, an intra-prediction section 152S, and an inter-layer image prediction section 152B.

The inverse orthogonal transform and inverse quantization section 151 inversely quantizes the quantization prediction residual QD included in the transform coefficient information supplied from the variable-length decoding section 12 (1), performs inverse orthogonal transform (for example, discrete cosine transform (DCT)) on the DCT coefficient obtained through the inverse quantization (2), and supplies a prediction residual D obtained through the inverse orthogonal transform to the adder 153 (3). The generation of the prediction residual D is performed in units of transform blocks.

The texture prediction section 152 generates a predicted image with reference to the base decoded image (also referred to as a base reference image) recorded in the base decoded image buffer 17 and the decoded image decoded and recorded in the decoded image buffer 13 according to the prediction parameters.

The texture prediction section 152 supplies the predicted image generated by the inter-prediction section 152T, the intra-prediction section 152S, or the inter-layer image prediction section 152B to the adder 153.

The inter-prediction section 152T generates the predicted image of each prediction block through the inter-prediction. Specifically, the predicted image is generated through motion compensation prediction based on the pixel value of a region on the reference image indicated by a motion vector included in the prediction parameters. The reference image is a decoded image recorded in the decoded image buffer 13 and is specified by a combination of the reference image list and the reference image index included in the prediction parameters. A predicted image generation process through the inter-prediction in the inter-prediction section 152T will be described below in detail in conjunction with a reference image list setting process in the reference image list setting section 155.

The intra-prediction section 152S generates a predicted image in regard to each intra-prediction partition through the intra-prediction. Specifically, the predicted image is generated by using a spatial prediction mode supplied as a prediction parameter from the intra-prediction information restoration section 144S through spatial prediction in which decoded neighboring pixel values of a target PU are referred to.

The inter-layer image prediction section 152B generates the predicted image through the inter-layer image prediction with reference to the base reference image. The base reference image is selected from the decoded images recorded in the base decoded image buffer 17. More precisely, the base reference image is selected from the base decoded images which are the base decoded images included in the inter-layer reference image set in the target picture and are the base decoded images indicated as the images which can be referred to from the target picture. In the selection of the base reference image, a base reference image index included in the prediction parameters is used. Which base decoded image is used as the reference image is decided by a combination of the base reference image index and the inter-layer reference image list. The predicted image generation process through the inter-layer image prediction in the inter-layer image prediction section 152B will be described below in detail in conjunction with an inter-layer reference image list setting process in the inter-layer reference image list setting section 156.

The adder 153 generates the decoded image by adding the predicted image supplied from the texture prediction section 152 and the prediction residual D supplied from the inverse orthogonal transform and inverse quantization section 151.

The loop filter section 154 applies a deblocking process or a filtering process by an adaptive filter parameter on the decoded image supplied from the adder 153.

The reference image list setting section 155 generates a reference image list used for the motion compensation prediction in the inter-prediction section 152T in the texture prediction section 152 based on a syntax related to the reference image list included in the parameter set.

The inter-layer reference image list setting section 156 generates an inter-layer reference image list used for the inter-layer image prediction in the inter-layer image prediction section 152B in the texture prediction section 152 based on a syntax related to the inter-layer reference image list included in the parameter set.

<Inter-Prediction and Generation of Reference Image List>

The details of the predicted image generation process through the inter-prediction in the inter-prediction section 152T and the reference image list setting process in the reference image list setting section 155 will be described.

In the generation (motion compensation prediction) of the predicted image in the inter-prediction section 152T, the decoded image recoded at a position indicated by the reference image index (refIdx) on the reference image list is used as the reference image. For example, when the value of refIdx is 0, the position of 0 of the reference image list, that is, the decoded image in the front of the reference image list, is used as the reference image in the motion compensation prediction.

The reference image list (RPL) is a candidate list of the reference image which can be referred to at the time of the application of the motion compensation prediction. Two or more reference image lists may be present. In the embodiment, an L0 reference image list (L0 reference list) and an L1 reference image list (L1 reference list) are assumed to be used. RPL correction information is information that is included in the parameter set (the SPS or the slice header) and indicates the order of reference images in the reference image list.

A reference image set (RPS: Reference Picture Set) indicates a set of pictures which is likely to be used as reference images in a target picture or a picture subsequent to the target picture in the decoding order. The RPS information is information that is included in the parameter set (the SPS or the slice header) and is used to derive the reference image set set at the time of the decoding of each picture.

The picture which is not included in the reference image set with respect to a specific picture is not used to decode a picture subsequent to the specific picture in the decoding order. Accordingly, the hierarchical moving image decoding device can erase the picture not included in the reference image set from the decoded image buffer.

The reference image list can also be expressed as a list which the pictures likely to be used as the reference images in the target picture are selected from the pictures included in the reference image set and are ordered.

Figure 6:
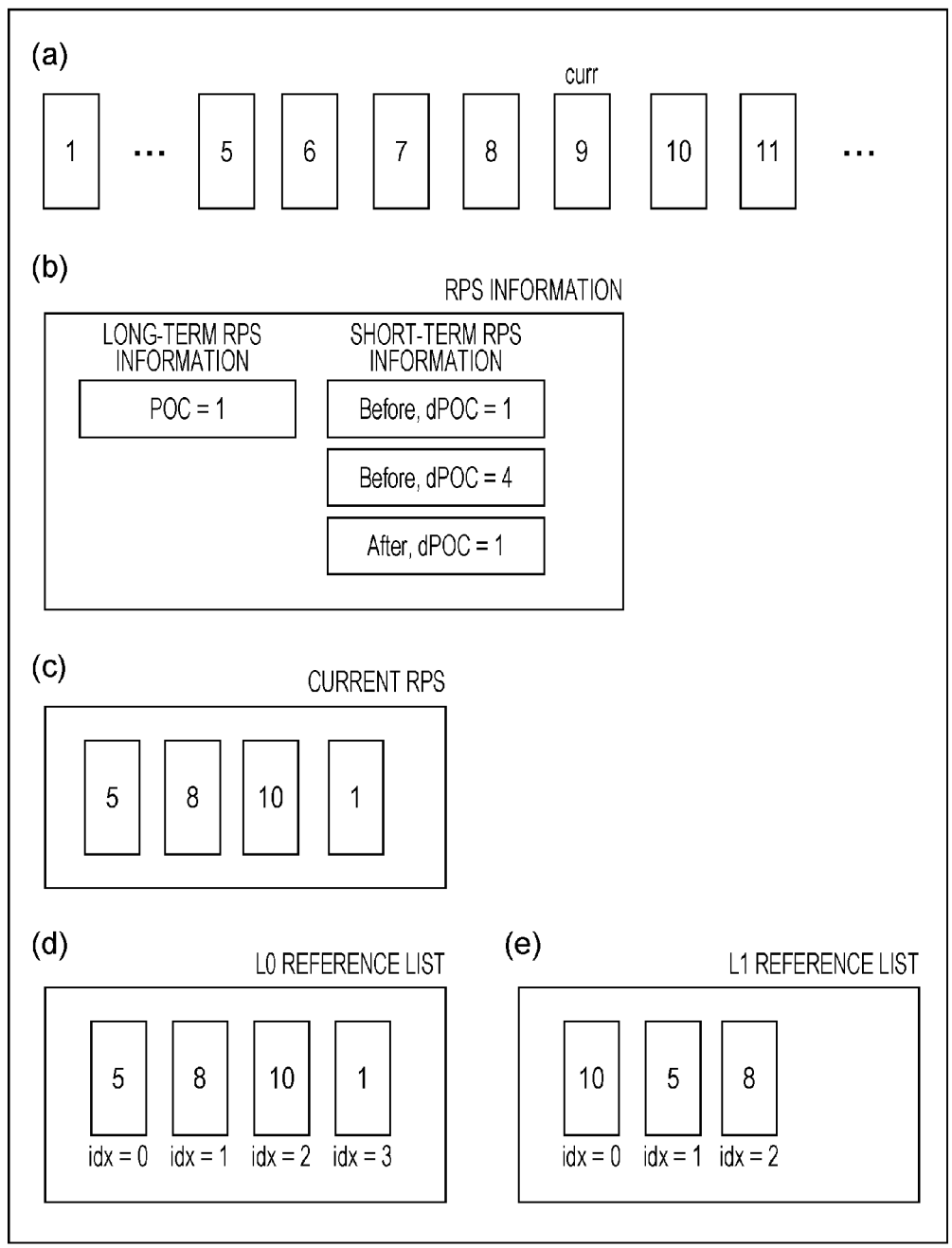
FIG. 6 is a diagram illustrating examples of a reference image set and a reference image list.

Here, examples of the reference image set and the reference image list will be described with reference to FIG. 6. FIG. 6(*a*) illustrates pictures included in a moving image and arranged in a display order and each numeral in the drawing indicates the POC corresponding to each picture. The POC can be allocated to each of the pictures arranged in an ascending order of an output order. The picture with the POC of 9 indicated by "curr" is a current decoding target picture.

FIG. 6(*b*) illustrates an example of RPS information applied to the target picture. The reference image set (current RPS) in the target picture is derived based on the RPS information. The RPS information includes long-term RPS information and short-term RPS information. The POC of the picture included in the current RPS is directly shown as the long-term RPS information. In the example illustrated in FIG. 6(*b*), the long-term RPS information indicates that the picture with POC=1 is included in the current RPS. In the short-term RPS information, the pictures included in the current RPS are recorded with differences for the POCs of the target picture. The short-term RPS information shown as "Before, dPOC=1" in the drawing indicates that the picture of the POC smaller by 1 than the POC of the target picture is included in the current RPS. Similarly, "Before, dPOC=4" in the drawing indicates the picture of the POC smaller by 4 and "After, dPOC=1" indicates that the picture of the POC larger by 1 is included in the current RPS. "Before" indicates a front of the target picture, that is, a picture earlier than the target picture in the display order. Further, "After" indicates a rear of a publication of the target picture, that is, a picture later than the target picture in the display order.

FIG. 6(*c*) illustrates an example of the current RPS derived at the time of the application of the RPS information exemplified in FIG. 6(*b*) when the POC of the target picture is 0. The picture of POC=1 indicted by the long-term RPS information is included. The picture that is shown in the short-term RPS information and has the POC smaller by 1 than the target picture (POC=9), that is, the picture of POC=8, is included. Likewise, the pictures of POC=5 and POC=10 shown in the short-term RPS information are included.

FIGS. 6(*d*) and 6(*e*) illustrates examples of the reference image lists generated from the reference image included in the current RPS. An index (reference image index) is assigned to each element of the reference image list (the index is denoted by idx in the drawing). FIG. 6(*d*) illustrates an example of the L0 reference list. In the L0 reference list, the reference pictures included in the current RPS with the POCs of 5, 8, 10, and 1 are included in this order. FIG. 6(e) illustrates an example of the L1 reference list. In the L1 reference list, the reference pictures included in the current RPS with the POCs of 10, 5, and 8 are included in this order. As illustrated in the example of the L1 reference list, all of the reference images (referable pictures) included in the current RPS may not be necessarily included in the reference image list. However, the maximum number of elements of the reference image list is the number of reference images included in the current RPS. In other words, the length of the reference image list is equal to or less than the number of pictures which can be referred to in the current picture.

Figure 7:
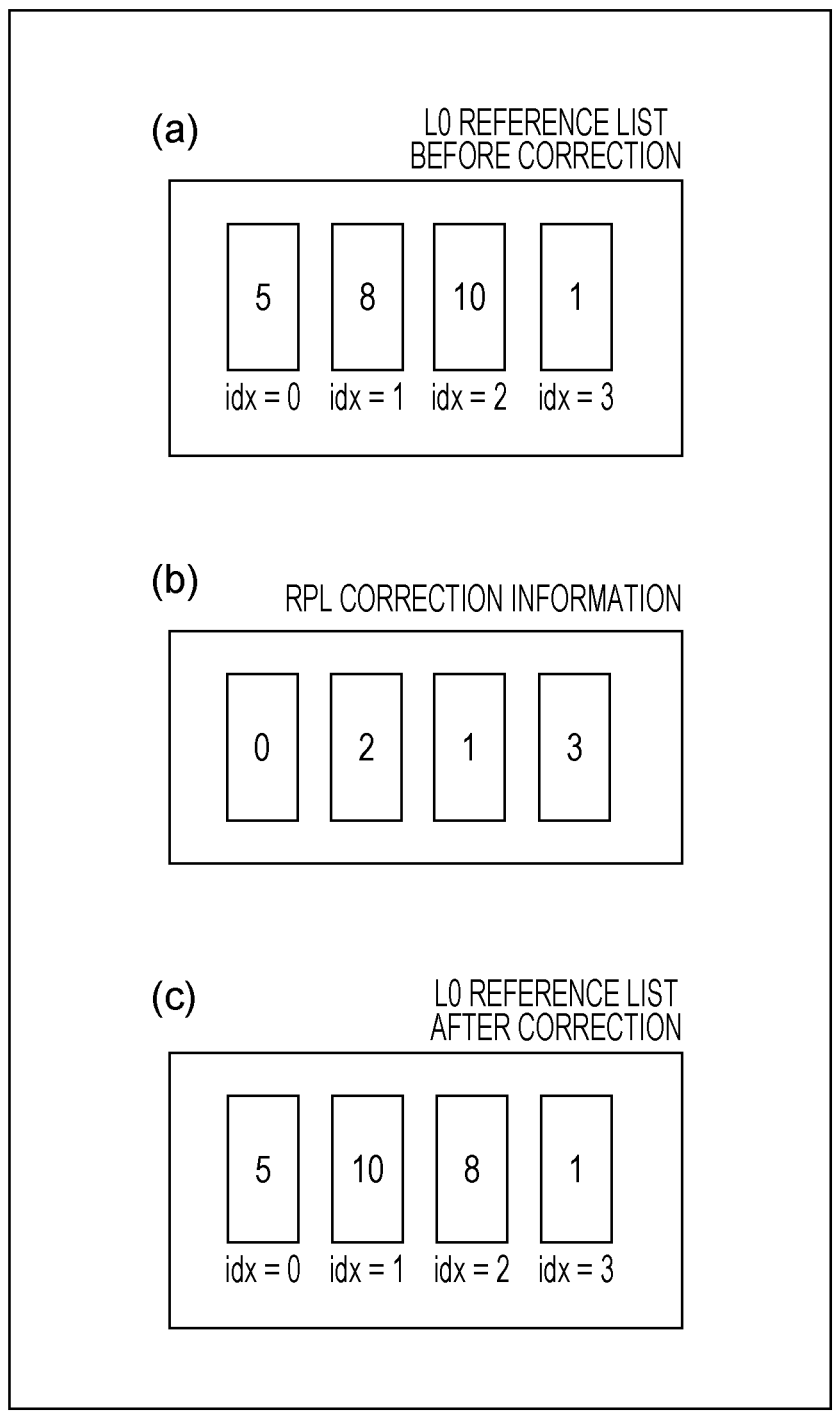
FIG. 7 is a diagram illustrating a correction example of a reference image list.

Next, a correction example of the reference picture list will be described with reference to FIG. 7. FIG. 7 exemplifies the reference picture list (FIG. 7(c)) after correction obtained when RPL correction information (FIG. 7(b)) is applied to the reference picture list (FIG. 7(a)). The L0 reference list before correction illustrated in FIG. 7(a) is the same as the L0 reference list described with reference to FIG. 6(d). The RPL correction information illustrated in FIG. 7(b) is configured as a list in which the values of the reference image indexes are used as elements, and the values of 0, 2, 1, and 3 are stored in order from the beginning. The RPL correction information indicates that the reference images indicted by the reference image indexes of 0, 2, 1, and 3 included in the reference list before correction are reference images of the L0 reference list after correction in this order. FIG. 7(c) illustrates the L0 reference list after correction, and the pictures with the POCs of 5, 10, 8, and 1 are included in this order.

<Inter-Prediction (Motion Compensation Prediction) Process>

The predicted image generation process in the inter-prediction section 152T is performed in order of the following S101 to S105.

(S101) The prediction blocks in the target CU are set sequentially as the target prediction block and the processes of the following S102 to S105 are performed sequentially.

(S102) Motion information regarding the target prediction block is read from the prediction parameter.

(S103) When the target prediction block uses the L0 prediction, the reference image at a position indicated by the L0 reference index in the L0 reference list is set as the reference image of the target prediction block. An L0 prediction image is generated based on the decoded pixel values of the reference image indicated by L0 motion vectors.

(S104) When the target prediction block uses the L1 prediction, the reference image at a position indicated by the L1 reference index in the L1 reference list is set as the reference image of the target prediction block. An L1 prediction image is generated based on the pixel values at positions indicated by L1 motion vectors on the reference image.

(S105) When the target prediction block uses only the L0 prediction, the L0 prediction image is set as a predicted image of the target prediction block. On the other hand, when the target prediction block uses only the L1 prediction, the L1 prediction image is set as a predicated image of the target prediction block. On the other hand, when the target prediction block uses both of the L0 prediction and the L1 prediction (when the target prediction block uses bi-prediction), a weighted average of the L0 prediction image and the L1 prediction image is set as a predicted image of the target prediction block.

<Inter-Layer Image Prediction and Generation of Inter-Layer Reference Image List>

The details of the predicted image generation process through the inter-layer image prediction in the inter-layer image prediction section 152B and the inter-layer reference image list setting process in the inter-layer reference image list setting section 156 will be described.

Figure 8:
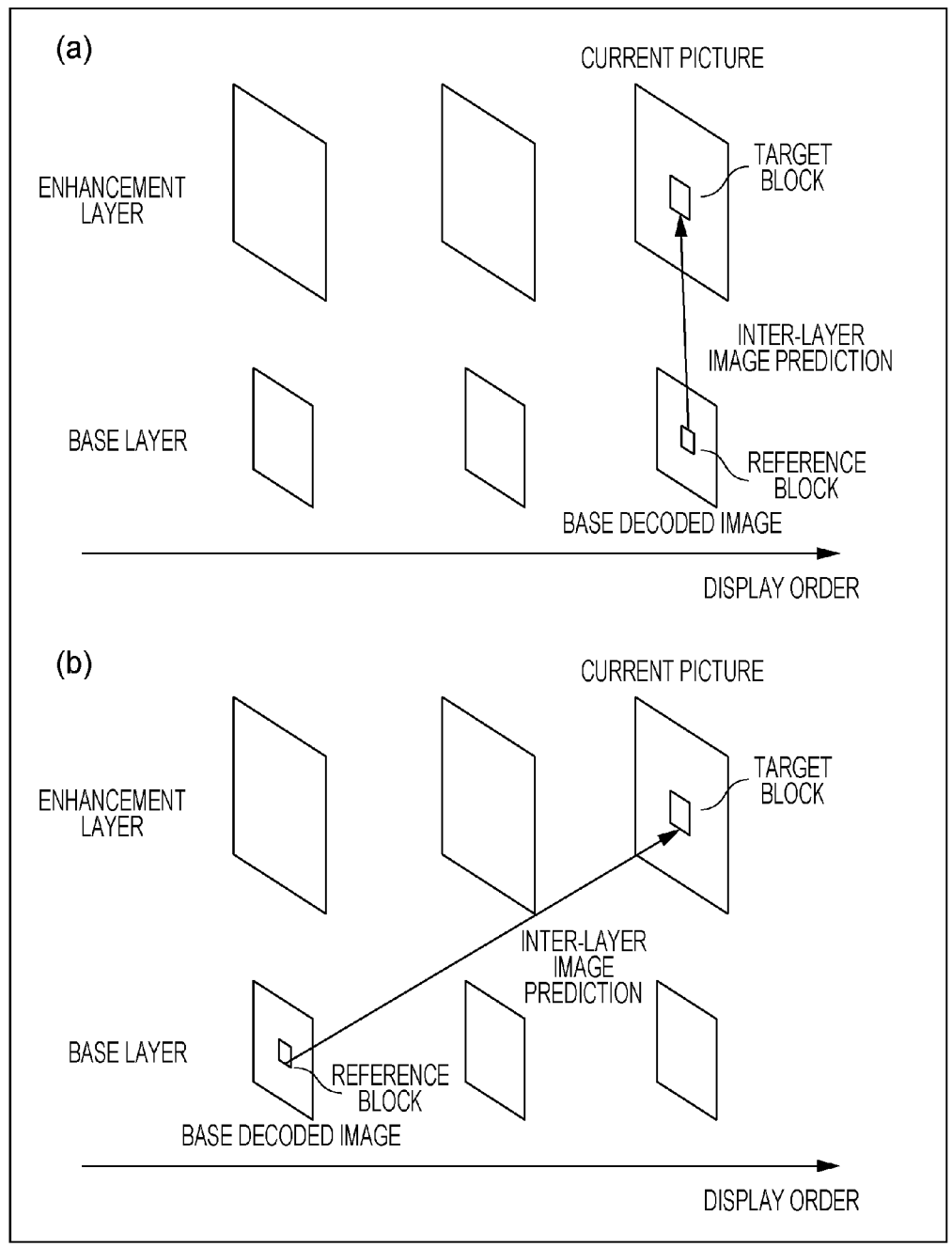
FIG. 8 is a diagram schematically illustrating intra inter-layer prediction by the hierarchical moving image decoding device.

The inter-layer image prediction in the inter-layer image prediction section 152B will be described with reference to FIG. 8. FIG. 8 is a schematic diagram schematically illustrating the inter-layer image prediction in which the base decoded image is used.

As illustrated in FIG. 8(a), in the inter-layer image prediction, a predicted image of a target block (indicating a prediction block to be decoded (the same applies below)) of a target layer (enhancement layer) can be generated based on a decoded image of a reference block (indicating a prediction block to be referred to (the same applies below)) which is a block on a picture located temporally at the same time as the target block in the reference layer and is a block disposed spatially at a position corresponding to the target block.

As illustrated in FIG. 8(b), in the inter-layer image prediction, the predicted image of the target block of the target layer (the enhancement layer) can be generated based on the decoded image of the reference block which is a picture located temporally at a different time from the target block in the reference layer and is a block disposed spatially at a position corresponding to the target block.

When the number of pixels is different between the target block and the reference block, upsampling may be configured to be performed. The intra-predicted image may be configured to be generated with reference to the base decoded image in which filtering (Sample Adaptive Offset (SAO), adaptive loop filter (ALF), edge reinforcement, noise removal, interlacing cancellation, or the like) is applied to the decoded image of the reference block, as necessary.

Hereinafter, a picture of the reference layer used to generate the predicted image through the inter-layer image prediction is referred to as a base reference image. The base reference image is selected from the inter-layer reference image list.

The inter-layer reference image list (IL-RPL: Inter-layer Reference Picture List) is a candidate list of the base reference image which can be referred to at the time of the application of the inter-layer image prediction. IL-RPL correction information is information included in the parameter set (the SPS or the slice header) and indicates an order of the base reference images in the base reference image list.

More generally, the inter-layer reference image list can also said to be a candidate list of the base decoded image which can be referred to at the time of the generation of the predicted image in the target layer (the enhancement layer). For example, even when a scheme called generalization residual prediction is used, the inter-layer reference image list can be used. The generalization residual prediction is schematically a prediction method of deriving a prediction residual estimation value of the target block from the plurality of decoded images of the reference layer and generating the predicted image of the target block by using the prediction residual estimation value.

An inter-layer reference image set (IL-RPS: Inter-Layer Reference Picture Set) indicates a set of the pictures on the reference layer which are likely to be used as the base reference image in the target picture on the target layer (the enhancement layer) or a picture subsequent to the target picture in the decoding order on the target layer (the enhancement layer). IL-RPS information is information included in the parameter set (the SPS or the slice header) and is used to derive the base reference image set at the time of the decoding of each picture on the target layer (the enhancement layer).

The pictures on the reference layer which are not included in the inter-layer reference image set with respect to the specific picture are not used to decode the pictures on the reference layer subsequent to the specific picture in the decoding order on the target layer (the enhancement layer). Accordingly, when the pictures on the reference layer are not used to decode the pictures on the reference layer later than the current picture in the decoding order, the hierarchical moving image decoding device can erase the pictures not included in the reference image set from the base decoded image buffer.

<Specific Example 1 of Inter-Layer Reference Image Set>

Figure 9:
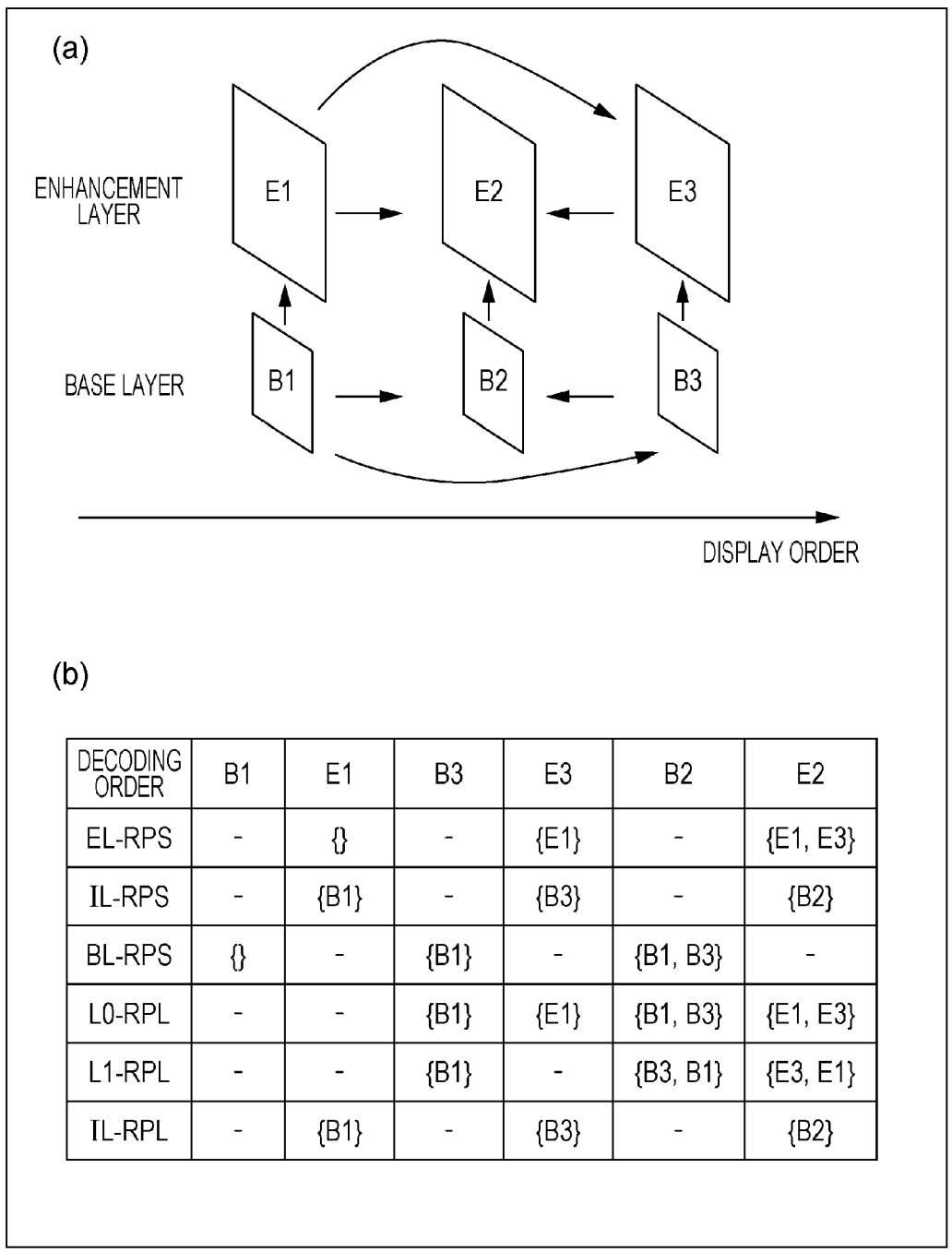
FIG. 9 is a diagram illustrating an example of inter-layer reference image sets, inter-layer reference image lists, and states of each reference image set and reference image list of an enhancement layer and a reference layer at the time of the decoding of hierarchically coded data formed from the two layers.

Here, a specific example of the reference image set and the inter-layer reference image set will be described with reference to FIG. 9. FIG. 9 is a diagram exemplifying the inter-layer reference image sets, the inter-layer reference image lists, and states of each reference image set and reference image list of the enhancement layer and the reference layer at the time of the decoding of hierarchically coded data formed from two layers.

FIG. 9(a) illustrates a display order of pictures B1, B2, and B3 on the reference layer and pictures E1, E2, and E3 on the target layer (the enhancement layer) and a reference relation by the inter-prediction or the inter-layer image prediction. FIG. 9(b) illustrates the decoding order of the foregoing pictures and the states of the reference image set (EL-RPS) of the target layer (the enhancement layer), the inter-layer reference image set (IL-RPS), the reference image set (BL-RPS) of the reference layer, the L0 reference image list (L0-RPL) and the L1 reference image list (L1-RPL) in the target layer (the enhancement layer) or the reference layer, and the inter-layer reference image list (IL-RPL) at the time of the decoding of each picture. Hereinafter, the description will be made in the decoding order.

(1) the time of the decoding of B1: Since B1 is the first picture of the reference layer, the BL-RPS is empty ("{ }" in the drawing). Since the inter-prediction is not used, neither the L0-RPL nor the L1-RPL is used ("-" in the drawing). Since the reference layer is also the base layer, the inter-layer image prediction is not used and the IL-RPL is not used (the same applies at the time of the decoding of B2 and B3).

(2) the time of the decoding of E1: Since E1 is the first picture of the target layer (the enhancement layer), the EL-RPS is empty. In the inter-layer image prediction, the decoded image of B1 can be referred to. That is, B1 is included in the IL-RPS and the IL-RPL.

(3) the time of the decoding of B3: In B3, B1 can be referred to through the inter-prediction. That is, B1 is included in the BL-RPS. Further, B1 is included in the L0_RPL and the L1_RPL.

(4) the time of the decoding of E3: In E3, E1 can be referred to through the inter-prediction. That is, E1 is included in the EL-RPS. Further, E1 is included in the L0_RPL and the L1_RPL. In E3, B3 can be referred to through the inter-layer image prediction. That is, B3 is included in the IL-RPS and the IL-RPL.

(5) the time of the decoding of B2: In B2, B1 and B3 can be referred to through the inter-prediction. That is, B1 and B3 are included in the BL-RPS. Neither B1 nor B3 is included in the L0-RPL and L1-RPL. However, B1 and B3 are included in this order in the L0-RPL, and B3 and B1 are included in this order in the L1-RPL.

(6) the time of the decoding of E2: In E2, E1 and E3 can be referred to through the inter-prediction. That is, E1 and E3 are included in the EL-RPS. E1 and E3 are included in both of the L0-RPL and the L1-RPL. E1 and E3 are included in this order in the L0-RPL, and E3 and E1 are included in this order in the L1-RPL. In E2, B2 can be referred to through the inter-layer image prediction. That is, B2 is included in the IL-RPS and the IL-RPL.

In the foregoing example, B1 is not included in the IL-RPS at the time of the decoding of E3. This means that B1 is not used for the inter-layer image prediction in the pictures on the enhancement layer later than E3 in the decoding order. Accordingly, the hierarchical moving image decoding device can erase the decoded image of B1 from the base decoded image buffer at a time point at which B1 is not included in the BL-RPS. When the IL-RPS is not used, a possibility of B1 being usable for the pictures on the target layer (the enhancement layer) in the inter-layer image prediction may not be determined although B1 is not included in the BL-RPS. Therefore, B1 may not be erased from the base decoded image buffer. Hence, since the decoded image of the reference layer not used even in the inter-prediction or the inter-layer image prediction can be specified and erased from the base reference image by using the IL-RPS, it is possible to reduce a memory amount more than when the IL-RPS is not used.

<Specific Example 2 of Inter-Layer Reference Image Set>

Figure 10:
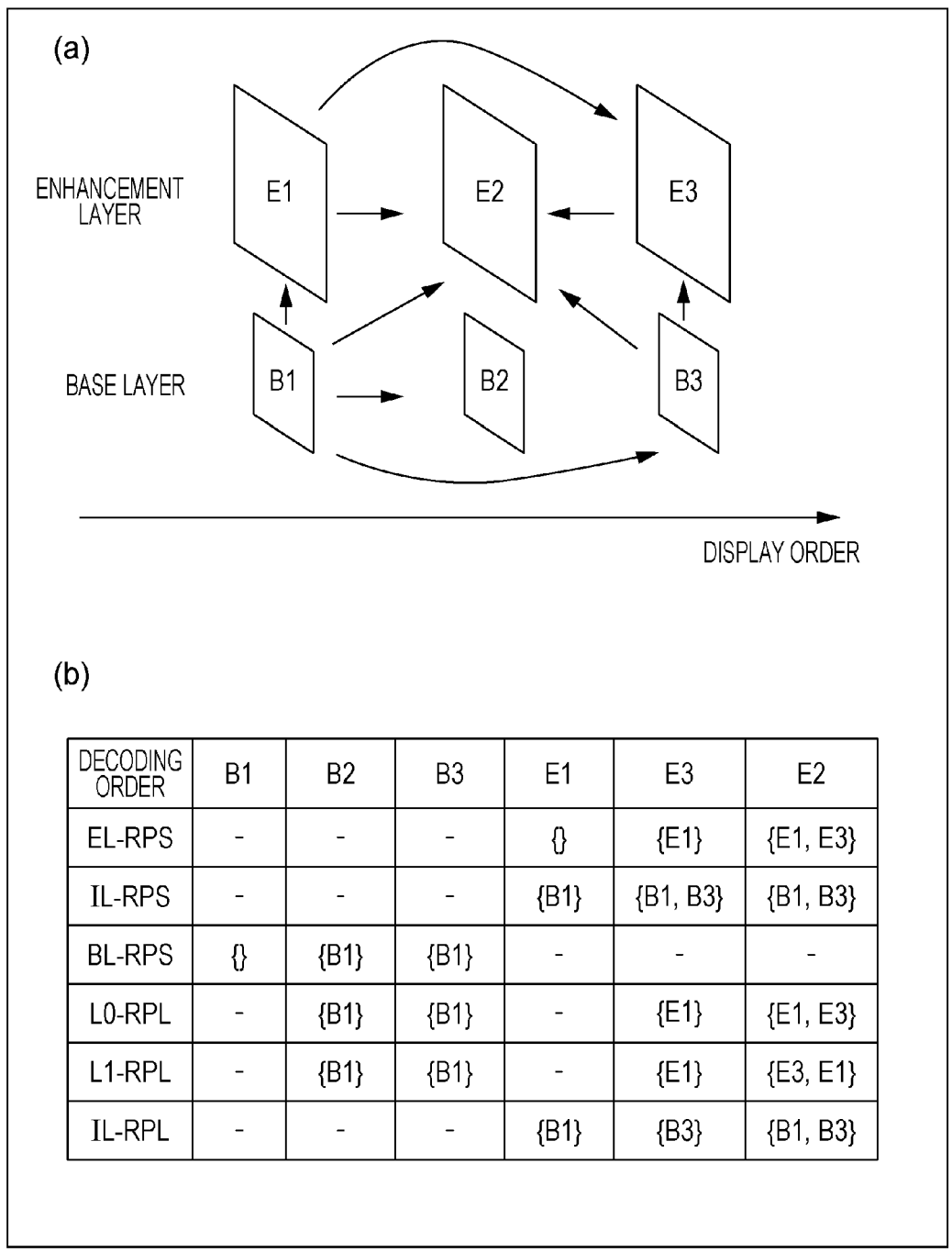
FIG. 10 is a diagram illustrating another example of the inter-layer reference image sets, the inter-layer reference image lists, and the states of each reference image set and reference image list of the enhancement layer and the reference layer at the time of the decoding of the hierarchically coded data formed from the two layers.

Here, another specific example of the reference image set and the inter-layer reference image set will be described with reference to FIG. 10. FIG. 10 is a diagram illustrating the other example of the inter-layer reference image sets, the inter-layer reference image lists, and the states of each reference image set and reference image list of the target layer (the enhancement layer) and the reference layer at the time of the decoding of the hierarchically coded data formed from two layers. The example illustrated in FIG. 10 is different from the example described with reference to FIG. 9 in that a relation between the decoding order and the display order of the reference layer is not identical to a relation between the display order and the decoding order of the target layer (the enhancement layer).

As in FIG. 9(a), FIG. 10(a) illustrates a display order of pictures B1, B2, B3, E1, E2, and E3 and a reference relation by the inter-prediction or the inter-layer image prediction. As in FIG. 9(b), FIG. 10(b) illustrates the decoding order of the foregoing pictures and the states of EL-RPS, IL-RPS, BL-RPS, L0-RPL, L1-RPL, and IL-RPL at the time of the decoding of each picture. Hereinafter, the description will be made in the decoding order.

(1) the time of the decoding of B1: Since B1 is the first picture of the reference layer, the BL-RPS is empty. Since the inter-prediction is not used, neither the L0-RPL nor the L1-RPL is used. Since the reference layer is also the base layer, the inter-layer image prediction is not used and the IL-RPL is not used (the same applies at the time of the decoding of B2 and B3).

(2) the time of the decoding of B2: In B2, B1 can be referred to through the inter-prediction. That is, B1 is included in the BL-RPS. B1 is included in the L0_RPL and L1_RPL.

(3) the time of the decoding of B3: In B3, B1 can be referred to through the inter-prediction. That is, B1 is included in the BL-RPS. Further, B1 is included in the L0_RPL and the L1_RPL.

(4) the time of the decoding of E1: Since E1 is the first picture of the target layer (the enhancement layer), the EL-RPS is empty. In the inter-layer image prediction, the decoded image of B1 can be referred to. That is, B1 is included in the IL-RPS and the IL-RPL.

(5) the time of the decoding of E3: In E3, E1 can be referred to through the inter-prediction. That is, E1 is included in the EL-RPS. Further, E1 is included in the L0_RPL and the L1_RPL. In E3, B3 can be referred to through the inter-layer image prediction. That is, B3 is included in the IL-RPL. Further, B1 is not referred to in the inter-layer image prediction in E3, but is referred in the inter-layer image prediction in E2 decoded later than E3. Therefore, B1 is included in the IL-RPS in addition to B3.

(6) the time of the decoding of E2: In E2, E1 and E3 can be referred to through the inter-prediction. That is, E1 and E3 are included in the EL-RPS. E1 and E3 are included in both of the L0-RPL and the L1-RPL. E1 and E3 are included in this order in the L0-RPL, and E3 and E1 are included in this order in the L1-RPL. In E2, B1 and B3 can be referred to through the inter-layer image prediction. That is, B1 and B3 are included in the IL-RPS and the IL-RPL.

In the foregoing example, B2 is not included in the BL-RPS at the time of the decoding of B3. Accordingly, at the time of the decoding of B3, it can be understood that B2 is not referred to at the time of the decoding of the pictures on the reference layer after B3. At the time of the decoding of E1, B2 is not included in the IL-RPS. Accordingly, at the time of the decoding of E1, it can be understood that B2 is not referred to at the time of the decoding of the pictures on the enhancement layer after E1. Therefore, at the time of the decoding of E1, B2 can be erased from the base reference image buffer.

As described in the foregoing two examples, by using the inter-layer reference image set, it is possible to specify a timing at which the decoded image of the reference layer is not used to generate the predicted image in the moving image decoding device and to erase the decoded image from the base decoded image buffer. Therefore, it is possible to reduce a memory amount. The scheme of using the inter-layer reference image set is effective even when the decoding order of the reference layer and the target layer (the enhancement layer) and the decoded image of the reference layer used at the time of the generation of the predicted image of each picture are not decided in advance.

(Variable-Length Decoding Section)

As described above, the variable-length decoding section 12 decodes the prediction information, the CU information, and the parameter set from the input coded data and outputs the prediction information, the CU information, and the parameter set to a proper output destination. Here, the details of the decoding of a syntax related to the reference image set, the reference image list, the inter-layer reference image set, and the inter-layer reference image list according to the invention will be described. Further, a process of deriving the reference image set, the reference image list, the inter-layer reference image set, and the inter-layer reference image list from a decoding syntax will be also described.

<Reference Image Set Decoding Process>

The RPS information is information that is decoded from the SPS or the slice header to construct the reference image set. The RPS information includes the following information:

1. SPS short-term RPS information: short-term reference image set information included in the SPS;

2. SPS long-term RP information: long-term reference image information included in the SPS;

3. SH short-term RPS information: short-term reference image set information included in the slice header; and 4. SH long-term RP information: long-term reference image information included in the slice header.

(1. SPS Short-Term RPS Information)

The SPS short-term RPS information includes information regarding a plurality of short-term reference image sets which can be used from each picture in which the SPS is referred to. The short-term reference image set is a set of pictures that can be reference images (short-term reference images) designated by relative positions (for example, POC differences from the target picture) with respect to the target picture.

The decoding of the SPS short-term RPS information will be described with reference to FIG. 11. FIG. 11 exemplifies a part of an SPS syntax table used at the time of the decoding of the SPS. A part (A) of FIG. 11 corresponds to the SPS short-term RPS information. The SPS short-term RPS information includes the number of short-term reference image sets (num_short_term_ref_pic_sets) included in the SPS and each piece of short-term reference image set information (short_term_ref_pic_set(i)).

The short-term reference image set information will be described with reference to FIG. 12. FIG. 12 exemplifies a syntax table of the short-term reference image set used at the time of the decoding of the SPS and the time of the decoding of the slice header.

The short-term reference image set information includes the number of short-term reference images (num_negative_pics) of which a display order is earlier than that of the target picture and the number of short-term reference images (num_positive_pics) of which a display order is later than that of the target picture. Hereinafter, the short-term reference image of which the display order is earlier than that of the target picture is referred to as a front short-term reference image and the short-term reference image of which the display order is later than that of the target picture is referred to as a rear short-term reference image.

The short-term reference image set information includes an absolute value of the POC difference from the target picture (delta_poc_s0_minus1[i]) and presence or absence of possibility to be used as the reference image of the target picture (used_by_curr_pic_s0_flag[i]) for each front short-term reference image. The short-term reference image set information further includes an absolute value of the POC difference from the target picture (delta_poc_s1_minus1[i]) and presence or absence of possibility to be used as the reference image of the target picture (used_by_curr_pic_s1_flag[i]) for each rear short-term reference image.

(2. SPS Long-Term RP Information)

The SPS long-term RP information includes information regarding the plurality of long-term reference images which can be used from each picture in which the SPS is referred to. The long-term reference image refers to a picture designated by an absolute position (for example, the POC) within the sequence.

Referring back to FIG. 11, the decoding of the SPS long-term RP information will be described. A part (B) of FIG. 11 corresponds to the SPS long-term RP information. The SPS long-term RP information includes information (long_term_ref_pics_present_flag) indicating whether there is the long-term reference image to be transmitted with the SPS, the number of long-term reference images (num_long_term_ref_pics_sps) included in the SPS, and information regarding each long-term reference image. The information regarding the long-term reference image includes the POC of the reference image (lt_ref_pic_poc_lsb_sps[i]) and presence or absence of possibility to be used as the reference image of the target picture (used_by_curr_pic_lt_sps_flag[i]).

The POC of the reference image may be the value itself of the POC associated with the reference image, or a least significant bit (LSB) of the POC, that is, a remaining value obtained by dividing the POC by a given square of 2, may be used.

(3. SH Short-Term RPS Information)

The SH short-term RPS information includes information regarding the single short-term reference image set which can be used from the picture in which the slice header is referred to.

The decoding of the SPS short-term RPS information will be described with reference to FIG. 13. FIG. 13 exemplifies a part of a slice header syntax table used at the time of the decoding of the slice header. A part (A) of FIG. 13 corresponds to the SH short-term RPS information. The SH short-term RPS information includes a flag (short_term_ref_pic_set_sps_flag) indicating whether the short-term reference image set is selected from the short-term reference image sets decoded with SPS or is explicitly included in the slice header. When the short-term reference image set is selected from the short-term reference image sets decoded with the SPS, an identifier (short_term_ref_pic_set_idx) indicating that one decoded short-term reference image sets is selected is included. When the short-term reference image set is explicitly included in the slice header, information corresponding to the syntax table (short_term_ref_pic_set(idx)) described above with reference to FIG. 12 is included in the SPS short-term RPS information.

(4. SH Long-Term RP Information)

The SH long-term RP information includes information regarding the long-term reference image which can be used from the picture in which the slice header is referred to.

Referring back to FIG. 13, the decoding of the SH long-term RP information will be described. A part (B) of FIG. 13 corresponds to the SH long-term RP information. The SH long-term RP information includes the slice header only when the long-term reference image can be used in the target picture (long_term_ref_pic_present_flag). When one or more long-term reference images are decoded with the SPS (num_long_term_ref_pics_sps>0), the number of reference images (num_long_term_sps) which can be referred to as the target picture among the long-term reference images decoded with the SPS is included in the SH long-term RP information. The number of long-term reference images (num_long_term_pics) explicitly transmitted with the slice header is included in the SH long-term RP information. Information (lt_idx_sps[i]) indicating that the long-term reference images of the number of the foregoing num_long_term_sps are selected from the long-term reference images transmitted with the SPS is further included in the SH long-term RP information. As the information regarding the long-term reference image explicitly included in the slice header, the POCs (poc_lsb_lt[i]) of the reference image and the presence or absence of possibility to be used as the reference images of the target pictures (used_by_curr_pic_lt_flag[i]) are included by the number of the foregoing num_long_term_pics.

<Reference Image List Decoding Process>

The RPL correction information is information that is decoded from the SPS or the slice header to construct the reference image list RPL. The RPL correction information includes SPS list correction information and SH list correction information.

(SPS List Correction Information)

The SPS list correction information is information included in the SPS and is information regarding restrictions on reference image list correction. Referring back to FIG. 11, the SPS list correction information will be described. A part (C) of FIG. 11 corresponds to the SPS list correction information. The SPS list correction information includes a flag (restricted_ref_pic_lists_flag) indicating whether the reference image list is common to previous slices included in the picture and a flag (lists_modification_present_flag) indicating whether information regarding list sorting is present in the slice header.

(SH List Correction Information)

The SH list correction information is information included in the slice header and includes updating information regarding the length of the reference image list applied to the target picture and sorting information of the reference image list (reference list sorting information). The SH list correction information will be described with reference to FIG. 14. FIG. 14 exemplifies a part of a slice header syntax table used at the time of the decoding of the slice header. A part (C) of FIG. 14 corresponding to the SH list correction information.

A flag (num_ref_idx_active_override_flag) indicating whether to update a list length is included as reference list length update information. Information (num_ref_idx_l0_active_minus1) indicating the reference list length after modification of the L0 reference list and information (num_ref_idx_l1_active_minus1) indicating the reference list length after modification of the L1 reference list are further included.

Information included as the reference list sorting information in the slice header will be described with reference to FIG. 15. FIG. 15 exemplifies a syntax table of the reference list sorting information used at the time of the decoding of the slice header.

The reference list sorting information includes an L0 reference list sorting presence or absence flag (ref_pic_list_modification_flag_l0). When the value of the flag is 1 (the L0 reference list is sorted) and NumPocTotalCurr is greater than 2, an L0 reference list sorting order (list_entry_l0[i]) is included in the reference list sorting information. Here, NumPocTotalCurr is a variable indicating the number of reference images which can be used for a current picture. Accordingly, only when the L0 reference list is sorted and the number of reference images which can be used for the current picture is greater than 2, the L0 reference list sorting order is included in the slice header.

Similarly, when the reference image is a B slice, that is, the L1 reference list can be used for the target picture, an L1 reference list sorting presence or absence flag (ref_pic_list_modification_flag_l1) is included in the reference list sorting information. When the value of this flag is 1 and NumPocTotalCurr is greater than 2, an L1 reference list sorting order (list_entry_l1[i]) is included in the reference list sorting information. In other words, only when the L1 reference is sorted and the number of reference images which can be used for the current picture is greater than 2, the L1 reference list sorting order is included in the slice header.

<Reference Image Set Construction Process>

The details of the reference image set derivation process based on each of the foregoing syntax values will be described. The reference image set derivation process is performed by the reference image list setting section 155 in the texture restoration section 15 in the embodiment.

The reference image set RPS used to decode the target picture is generated based on the RPS information and information recorded in the decoded image buffer 13. The reference image set RPS is a set of pictures (referable pictures) which can be used as the reference images at the time of the decoding in the target picture or a picture subsequent to the target picture in the decoding order on the same layer. The reference image set can be classified into the following two subsets according to the kinds of referable pictures:

- a current picture referable list ListCurr: a list of the referable pictures in the target picture among the pictures in the decoded image buffer; and
- a subsequent picture referable list ListFoll: a list of pictures which are not referred to in the target picture and can be referred to in the picture subsequent to the target picture in the decoding order in the decoded image buffer.

The number of pictures included in the current picture referable list is referred to as the number of current picture referable pictures NumCurrList. The above-described NumPocTotalCurr described with reference to FIG. 15 is the same as NumCurrList.

The current picture referable list is configured to include three partial lists:

- a current picture long-term referable list ListLtCurr: a current picture referable picture designated by the SPS long-term RP information or the SH long-term RP information;
- a current picture short-term front referable list ListStCurrBefore: a current picture referable picture designated by the SPS short-term RPS information or the SH short-term RPS information and earlier than the target picture in the display order; and
- a current picture short-term rear referable list ListStCurrAfter: a current picture referable picture designated by the SPS short-term RPS information or the SH short-term RPS information and earlier than the target picture in the display order.

The subsequent picture referable list is configured to include two partial lists:

- a subsequent picture long-term referable list ListLtFoll: a subsequent picture referable picture designated by the SPS long-term RP information or the SH long-term RP information; and
- a subsequent picture short-term referable list ListStFoll: a current picture referable picture designated by the SPS short-term RPS information or the SH short-term RPS information.

The reference image list setting section 155 generates the reference image set RPS, that is, the current picture short-term front referable list ListStCurrBefore, the current picture short-term rear referable list ListStCurrAfter, the current picture long-term referable list ListLtCurr, the subsequent picture short-term referable list ListStFoll, and the subsequent picture long-term referable list ListLtFoll in the following order. The variable NumPocTotalCurr indicating the number of current picture referable pictures is further derived. Each of the referable lists is assumed to be null before the following processes start.

(S201) The single short-term reference image set used to decode the target picture is specified based on the SPS short-term RPS information and the SH short-term RPS information. Specifically, when the value of short_term_ref_pic_set_sps included in the SH short-term RPS information is 0, the short-term RPS explicitly transmitted with the slice header included in the SH short-term RPS information is selected. In the otherwise case (when the value of short_term_ref_pic_set_sps is 1), the short-term RPS indicated by short_term_ref_pic_set_idx included in the SH short-term RPS information is selected from the plurality of short-term RPSs included in the SPS short-term RPS information.

(S202) The value of the POC of each reference image included in the selected short-term RPS is derived, and the position of the local decoded image recorded in association with the POC value in the decoded image buffer 13 is detected and is derived as a recording position of the reference image in the decoded image buffer.

When the reference image is the front short-term reference image, the value of the POC of the reference image is derived by subtracting the value of "delta_poc_s0_minus1[i]+1" from the value of the POC of the target picture. On the other hand, when the reference image is the subsequent short-term reference image, the value of the POC of the target picture is derived by adding the value of "delta_poc_s1_minus1[i]+1" to the value of the POC of the target picture.

(S203) The order in which the front reference images included in the short-term RPS are transmitted is confirmed, and the front reference images are added to the current picture short-term front referable list ListStCurrBefore when the value of the associated used_by_curr_pic_s0_flag[i] is 1. In the otherwise case (when the value of used_by_curr_pic_s0_flag[i] is 0), the front reference images are added to the subsequent picture short-term referable list ListStFoll.

(S204) The order in which the rear reference images included in the short-term RPS are transmitted is confirmed, and the rear reference images are added to the current picture short-term rear referable list ListStCurrAfter when the value of the associated used_by_curr_pic_s1_flag[i] is 1. In the otherwise case (when the value of used_by_curr_pic_s1_flag[i] is 0), the front reference images are added to the subsequent picture short-term referable list ListStFoll.

(S205) The long-term reference image set used to decode the target picture is specified based on the SPS long-term RP information and the SH long-term RP information. Specifically, the reference images of the number of num_long_term_sps are selected from the reference images included in the SPS long-term RP information and are added to the long-term reference image set in order. The selected reference images are the reference images indicated by lt_idx_sps[i]. Subsequently, the reference images of the number of num_long_term_pics and the reference images included in the SH long-term RP information are added to the long-term reference image set in order.

(S206) The value of the POC of each reference image included in the long-term reference image set is derived, and the position of the local decoded image recorded in association with the POC value in the decoded image buffer 13 is detected and is derived as a recording position of the reference image in the decoded image buffer.

The POC of the long-term reference image is directly derived from the value of the associatively decoded poc_lst_lt[i] or lt_ref_pic_poc_lsb_sps[i].

(S207) The reference images included in the long-term reference image set are confirmed in order, and the long-term reference images are added to the current picture long-term referable list ListLtCurr when the value of the associated used_by_curr_pic_lt_flag[i] or used_by_curr_pic_lt_sps_flag[i] is 1. In the otherwise case (when the value of used_by_curr_pic_lt_flag[i] or used_by_curr_pic_lt_ sps_flag[i] is 0), the long-term reference images are added to the subsequent picture long-term referable list ListLtFoll.

(S208) The value of the variable NumPocTotalCurr is set as the a sum of the current picture to the referable reference image. That is, the value of the variable NumPocTotalCurr is set as the sum of the number of elements of three lists, the current picture short-term front referable list ListStCurrBefore, the current picture short-term rear referable list ListStCurrAfter, and the current picture long-term referable list ListLtCurr.

<Reference Image List Construction Process>

The details of the reference image list construction process will be described. A reference image list derivation section generates the reference image list RPL based on the reference image set RPS and RPL modification information.

The reference image list is configured to include two lists, an L0 reference list and an L1 reference list. First, a construction order of the L0 reference list will be described. The L0 reference list is constructed in order indicated in S301 to S307 below.

(S301) The provisional L0 reference list is generated and is initialized to a null list.

(S302) The reference images included in the current picture short-term front referable list are added in order to the provisional L0 reference list.

(S303) The reference images included in the current picture short-term rear referable list are added in order to the provisional L0 reference list.

(S304) The reference images included in the current picture long-term referable list are added in order to the provisional L0 reference list.

(S305) When the reference image list is modified (the value of lists_modification_present_flag included in the RPL modification information is 1), the following processes of S306a to S306b are performed. Otherwise (the value of lists_modification_present_flag is 0), the process of S307 is performed.

(S306a) When the modification of the L0 reference image is valid (when the value of ref_pic_list_modification_flag_l0 included in the RPL modification information is 1) and a current picture referable picture number NumCurrList is equal to 2, S306b is performed. Otherwise, S306c is performed.

(S306b) The value of the list sorting order list_entry_l0[i] included in the RPL modification information is set according to the following expressions. Thereafter, S306c is performed.
list_entry_l0[0]=1
list_entry_l0[1]=0

(S306c) The elements of the provisional L0 reference list are sorted based on the value of the reference list sorting order list_entry_l0[i] and are set to an L0 reference list. The elements RefPicList0[rIdx] of the L0 reference list corresponding to the reference image index rIdx are derived according to the following expressions. Here, RefListTemp0[i] indicates an i-th element of the provisional L0 reference list.
RefPicList0[rIdx]=RefPicListTemp0[list_entry_l0[rIdx]]

According to the above expression, in the reference list sorting order list_entry_l0[i], the reference image recorded at the position of the above value in the provisional L0 reference list is stored as the reference image at the position of rIdx of the L0 reference list with reference to the value recorded at the position indicated by the reference image index rIdx.

(S307) The provisional L0 reference list is set as the L0 reference list.

Next, the L1 reference list is constructed. The L1 reference list can also be constructed in the same order as that of the L0 reference list. In the construction order (S301 to S307) of the L0 reference list, the L0 reference image, the L0 reference list, the provisional L0 reference list, list_entry_l0 may be substituted with the L1 reference image, the L1 reference list, the provisional L1 reference list, and list_entry_l1, respectively.

<Inter-Layer Reference Image Set Decoding Process>

The IL-RPS information (inter-layer reference image set information) is information decoded from the SPS or the slice header to construct the inter-layer reference image set. Since the target picture is a picture on the target layer (the enhancement layer), the SPS or the slice header in the following description means the SPS or the slice header referred to at the time of the decoding of the picture of the target layer (the enhancement layer). FIG. 16 is a diagram illustrating a part of an SPS syntax table (seq_parameter_set_rbsp) related to the IL-RPS information. The SPS includes an SPS inter-layer RPS estimation flag (sps_infer_inter_layer_rps_flag) and the number of inter-layer RPSs (num_inter_layer_ref_pic_sets) as syntax elements which are the IL-RPS information. As a syntax structure which is the IL-RPS information, inter-layer RPS (inter_layer_ref_pic_set(i)) is further included.

The SPS inter-layer RPS estimation flag is a flag indicating whether the inter-layer reference image set is estimated in the sequence to which the SPS is applied. When the value of the SPS inter-layer RPS estimation flag is 1, the SPS inter-layer RPS estimation flag indicates that the inter-layer reference image set is estimated. When the value of the SPS inter-layer RPS estimation flag is 0, the SPS inter-layer RPS estimation flag indicates the inter-layer reference image set is explicitly decoded from the coded data. When the inter-layer reference image set is estimated, for example, the inter-layer reference image set in each picture can be realized by copying the reference image set in the picture, of which the output order is the same as this picture, on the same reference layer. For example, by copying the reference image set in each picture, it is possible to also substitute the decoded images of the pictures on the enhancement layer included in the copied reference image set with the decoded images in the pictures on the reference layer of which the output order is the same.

The number of inter-layer RPSs indicates the number of pieces of inter-layer reference image set information included in the SPS. The SPS includes the number of pieces of inter-layer reference image set information which is the same as the number of inter-layer RPSs.

The inter-layer reference image set information will be described with reference to FIG. 17. FIG. 17 exemplifies a syntax table of an inter-layer reference image set (inter_layer_ref_pic_set) used at the time of the decoding of the SPS and the time of the decoding of the slice header.

The inter-layer reference image set information includes the number of inter-layer reference images (num_negative_il_pics) of which the display order is earlier than the target picture and the number of inter-layer reference images (num_positive_il_pics) of which the display order is later than the target picture. Hereinafter, the inter-layer reference image of which the display order is earlier than the target picture is referred to as a front inter-layer reference image and the inter-layer reference image of which the display order is later than the target picture is referred to as a rear inter-layer reference image.

The inter-layer reference image set information further includes an absolute value (delta_poc_il_s0_minus1[i]) of a POC difference of each front inter-layer reference image with respect to the target picture and presence or absence of a possibility (used_by_curr_pic_il_s0_flag[i]) of the target picture being usable as the inter-layer reference image. Here, num_negative_pics, delta_poc_il_s0_minus[i], and used_by_curr_pic_il_s0_flag[i] are inter-layer reference image set information indicating the front inter-layer reference image included in the inter-layer reference image set.

The inter-layer reference image set information further includes an absolute value (delta_poc_il_s1_minus1[i]) of a POC difference of each rear inter-layer reference image with respect to the target picture and presence or absence of a possibility (used_by_curr_pic_il_s1_flag[i]) of the target picture being usable as the inter-layer reference image. Here, num_positive_pics, delta_poc_il_s1_minus[i], and used_by_curr_pic_il_s1_flag[i] are inter-layer reference image set information indicating the rear inter-layer reference image included in the inter-layer reference image set.

The inter-layer reference image set information further includes a flag (il_col_pic_in_rps_flag) indicating whether the picture (same-time inter-layer reference image) on the reference layer of which the display order (POC) is the same as the target picture is included in the inter-layer reference image set. When the same-time inter-layer reference image is included in the inter-layer reference image set (when il_col_pic_in_rps_flag is 1), presence or absence of a possibility (used_by_curr_pic_il_col_flag) of the same-time inter-layer reference image being usable as the inter-layer reference image of the target picture is included. Here, il_col_pic_in_rps_flag and used_by_curr_pic_il_col_flag are inter-layer reference image set information indicating the same-time inter-layer reference image in the inter-layer reference image set.

The syntax table of the inter-layer reference image set information described above with reference to FIG. 17 has the following characteristics. That is, the first-half portion (a portion A in the drawing) of the inter-layer reference image set information includes the inter-layer reference picture information related to the picture of the reference layer excluding an inter-layer same-time picture. The syntax structure of the first-half portion is the same structure as the syntax structure of the short-term reference image set described with reference to FIG. 12. Here, the same structure means that syntax values can be decoded through the same parsing process. The second-half portion (a portion B in the drawing) includes the inter-layer reference picture information regarding the inter-layer same-time picture.

By using the syntax structure of the inter-layer reference image described above, a parsing process used for the short-term reference image set can be utilized in the parsing process on the first-half portion. Therefore, the advantage of simplifying mounting of the hierarchical moving image decoding device can be obtained.

In the example of the foregoing syntax structure, the POC is assumed to be used as a reference of the display time, but the present invention is not limited thereto. For example, when the display time can be associated directly with each picture, the differences of the display time may be set to the syntax values (delta_poc_il_s0_minus1 and delta_poc_il_s1_minus) indicating the POC differences.

FIG. 18 is a diagram illustrating a part of a slice header syntax table (seq_parameter_set_rbsp) related to the IL-RPS information. The IL-RPS information in the slice header includes information regarding the single inter-layer reference image set which can be used from the picture referring to the slice header.

The decoding of the IL-RPS information (SH-IL-RPS information) in the slice header will be described with reference to FIG. 18. FIG. 18 exemplifies a part of the slice header syntax used at the time of the decoding of the slice header. The SH-IL-RPS information is decoded when the inter-layer reference image set is not estimated (when sps_infer_inter_layer_rps_flag is 0). The SH-IL-RPS information includes a flag (il_ref_pic_set_sps_flag) indicating whether the inter-layer reference image set is selected from the inter-layer reference image sets decoded with the SPS or is explicitly included in the slice header. When the inter-layer reference image set is selected from the inter-layer reference image set decoded with the SPS, an identifier (il_ref_pic_set_idx) selecting one set from the decoded inter-layer reference image sets is included in the SH-IL-RPS information. When the inter-layer reference image set is included explicitly in the slice header, information corresponding to the syntax table (inter_layer_ref_pic_set( )) described above with reference to FIG. 17 is included in the SH-IL-RPS information.

<Inter-Layer Reference Image List Decoding Process>

Inter-layer reference image list correction information (IL-RPL correction information) is information included in the slice header and includes updating information regarding the length (inter-layer reference list length) of the inter-layer reference image list applied to the target picture and sorting information (inter-layer reference list sorting information) regarding the reference image list. The IL-RPL correction information will be described with reference to FIG. 20. FIG. 20 exemplifies a part related to the inter-layer reference image list information in the slice header syntax table used at the time of the decoding of the slice header.

A flag (num_il_ref_idx_active_override_flag) indicating presence or absence of updating of the list length is included as inter-layer reference list length updating information. Information (num_il_ref_idx_active_minus1) indicating the reference list length after the change in the inter-layer reference list is further included.

Information included in the slice header as the inter-layer reference list sorting information will be described with reference to FIG. 21. FIG. 21 exemplifies a syntax table of the inter-layer reference list sorting information used at the time of the decoding of the slice header.

The inter-layer reference list sorting information includes an inter-layer reference image list sorting presence or absence flag (il_ref_pic_list_modification_flag). When the value of the flag is 1 (when the inter-layer reference image list is sorted), an inter-layer reference image list sorting order (list_entry_il[i]) is included in reference image list sorting information.

<Inter-Layer Reference Image Set Construction Process>

The details of an inter-layer reference image set construction process based on each of the foregoing syntax values will be described. The reference image set derivation process is performed by the inter-layer reference image list setting section 156 in the texture restoration section 15 in the embodiment.

An inter-layer reference image set ILRPS used to decode the target picture is generated based on the IL-RPS information and the information recorded in the base decoded image buffer 17. The inter-layer reference image set ILRPS is a set (a set of inter-layer referable pictures) of the pictures on the reference layer usable as the base reference image at the time of the decoding in the target picture or the picture subsequent to the target picture in the decoding order on the subsequent target layer. The inter-layer reference image set can be classified into the following two subsets according to the kinds of inter-layer referable pictures:

a current inter-layer referable list ListIlCurr: a list of the inter-referable pictures in the target picture among the pictures in the base decoded image buffer; and a subsequent inter-layer referable list ListIlFoll: a list of pictures in the base decoded image buffer which are not referred to in the target picture and can be referred to in the picture subsequent to the target picture in the decoding order on the enhancement layer.

The number of pictures included in the current picture referable list is referred to as the number of current inter-layer referable pictures NumIlCurrList.

The current inter-layer referable list is configured to include three partial lists:

a current inter-layer front referable list ListIlCurrBefore: current inter-layer referable pictures which are designated by the IL-RPS information and earlier than the target picture in the display order;

a current inter-layer rear referable list ListIlCurrAfter: current inter-layer referable pictures which are designated by the IL-RPS information and earlier than the target picture in the display order; and a current inter-layer same-time referable picture list ListIlCurrCol: current inter-layer referable pictures which are designated by the IL-RPS information and of which the display order is the same as the target picture.

The subsequent inter-layer referable list is defined as follows:

a subsequent inter-layer referable list (ListIlFoll): subsequent inter-layer referable pictures designated by the IL-RPS information.

The inter-layer reference image list setting section 156 generates the inter-layer reference image set ILRPS, that is, the current inter-layer front referable list ListIlCurrBefore, the current inter-layer rear referable list ListIlCurrAfter, and the subsequent inter-layer referable list ListIlFoll in the following order. Further, a variable NumIlPocTotalCurr indicating the number of current inter-layer referable pictures is derived. Each of the foregoing inter-layer referable lists is assumed to be set to be empty before the following processes start.

(S401) The single inter-layer reference image set used to decode the target picture is specified based on the IL-RPS information decoded from the SPS and the slice header. Specifically, when the value of il_ref_pic_set_sps_flag included in the IL-RPS information of the IL-RPS information is 0, the inter-layer reference image set explicitly transmitted with the slice header is selected. In the otherwise case (when the value of il_ref_pic_set_sps_flag is 1), the inter-layer reference image set indicated by il_ref_pic_set_idx included in the IL-RPS information is selected from the plurality of inter-layer reference image sets included in the IL-RPS information decoded with the SPS.

(S402) The value of the POC of each inter-layer reference image included in the selected inter-layer reference image set is derived, and the position of the decoded image of the reference layer recorded in association with the POC value in the base decoded image buffer 17 is detected and derived as a recording position of the inter-layer reference image in the decoded image buffer.

When the inter-layer reference image is the front inter-layer reference image, the value of the POC of the inter-layer reference image is derived by subtracting the value of "delta_poc_il_s0_minus1[i]+1" from the value of the POC of the target picture. On the other hand, when the inter-layer reference image is the rear short-term reference image, the value of the POC of the reference image is derived by adding the value of "delta_poc_il_s1_minus1[i]+1" to the value of the POC of the target picture.

(S403) The front inter-layer reference images included in the inter-layer reference image set are confirmed in the transmission order, and the front inter-layer reference images are added to the current inter-layer front referable list ListIlCurrBefore when the value of the associated used_by_curr_pic_il_s0_flag[i] is 1. In the otherwise case (when the value of used_by_curr_pic_il_s0_flag[i] is 0), the front inter-layer reference images are added to the subsequent inter-layer referable list ListIlFoll.

(S404) The rear inter-layer reference images included in the inter-layer reference image set are confirmed in the transmission order, and the rear inter-layer reference images are added to the current inter-layer rear referable list ListIlCurrAfter when the value of the associated used_by_curr_pic_il_s1_flag[i] is 1. In the otherwise case (when the value of used_by_curr_pic_il_s1_flag[i] is 0), the front inter-layer reference images are added to the subsequent inter-layer referable list ListIlFoll.

(S405) The inter-layer reference images in the display order of the same time as the target picture included in the inter-layer reference image set are confirmed, and the inter-layer reference images are added to the current inter-layer same-time referable list ListIlCurrCol when the value of the associated used_by_curr_pic_il_col_flag is 1. In the otherwise case (when the value of used_by_curr_pic_il_col_flag is 0), the inter-layer reference images are added to the subsequent inter-layer referable list ListIlFoll.

(S406) The value of the variable NumIlPocTotalCurr is set to a sum of the inter-layer reference images which can be referred to from the current picture. That is, the value of the variable NumIlPocTotalCurr is set to a sum of the number of elements of the current inter-layer front referable list ListIlCurrBefore and the current inter-layer rear referable list ListIlCurrAfter.

The inter-layer reference image list setting section 156 can construct the inter-layer reference image set used to decode the target picture in the foregoing order based on the syntax associated with the inter-layer reference image set decoded by the variable-length decoding section 12. The syntax associated with the foregoing inter-layer reference image set and the inter-layer reference image list derivation process are merely examples. The inter-layer reference image list may be derived through another syntax or another construction process.

The inter-layer reference image set constructed in the foregoing order includes a set (a set of the inter-layer referable pictures) of the base decoded images likely to be used to decode the target picture or the picture subsequent to the target picture in the output order on the target layer. Therefore, the decoded image (the base decoded image) of the reference layer to be retained in the base decoded image buffer 17 at the time of the decoding of the target picture can be specified based on the inter-layer reference image set. Accordingly, by using the inter-layer reference image set and causing only the minimum necessary base decoded images to remain in the base decoded image buffer 17, it is possible to reduce the memory amount of the base decoded image buffer.

The inter-layer reference image set constructed in the foregoing order includes a set (the current inter-layer referable list) of the base decoded images likely to be used to decode the target picture. Therefore, the texture restoration section 15 can select the base reference image among the base decoded images included in the current inter-layer referable list and generates an inter-layer predicted image. Accordingly, since the predicted images close to the input images can be generated compared to a case in which the inter-layer predicted images are generated by using only the base decoded images in the same output order as the target picture as the base reference image, it is possible to reduce the coding amount of the prediction residual. As a result, it is possible to generate the hierarchically coded data of the target layer with a small coding amount.

<Inter-Layer Reference Image List Construction Process>

The details of an inter-layer reference image list construction process will be described. The inter-layer reference image list setting section 156 in the texture restoration section 15 generates an inter-layer reference image list ILRPL based on the inter-layer reference image set ILRPS and the IL-RPL correction information.

The inter-layer reference image list (IL reference list) is constructed in the order of the following S501 to S507.

(S501) A provisional IL reference list is generated and initialized to an empty list.

(S502) The reference images included in the current inter-layer same-time referable list are added in order to the provisional IL reference list.

(S503) The reference images included in the current inter-layer front referable list are added in order to a provisional IL reference list.

(S504) The reference images included in the current inter-layer rear referable list are added in order to the provisional IL reference list.

(S505) When the inter-layer reference image list is corrected (when the value of lists_modification_present_flag included in the RPL correction information is 1), the following process of S506 is performed. In the otherwise case (when the value of lists_modification_present_flag is 0), the process of S507 is performed.

(S506) The elements of the provisional IL reference list are sorted based on the value of the inter-layer reference list sorting order list_entry_il[i] and are set to an IL reference list. The elements RefPicListIl[rIdx] of the IL reference list corresponding to the reference image index rIdx are derived according to the following expressions. Here, RefListTempIl[i] indicates an i-th element of the provisional IL reference list.

RefPicListIl[rIdx]=RefPicListTempIl[list_entry_Il[rIdx]]

According to the above expression, in the inter-layer reference list sorting order list_entry_il[i], the inter-layer reference image recorded at the position of the above value in the provisional IL reference list is stored as the inter-layer reference image at the position of rIdx of the IL reference list with reference to the value recorded at the position indicated by the reference image index rIdx. Thereafter, the process ends.

(S507) The provisional IL reference list is set as the IL reference list. Thereafter, the process ends.

The inter-layer reference image list constructed in the foregoing order is a list which is included in the inter-layer reference image set and in which the base decoded images included in the set (the current inter-layer referable list) of the base decoded images likely to be used to decode the target picture are sorted allowing duplication. Therefore, by constructing the inter-layer reference image list such that the base reference images with a high selection frequency have higher priority, and then by allocating shorter codes to the prediction parameters in the case of selection of the base reference images with the higher priority on the inter-layer reference image list than the prediction parameters in the case of selection of the base reference images with lower priority, the base decoded images with the high selection frequency can be selected with the prediction parameters of the shorter codes. Therefore, it is possible to reduce the coding amount of the hierarchically coded data.

Figure 5:
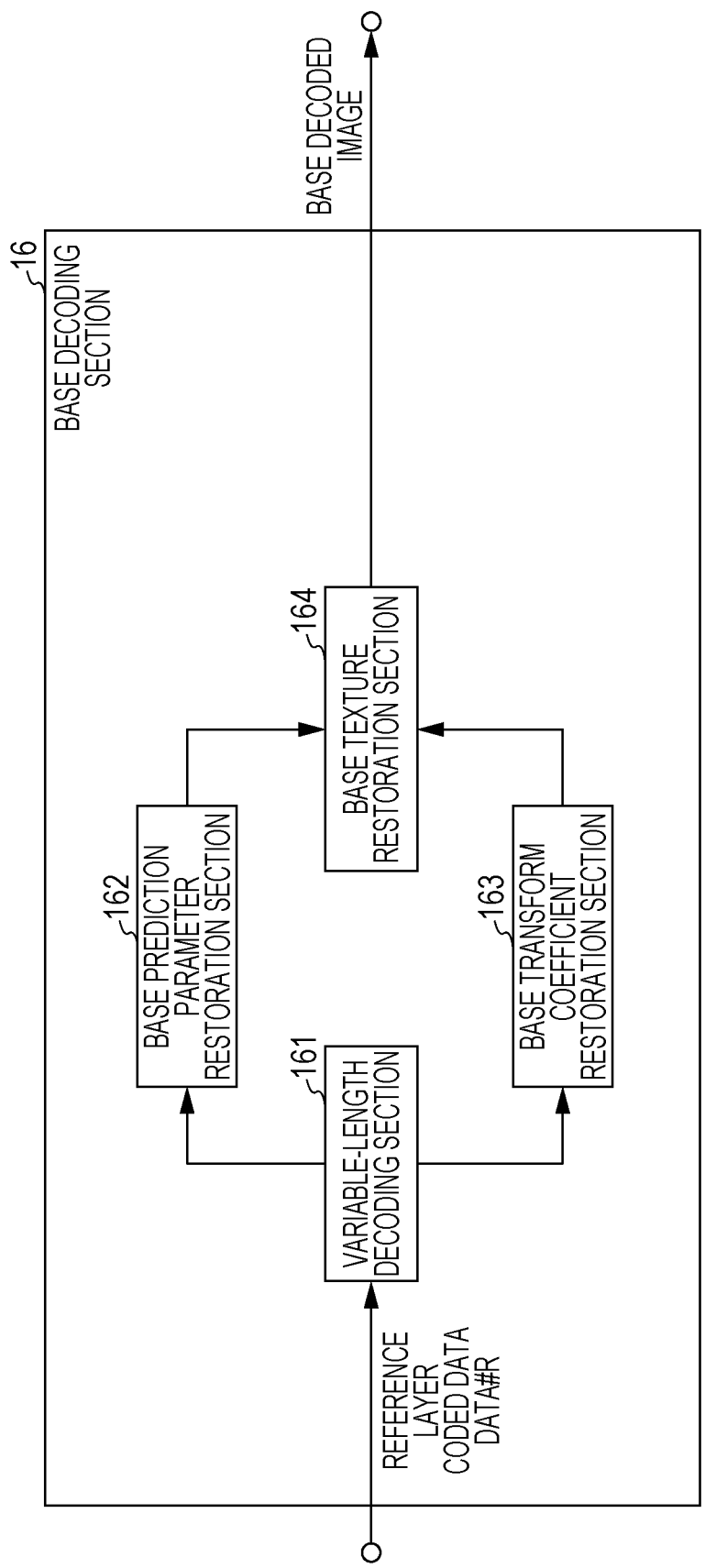
FIG. 5 is a functional block diagram exemplifying the configuration of a base decoding section included in the hierarchical moving image decoding device.

The detailed configuration of the base decoding section 16 will be described with reference to FIG. 5. FIG. 5 is a functional block diagram exemplifying the configuration of the base decoding section 16.

As illustrated in FIG. 5, the base decoding section 16 includes a variable-length decoding section 161, a base prediction parameter restoration section 162, a base transform coefficient restoration section 163, and a base texture restoration section 164.

The variable-length decoding section 161 decodes various syntax values from binary included in the reference layer coded data DATA#R.

Specifically, the variable-length decoding section 161 decodes the prediction information and the transform coefficient information from the coded data DATA#R. Since the syntax of the prediction information and the transform coefficient decoded by the variable-length decoding section 161 is the same as the syntax of the variable-length decoding section 12, the detailed description thereof will be omitted herein.

The variable-length decoding section 161 supplies the decoded prediction information to the base prediction parameter restoration section 162 and supplies the decoded transform coefficient information to the base transform coefficient restoration section 163.

The base prediction parameter restoration section 162 restores the base prediction parameters based on the prediction information supplied from the variable-length decoding section 161. Since a method of restoring the base prediction parameters by the base prediction parameter restoration section 162 is the same as the method of the prediction parameter restoration section 14, the detailed description thereof will be omitted herein. The base prediction parameter restoration section 162 supplies the restored base prediction parameters to the base texture restoration section 164.

The base transform coefficient restoration section 163 restores the transform coefficient based on the transform coefficient information supplied from the variable-length decoding section 161. Since a method of restoring the transform coefficient by the base transform coefficient restoration section 163 is the same as the method of the inverse orthogonal transform and inverse quantization section 151, the detailed description thereof will be omitted herein. The base transform coefficient restoration section 163 supplies the restored base transform coefficient to the base texture restoration section 164.

The base texture restoration section 164 generates a decoded image by using the base prediction parameters supplied from the base prediction parameter restoration section 162 and the base transform coefficient supplied from the base transform coefficient restoration section 163. Specifically, the base texture restoration section 164 performs the same texture prediction as the texture prediction section 152 based on the base prediction parameters to generate a predicted image. The base texture restoration section 164 generates a prediction residual based on the base transform coefficient and generates a base decoded image by adding the generated prediction residual and the predicted image generated through the texture prediction.

The base texture restoration section 164 may perform the same filtering process as the loop filter section 154 on the base decoded image. The base texture restoration section 164 may further include a frame memory storing the decoded base decoded image and may refer to the decoded base decoded image stored in the frame memory in the texture prediction.

(Advantageous Effects of Hierarchical Moving Image Decoding Device 1)

The hierarchical moving image decoding device 1 according to the embodiment described above includes the inter-layer reference image list setting section that derives the inter-layer reference image set. Accordingly, the hierarchical moving image decoding device 1 can use the inter-layer reference image set to reproduce the decoded image of the target picture from the coded data coded with the small coding amount by using the predicted image generated by the use of the decoded image of the reference layer of which the display order is different from the decoding target picture. By using the inter-layer reference image set, it is possible to specify a timing so that the decoded image of the reference layer is not used to generate the predicted image of the target layer and to erase the base decoded image from the base decoded image buffer. Therefore, it is possible to reduce the memory amount.

Modification Example 1: Inter-Layer Reference Image Set Decoding Process 2: Signaling of Difference from Short-Term RPS In the description of the foregoing hierarchical moving image decoding device 1, the method of signaling the IL-RPS information with reference to FIGS. 16, 17, and 18 apart from the RPS information (the reference image set information) has been described. However, information corresponding to a difference between the reference image set and the inter-layer reference image set may be used as the IL-RPS information. This example will be described with reference to FIG. 19. FIG. 19 exemplifies a part of a slice header syntax table used at the time of the decoding of the slice header. The SH-IL-RPS information is decoded when the inter-layer reference image set is not estimated (when sps_infer_inter_layer_rps_flag is 0). For each front short-term reference image of the number of front short-term reference images (num_negative_pics) of the reference image set applied to the target slice, a flag (pic_s0_in_il_rps_flag[i]) indicating whether the picture corresponding to the front short-term reference image on the reference layer is included in the inter-layer reference image set is decoded as the IL-RPS information. When the flag is included (when pic_s0_in_il_rps_flag[i] is 1), presence or absence of a possibility (used_by_curr_pic_il_s0_flag[i]) of the front short-term reference image being used as the inter-layer reference image to decode the target picture is decoded. Similarly, for each rear short-term reference image of the number of rear short-term reference images (num_positive_pics) of the reference image set applied to the target slice, a flag (pic_s1_in_il_rps_flag[i]) indicating whether the picture corresponding to the rear short-term reference image on the reference layer is included in the inter-layer reference image set is decoded. When the flag is included (when pic_s1_in_il_rps_flag[i] is 1), presence or absence of a possibility (used_by_curr_pic_il_s1_flag[i]) of the rear short-term reference image being used as the inter-layer reference image to decode the target picture is decoded.

The foregoing method of signaling the IL-RPS information can be expressed schematically as follows. That is, for each reference image included in the reference image set in the target picture, the flag indicating whether the picture of the reference layer corresponding to the reference image (of which the display order is the same) is included in the inter-layer reference image set is decoded. When the flag is included, the flag indicating the presence or absence of the possibility of the picture of the reference layer being used to decode the target picture is further decoded.

When the IL-RPS information is signaled by this method, the picture of the reference layer which can be included in the inter-layer reference image set is restricted by including the picture of the enhancement layer of which the display time is the same in the reference image set. In other words, when the picture of the specific enhancement layer is not included in the reference image set, it can be determined that the picture of the reference layer of which the display time is the same as the picture of the enhancement layer is not included in the inter-layer reference image set even when the inter-layer reference image set information is not decoded from the parameter set. Accordingly, since the hierarchical moving image decoding device can erase the pictures of some of the reference layers from the inter-layer reference image buffer without decoding the inter-layer reference image set information from the parameter set, it is possible to simplify the decoding process.

[Hierarchical Moving Image Coding Device]

Hereinafter, the configuration of the hierarchical moving image coding device 2 according to the embodiment will be described with reference to FIGS. 22 and 23.

(Configuration of Hierarchical Moving Image Coding Device)

The schematic configuration of the hierarchical moving image coding device 2 will be described with reference to FIG. 22 as follows. FIG. 22 is a functional block diagram illustrating the schematic configuration of the hierarchical moving image coding device 2. The hierarchical moving image coding device 2 codes the input image PIN#T of the target layer with reference to the reference layer coded data DATA#R to generate the hierarchically coded data DATA of the target layer. The reference layer coded data DATA#R is assumed to be coded by the hierarchical moving image coding device corresponding to the reference layer.

Figure 22:
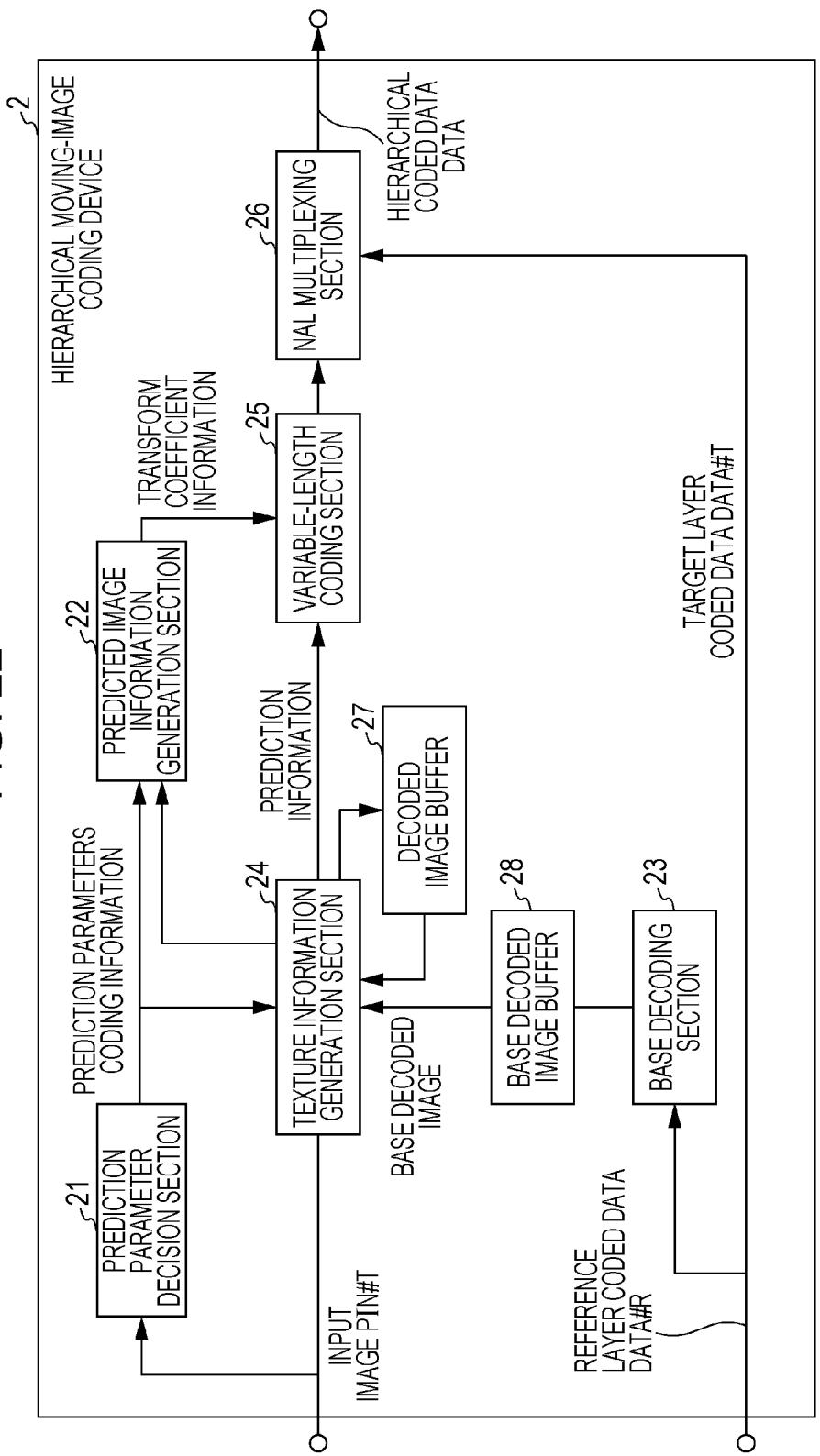
FIG. 22 is a functional block diagram illustrating a schematic configuration of a hierarchical moving image coding device according to an embodiment of the present invention.
Figure 23:
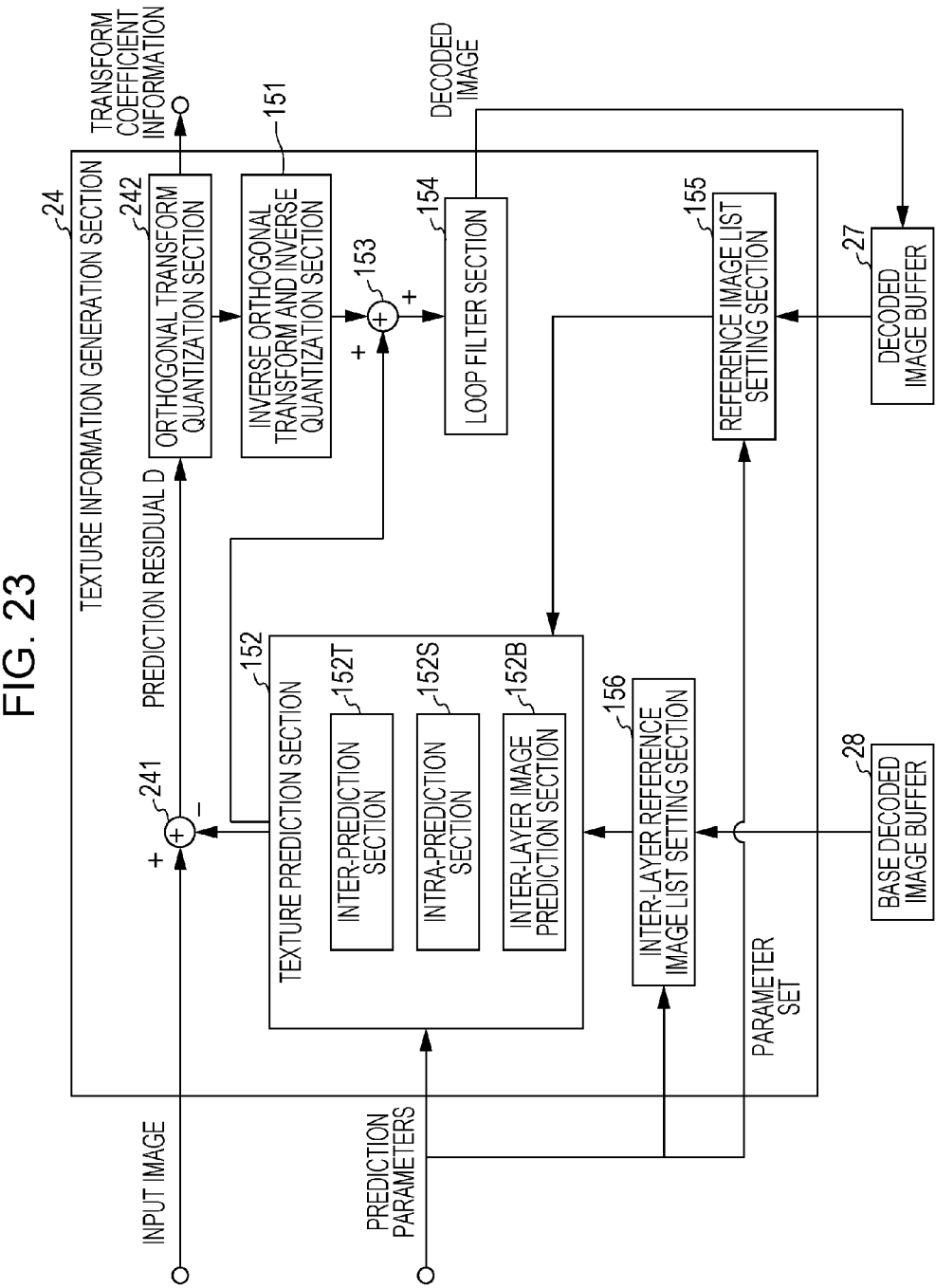
FIG. 23 is a functional block diagram illustrating a schematic configuration of a texture information generation section included in the hierarchical moving image coding device.

As illustrated in FIG. 22, the hierarchical moving image coding device 2 includes a prediction parameter decision section 21, a prediction information generation section 22, a base decoding section 23, a texture information generation section 24, a variable-length coding section 25, an NAL multiplexing section 26, a decoded image buffer 27, and a base decoded image buffer 28.

The prediction parameter decision section 21 decides the prediction parameters and other setting of the coding used to predict the predicted image based on the input image PIN#T.

The prediction parameter decision section 21 performs the setting of the coding as well as the prediction parameters as follows.

First, the prediction parameter decision section 21 generates a CU image for a target CU by splitting the input image PIN#T sequentially in the slice unit, the CTU unit, and the CU unit.

The prediction parameter decision section 21 generates coding information (also referred to as header information) based on the result of the splitting process. The coding information includes (1) CTU information which is information regarding the size and the shape of the CUT belonging to the target slice and the position of the CUT in the target slice, and (2) CU information which is information regarding the size and the shape of the CU belonging to each CTU and the position of the CU in the target tree block.

The prediction parameter decision section 21 derives a CU prediction type of the target CU, splitting information of the target CU into the PU, and prediction parameters (an inter-layer prediction flag and a spatial prediction mode when the target CU is the intra-CU, and a motion compensation parameter when the target CU is the inter-CU) with reference to the CU image, the CTU information, and the CU information.

The prediction parameter decision section 21 calculates costs of all the combinations of (1) a prediction type of the target CU, (2) a possible splitting pattern of the target CU into each PU, and (3) a prediction mode allocatable to each PU (for example, the inter-layer prediction flag, the spatial prediction mode, the skip flag, and the motion compensation parameter), and decides the prediction type, the splitting pattern, and the prediction mode of the minimum cost.

The prediction parameter decision section 21 derives the parameter set based on predesignated information. The parameter set includes a relation between the coding order and the display order of the pictures, or the reference image set and the reference image list decided by the reference structure of the picture in the same layer. The parameter set includes a relation between the coding order and the display order of the pictures of a coding target layer and a reference layer, or the inter-layer reference image set and the inter-layer reference image list decided by the reference structure of the pictures between the layers.

The prediction parameter decision section 21 supplies the coding information and the prediction parameters to the prediction information generation section 22 and the texture information generation section 24. Although not illustrated to simplify the description, the foregoing setting of the coding decided by the prediction parameter decision section 21 can be referred to in each section of the hierarchical moving image coding device 2.

The prediction information generation section 22 generates the prediction information including the syntax values regarding the prediction parameters based on the prediction parameters supplied from the prediction parameter decision section 21. The prediction information generation section 22 supplies the generated prediction information to the variable-length coding section 25.

Since the base decoding section 23 is the same as the base decoding section 16 of the hierarchical moving image decoding device 1, the description thereof will be omitted herein. The decoded image of the reference layer output from the base decoding section 23 is recorded in the base decoded image buffer 28.

The texture information generation section 24 generates the transform coefficient information including the orthogonally quantized transform coefficient and the prediction residual obtained by subtracting the predicted image from the input image PIN#T. The texture information generation section 24 supplies the generated transform coefficient information to the variable-length coding section 25. The texture information generation section 24 stores the restored decoded image in the decoded image buffer 27.

The variable-length coding section 25 generates the target layer coded data DATA#T by performing variable-length coding on the prediction information and the parameter set information supplied from the prediction information generation section 22 and the transform coefficient information supplied from the texture information generation section 24.

The variable-length coding section 25 supplies the generated target layer coded data DATA#T to the NAL multiplexing section 26.

The NAL multiplexing section 26 generates the hierarchical moving image coded data DATA subjected to the NAL multiplexing by storing the target layer coded data DATA#T supplied from the variable-length coding section 25 and the reference layer coded data DATA#R in the NAL unit, and outputs the hierarchical moving image coded data DATA to the outside.

(Texture Information Generation Section)

The details of the texture information generation section 24 will be described with reference to FIG. 23. FIG. 23 is a functional block diagram illustrating the schematic configuration of the texture information generation section 24 in the hierarchical moving image coding device 2. The texture information generation section 24 includes an adder 241 and an orthogonal transform quantization section 242. The texture information generation section 24 further includes common constituent elements to the texture restoration section 15 of the hierarchical moving image decoding device 1, that is, the inverse orthogonal transform and inverse quantization section 151, the texture prediction section 152, the adder 153, the loop filter section 154, the reference image list setting section 155, and the inter-layer reference image list setting section 156. The same reference numerals are given to the common constituent elements to the texture restoration section and the description thereof will be omitted.

The adder 241 generates the prediction residual D by subtracting the predicted image supplied from the texture prediction section 152 from the input image.

The orthogonal transform quantization section 242 applies orthogonal transform (for example, discrete cosine transform (DCT)) on the prediction residual D supplied from the adder 241 (1), applies quantization to the DCT coefficient obtained through the orthogonal transform (2), and outputs the quantized DCT coefficient subjected to the quantization as the transform coefficient information to the outside and supplies the quantized DCT coefficient to the inverse orthogonal transform and inverse quantization section 151 (3). The orthogonal transform is applied by using the transform block as a unit.

An order of a process of generating the transform coefficient information and the decoded image by using a specific picture on the target layer (the enhancement layer) as the target picture in the texture information generation section 24 is performed in the following S701 to S708.

(S701) The reference image list setting section 155 generates the reference image list used to generate the predicted image in the target picture based on the information (the reference image set information and the reference image list correction information) regarding the parameter set included in the input prediction parameters, and outputs the reference image list to the texture prediction section 152. The reference image list includes information used to specify the position of the reference image referred from the inter-prediction section 152T in the texture prediction section 152 in the decoded image buffer 27.

(S702) The inter-layer reference image list setting section 156 generates the inter-layer reference image list used to generate the predicted image in the target picture based on the information (the layer reference image set information and the inter-layer reference image list correction information) regarding the parameter set included in the input prediction parameters, and outputs the inter-layer reference image list to the texture prediction section 152. The inter-layer reference image list includes information used to specify the position of the inter-layer reference image referred from the inter-layer image prediction section 152S in the texture prediction section 152 in the inter-layer decoded image buffer 28.

(S703) The texture prediction section 152 generates the predicted image corresponding to a partial region of the input image according to the prediction unit indicated by the input prediction parameter and the prediction method and outputs the predicted image to the adders 241 and 153. The predicted image is generated according to the prediction type by the prediction section among the inter-prediction section 152T, the intra-prediction section 152S, and the inter-layer image prediction section 152B.

(S704) The adder 241 generates the prediction residual D by subtracting the predicted image input from the texture prediction section 152 from the region of the corresponding input image and outputs the prediction residual D to the orthogonal transform quantization section 242.

(S705) The orthogonal transform quantization section 242 generates the quantized transform coefficient by splitting the input prediction residual D into the transform blocks and by applying the orthogonal transform and the quantization for each transform block, and outputs the quantized transform coefficient as the transform coefficient information to the outside and the inverse orthogonal transform and inverse quantization section 151.

(S706) The inverse orthogonal transform and inverse quantization section 151 generates the prediction residual by applying the inverse quantization and the inverse orthogonal transform to the input quantized transform coefficient in the transform block unit and outputs the prediction residual to the adder 153.

(S707) The adder 153 adds the input predicted image and the prediction residual and outputs the obtained decoded image before the application of the loop filter to the loop filter section 154.

(S708) The loop filter section 154 generates the decoded image by applying the loop filter to the input decoded image before the application of the loop filter and records the decoded image in the external decoded image buffer 27 in association with the output order (POC) of the target picture.

(Advantageous Effects of Moving Image Coding Device 2)

The hierarchical moving image coding device 2 according to the embodiment described above includes the inter-layer reference image list setting section that derives the inter-layer reference image set. The hierarchical moving image coding device 2 can specify a timing at which the decoded image of the reference layer is not used to generate the predicted image by using the inter-layer reference image set and erase the decoded image from the base decoded image buffer. Therefore, it is possible to reduce the memory amount. The moving image coding device can generate the coded data for which the memory amount can be reduced by specifying a timing at which the decoded image of the reference layer is not used to generate the predicted image by using the inter-layer reference image set at the time of the decoding in the corresponding moving image decoding device and by erasing the decoded image from the base decoded image buffer.

Hierarchical Moving Image Decoding Device
(Second Embodiment)

Figure 24:
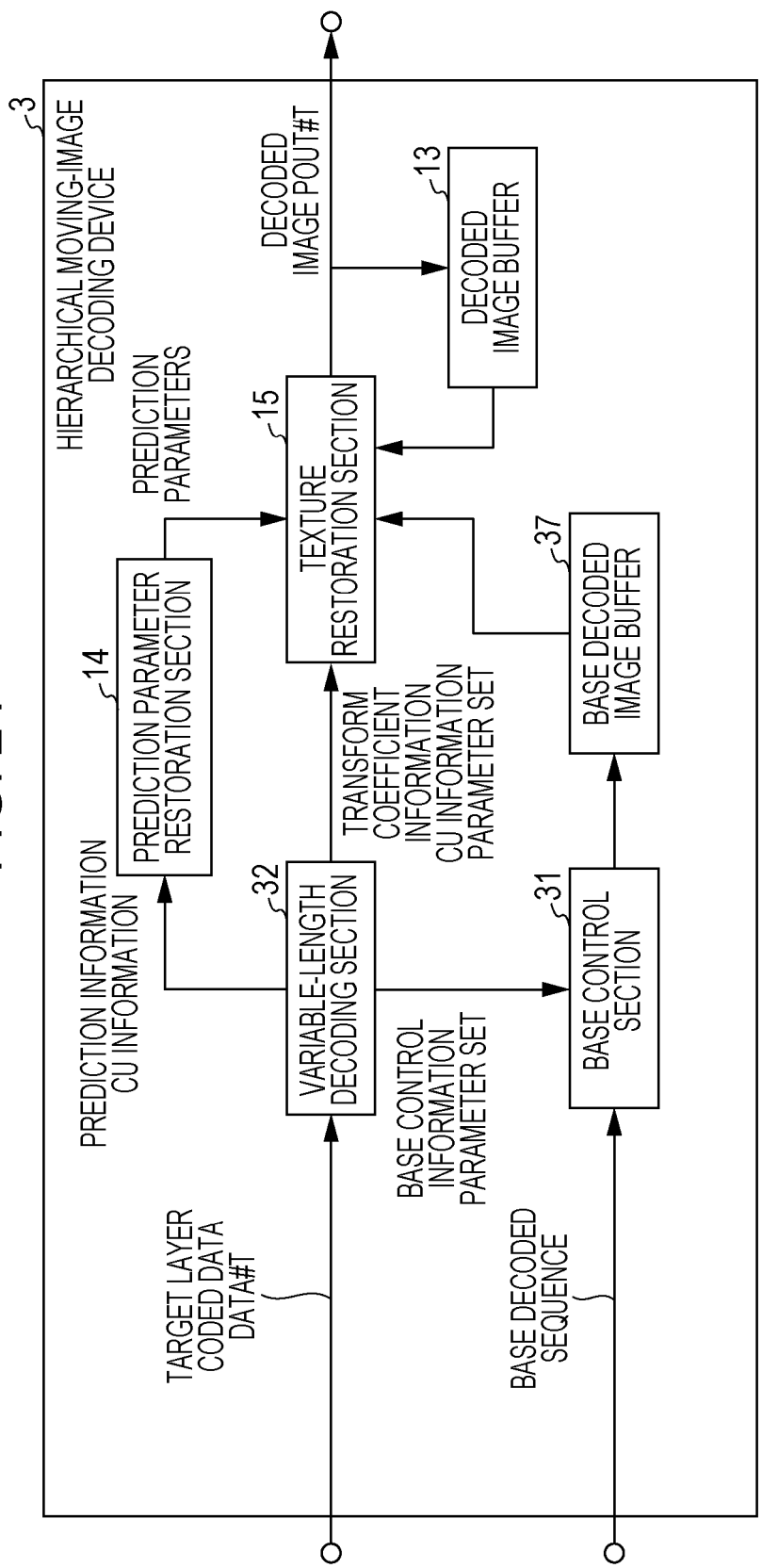
FIG. 24 is a functional block diagram illustrating a schematic configuration of a hierarchical moving image decoding device according to another embodiment of the present invention.

Hereinafter, a hierarchical moving image decoding device 3 according to an embodiment will be described with reference to FIGS. 24 to 27. FIG. 24 is a functional block diagram illustrating the schematic configuration of the hierarchical moving image decoding device 3 which decodes the target layer decoded image POUT#T when the target layer coded data DATA#T and the base decoded sequence are input. The base decoded sequence is a sequence of the decoded images of the reference layer and includes the plurality of decoded images of the picture of the reference layer corresponding to the picture of the target layer. The base decoded sequence may include a base picture header of each picture. The base picture header includes information regarding a display time (time stamp) of the decoded image.

As illustrated in FIG. 24, the hierarchical moving image decoding device 3 includes a base control section 31, a variable-length decoding section 32, a decoded image buffer 13, a prediction parameter restoration section 14, a texture restoration section 15, and a base decoded image buffer 37.

The hierarchical moving image decoding device 3 is different from the hierarchical moving image decoding device 1 to which the hierarchically coded data is input in that the base decoding section is not provided therein and the reference layer coded data included in the hierarchically coded data may not be decoded. Instead, an image decoded by external means is input and used as a decoded image (base decoded image) of a reference layer. Therefore, the hierarchical moving image decoding device 3 can also be used when an external decoding device to decode coded data coded according to a known codec (for example, AVC or MPEG-2) and a sequence of the output decoded images is input as a base decoded sequence.

Of the constituent elements of the hierarchical moving image decoding device 3, the prediction parameter restoration section 14, the texture restoration section 15, and the decoded image buffer 13 have the same functions as the constituent elements with the same names in the hierarchical moving image decoding device 1. Therefore, the same reference numerals are given and the description thereof will be omitted.

(Base Decoded Image Buffer)

The base decoded image buffer 37 is a buffer that retains the base decoded images input from the outside in association with the display order (POC) of the picture in a target layer (enhancement layer). The base decoded image buffer 37 necessarily records at least the base decoded images used for the texture restoration section 15 to generate the predicted image at the time of the decoding of the target picture in the target layer. From the viewpoint of suppressing the memory amount, only the base decoded images used for the decoding of the target layer (the enhancement layer) are recorded in the base decoded image buffer 37. However, the base decoded image not used to generate the predicted image may be recorded in the base decoded image buffer 37.

The description will be made below on the assumption that the base decoded image recorded in the base decoded image buffer 37 has the same picture size as the picture included in the base decoded sequence. However, the picture transformed with another picture size (for example, the picture size of the target layer) may be recorded as the base decoded image in the base decoded image buffer 37. In this case, it is necessary to perform a process of performing upsampling on the decoded images included in the base decoded sequence according to a ratio of the picture size of the target layer to the picture size of the reference layer.

(Variable-Length Decoding Section)

Basically, the variable-length decoding section 32 has the same function as the variable-length decoding section 12 of the hierarchical moving image decoding device 1. That is, the prediction information, the CU information, and the parameter set are decoded from the input coded data and are output to a proper output destination. Further, the variable-length decoding section 32 decodes the base control information from the target layer coded data DATA#T and outputs the base control information. The parameter set includes the inter-layer reference image set described in the hierarchical moving image decoding device 1.

Hereinafter, the description will be made on the assumption that the base control information is included in the SPS which is one of the parameter sets. The base control information is not necessarily be included in the SPS and may be included in another parameter set. For example, the base control information may be included in the VPS which is one of the parameter sets.

The base control information includes information indicating characteristics of the base decoded sequence. The base control information (BLI) includes the followings.

(BLI1) the size of the base decoded image: an amount directly or indirectly indicating the picture size of the base decoded image. As the amount directly indicating the picture size, a length in units of the vertical and horizontal pixels of a luminance component of the base decoded image and a length in units of the vertical and horizontal pixels of a chroma component of the base decoded image can be exemplified. A logarithm 2 in the vertical and horizontal lengths may be used. As the amount indirectly indicating the picture size, a ratio of the picture size of the target layer (the enhancement layer) to the picture size of the reference layer can be exemplified.

(BLI2) a bit depth of the base decoded image: an amount directly or indirectly indicating a bit depth of the base decoded image. As the amount directly indicating the bit depth, a bit depth of a pixel value common to the luminance and the chroma component of the base decoded image can be exemplified. As the amount indirectly indicating the bit depth, a difference between the bit depth of the target layer (the enhancement layer) and the bit depth of the reference layer can be exemplified.

(BLI3) a color format of the base decoded image: an amount directly or indirectly indicating the color format of the base decoded image. For example, a known color format identifier can be used. A flag indicating whether the color format of the target layer (the enhancement layer) is the same as the color format of the reference layer may be used.

(BLI4) a frame rate of the base decoded image: an amount directly or indirectly indicating the frame rate of the base decoded image. An example of the amount directly indicating the frame rate includes the number of pictures per second in the reference layer decoded image. As the amount indirectly indicating the frame rate, a ratio of the frame rate of the target layer (the enhancement layer) to the frame rate of the reference layer can be exemplified. Information indicating how many pictures of the target layer (the enhancement layer) correspond to one picture of the reference layer may be used as the assumption that the frame rate of the reference layer is less than the frame rate of the target layer (the enhancement layer). For example, when the target layer (the enhancement layer) is 60 fps and the reference layer is 30 fps, two pictures of the target layers (the enhancement layer) correspond to one picture of the reference layer. Therefore, "2" can be used as the information regarding the frame rate of the base decoded image.

(BLI5) a field frame structure of the base decoded image: an amount directly or indirectly indicating the field frame structure of the base decoded image. For example, an example of the amount directly or indirectly indicating the field frame structure includes a flag indicating whether the base decoded image is an interlacing format. When the base decoded image is the interlacing format, a flag indicating which field is a destination between an odd field and an even field may be included. Even when each picture of the input base decoded sequence has the frame structure, a flag indicating whether the picture is coded by interlacing in the reference layer coded data may be included. As a similar concept, information indicating that a plurality of images represented in frame packing of a stereo image are included in one picture may be included or information regarding arrangement of the plurality of image in the picture may be included.

(BLI6) an origin codec of the base decoded image: information specifying a coding scheme used to generate the reference layer coded data corresponding to the base decoded sequence. For example, a flag indicating whether the base decoded sequence is decoded from the coded data of AVC and a flag indicating whether the base decoded sequence is decoded from the coded data of MPEG-2 can be exemplified. Further, information indicating a subset of a coding scheme such as a profile or a level may be included. When the coding scheme is defined as a standard, it is preferable to include the information indicating the subset of the coding scheme in the target layer coded data in the same format as the format included in a bit stream of the coded data coded by the standard based on compatibility or mounting.

(BLI7) error check of the base decoded image: Information related to the nature of the base decoded sequence intended by an encoder (the hierarchical moving image coding device) may be included. For example, checksum represented by MD5 of each base decoded image may be included. By using the checksum of the base decoded image, it is possible to determine legitimacy of the reference layer in the hierarchical moving image decoding device.

The base control information may not necessary include all of the above-exemplified information and may include at least some of the information. For example, when restriction is put in advance so that the same bit depth is used between the target layer (the enhancement layer) and the reference layer, it is not necessary to include the information related to the bit depth.

A specific example of the base control information will be described with reference to FIG. 25. FIG. 25 is a diagram exemplifying a part of a syntax table (seq_parameter_set_rbsp) referred to at the time of the decoding of the SPS of the enhancement layer by the variable-length decoding section 32 and a portion corresponding to the base control information.

In FIG. 25, the SPS includes a flag (sps_extension_flag) indicating whether the SPS is the SPS of the enhancement layer. When the flag is 1, the SPS includes a flag (no_base_sps_flag) indicating whether the SPS corresponding to the reference layer is present. When no_base_sps_flag is 1, the SPS further includes various kinds of base control information. When no_base_sps_flag is 0, the SPS corresponding to the reference layer is present, and thus the information corresponding to the base control information may be copied or derived from the SPS corresponding to the reference layer. Accordingly, by using the flag indicating whether the SPS is the SPS of the enhancement layer, the base control information can be omitted when the SPS of the enhancement layer is present, thereby reducing the coding amount of the SPS.

In FIG. 25, the control information included in the SPS includes the following syntax.

Syntax corresponding to BLI1: syntax (base_recon_luma_width) indicating the number of pixels in the horizontal direction of a luminance picture of the base decoded image and syntax (base_recon_luma_height) indicating the number of pixels in the vertical direction of the same luminance picture.

Syntax corresponding to BLI2: syntax (base_delta_bit-depth) indicating a value obtained by subtracting a bit depth of the reference layer from the bit depth of the target layer (the enhancement layer).

Syntax corresponding to BLI3: a color format identifier (base_color_format_idc) of the reference layer decoded image. For example, identifiers and color formats of "0" and 4:2:0, "1" and 4:2:2, and "2" and 4:4:4 correspond to each other.

Syntax corresponding to BLI4: logarithm 2 (log 2_base_framerate_factor_idc) of the number of a plurality of decoded images of the target layer (enhancement layer) corresponding to one picture of the reference layer. To prevent complication of the hierarchical moving image decoding device, the frame rate of the target layer which is a higher layer is preferably the same as the frame rate of the reference layer which is a lower layer, or is preferably a value obtained by multiplying the frame rate of the lower layer by a power of two. In this case, as described above, the number of pictures of the enhancement layer using the picture of the reference layer as a reference is preferably expressed by a logarithm.

Syntax corresponding to BLI5: a flag (base_frame_flag) indicating whether the reference layer has a frame structure. When the value of base_frame_flag is 1, the flag indicates that the base decoded image has the frame structure (non-interlacing structure). When the value of base_frame_flag is 0, the flag indicates the base decoded image has an interlacing structure.

syntax corresponding to BLI6: an identifier (base_codec_idc) indicating a codec of the reference layer. For example, the identifier "1" corresponds to HEVC, the identifier "2" corresponds to AVC, the identifier "3" corresponds to MPEG-2, and the identifier "0" corresponds to an "unclear codec". When the codec of the reference layer is AVC (case of base_codec_idc=AVC_CODEC), a syntax structure avc_profile_level_info( ) which is the same as the profile level information in the AVC standard is included.

Hereinafter, the description will be described on the assumption that the base control information illustrated in FIG. 25 is used to facilitate the description.
(Base Control Section)

The base control section 31 sets the input base decoded sequence at a proper position of the base decoded image buffer 37 based on the input base control information and parameter set. The base control section 31 erases the unnecessary base decoded image from the base decoded image buffer 37 at a proper timing.

Figure 26:
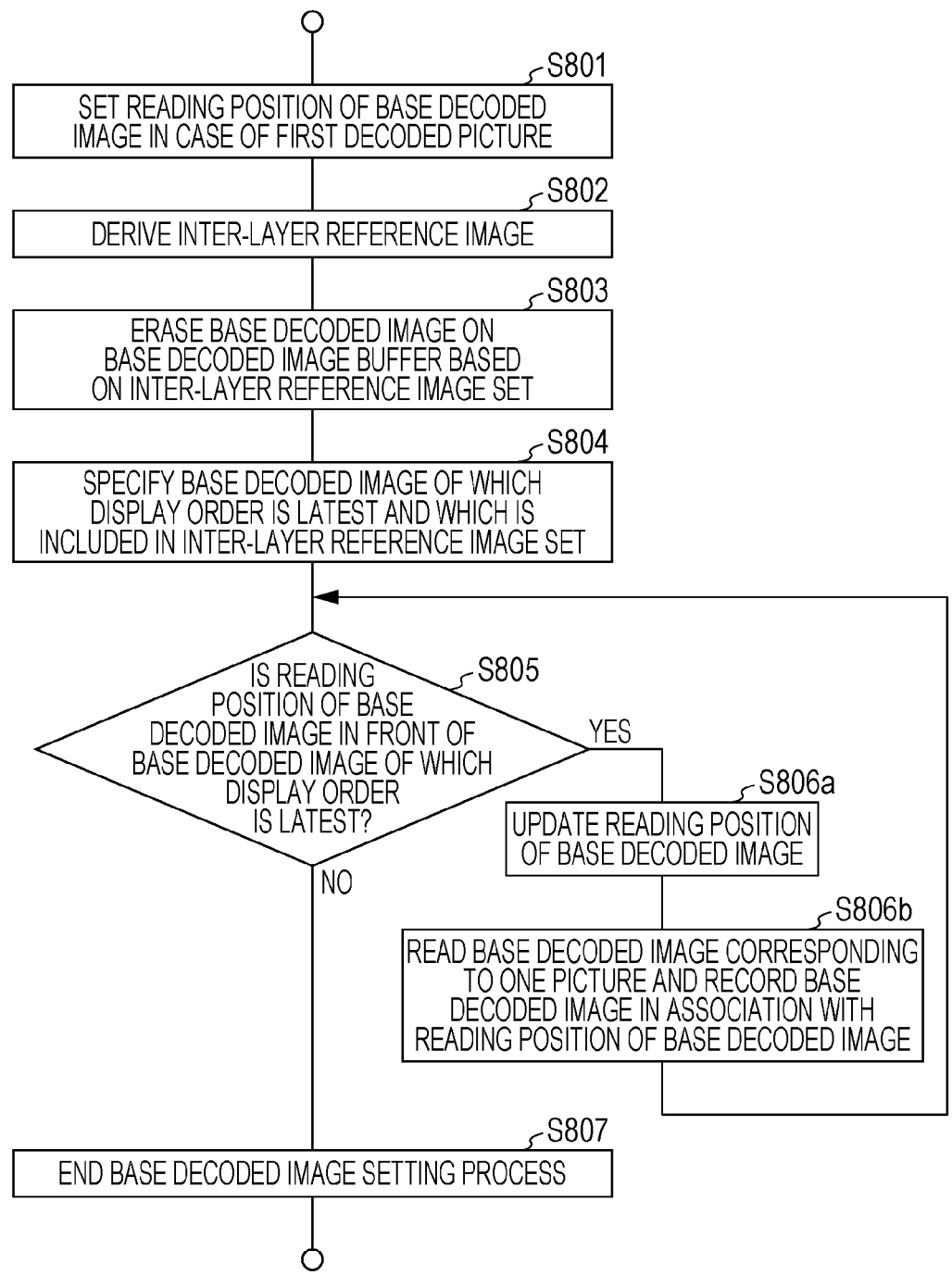
FIG. 26 is a flowchart illustrating a base decoded image setting process in a base control section of the hierarchical moving image decoding device at the time of the decoding of a specific picture on an enhancement layer.

Hereinafter, a process (base decoded image setting process) of setting the base decoded image in the base decoded image buffer 37 by the base control section 31 before decoding of the target picture on the target layer will be described with reference to FIG. 26. FIG. 26 is a flowchart illustrating the base decoded image setting process in the base control section 31 at the time of the decoding of a specific picture on the enhancement layer. The base decoded image setting process is performed in the order of the following S801 to S807.

(S801) When the target picture is the first decoded picture (for example, the case of the IDR picture), a value obtained by subtracting a predetermined value (a value added in the process of S806a to be described below) from the value of the POC of the target picture on the target layer (the enhancement layer) is set in a variable currBaseSeekPoc (picture position) indicating a reading position of the base decoded image.

(S802) The inter-layer reference image set in the target picture is derived from the parameter set. The derivation method described in the hierarchical moving image decoding device 1 can be used as the method of deriving the inter-layer reference image set.

(S803) It is determined whether each base decoded image recorded in the base decoded image buffer 37 is included in the inter-layer reference image set in the target picture derived in S802. When the POC of each base decoded image is included in the list of the POCs of the picture included in the inter-layer reference image set, it is determined that the base decoded image is included in the inter-layer reference image set. The base decoded image not included in the inter-layer reference image set among the base decoded images recorded in the base decoded image buffer 37 is erased from the base decoded image buffer 37. The base decoded image may not be necessarily erased instantly, and necessity to erase the base decoded image may be recorded and the base decoded image may be erased in practice at a proper timing.

(S804) The picture of the reference layer which is likely to be referred to at the time of the decoding of the target picture on the enhancement layer and which is most recent in the display order is specified from the inter-layer reference image set in the target picture, and the display order (POC) of a picture of the enhancement layer corresponding to the same display order as the picture is set in a variable maxBasePoc.

(S805) When the value of the picture position currBaseSeekPoc is less than the variable maxBasePoc, the process of S806a and S806b are repeatedly performed until the value of the variable currBaseSeekPoc is equal to the value of the variable maxBasePoc. Thereafter, the process proceeds to the process of S807.

(S806a) A predetermined value is added to the value of the picture position currBaseSeekPoc. The predetermined value to be added is decided from an interval of the POC between the pictures of the enhancement layer and a relation of a frame rate between the enhancement layer and the reference layer. When the interval of the POC between the pictures of the enhancement layer is Dep and the number of pictures of the enhancement layer corresponding to one picture of the reference layer indicated by a syntax base_framerate_factor_idc is Ne, a predetermined value Dbp to be added is set to a product of Ne and Dep.

(S806b) The base decoded images corresponding to one picture are read from the base decoded sequence and are recorded in the base decoded image buffer 37. At this time, the value of the variable currBaseSeekPoc is recorded as the value of the POC corresponding to the base decoded image in association with the base decoded image. The amount of data read from the base decoded sequence is decided based on the base control information (base_recon_luma_width, base_recon_luma_height, base_delta_bitdepth, and base_color_format_idc). For example, when the width of the base decoded image is Wb [pixel], the height is Hb [pixel], the bit depth is BDb [bit], and the color format is 4:2:0 according to the base control information, a data amount Rb to be read can be calculated by the following expression:

$$Rb = Wb \times Hb \times BDb \times 1.5 [\text{bit}].$$

(S807) The base decoded image setting process ends.

In the foregoing process, the process of S801 is an exception process performed to handle the beginning picture and may be substituted with another means. For example, only when the process of S801 is omitted and the target picture is not the first decoded picture in the process of S806a, a process of adding a predetermined value to the value of the picture position currBaseSeekPoc may be performed.

In the foregoing process of S806b, format conversion may be performed in accordance with the target picture when the base decoded images corresponding to one picture are read from the base decoded sequence and when the image size (BLI1), the bit depth (BLI2), the color format (BLI3) of the base decoded image included in the base control information (BLI) and the image size, the bit depth, and the color format of the target picture are different. Specifically, when the image size included in the base control information is less than the image size of the target picture, the upsampling is preferably performed.

<Specific Example of Base Decoded Image Setting Process>

Figure 27:
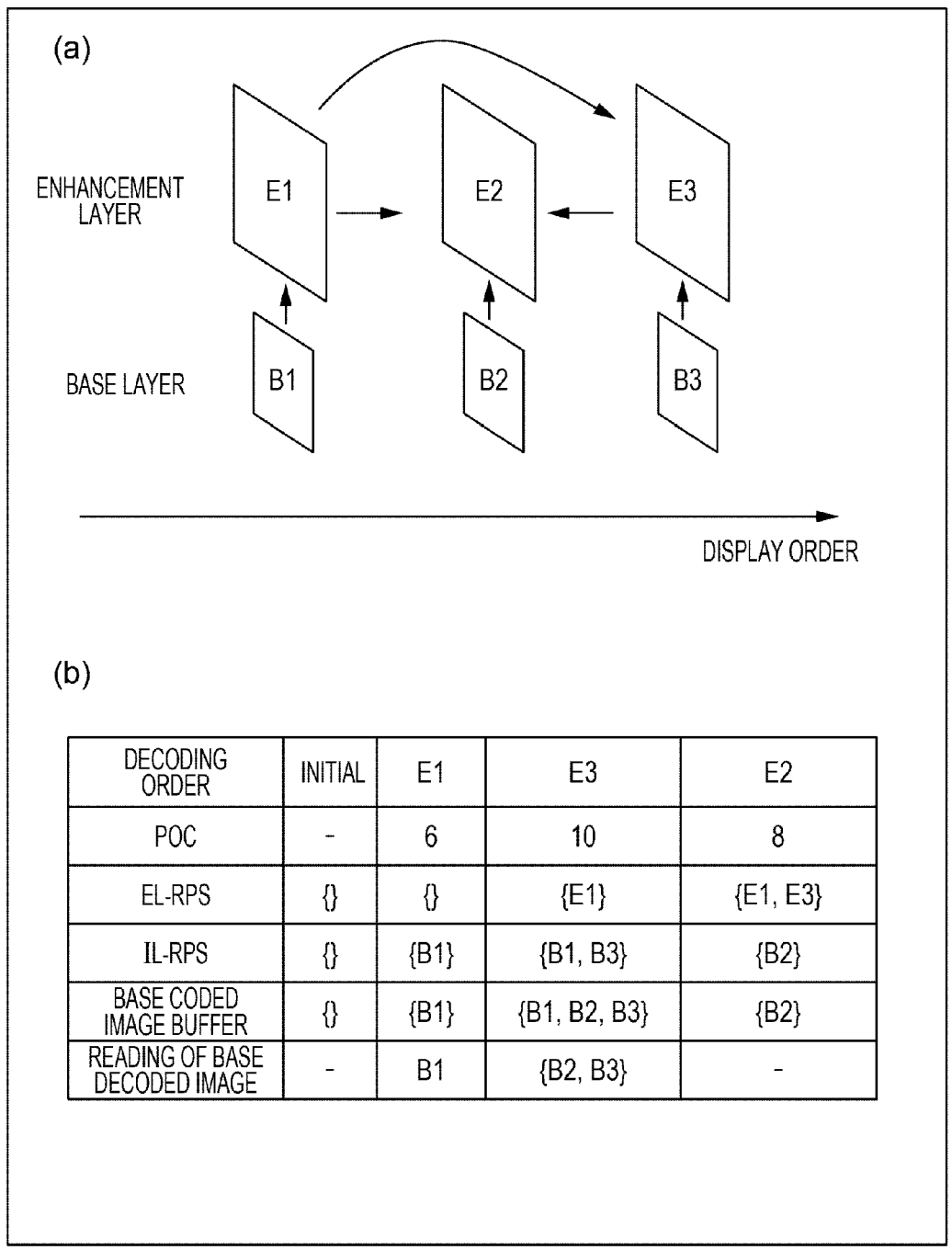
FIG. 27 is a diagram for describing a specific example of the base decoded image setting process, FIG. 27($a$) is a diagram illustrating a reference relation between pictures of the enhancement layer and a reference layer, and FIG. 27($b$) is a diagram illustrating a reference image set, an inter-layer reference image set, a base decoded image buffer, and reading of a base decoded image at the time of the decoding each picture of the enhancement layer.

Next, a specific example of the foregoing base decoded image setting process will be described with reference to FIG. 27. FIG. 27 is a diagram illustrating the specific example of the base decoded image setting process, FIG. 27(a) illustrates a relation between the pictures of the target layer (the enhancement layer) and the reference layer in the specific example, and FIG. 27(b) illustrates the reference image set, the inter-layer reference image set, the base decoded image buffer, and reading of the base decoded image at the time of the decoding of each picture of the enhancement layer.

As illustrated in FIG. 27(a), the pictures of E1, E2, and E3 are included in the output order in the enhancement layer. In the reference layer, the pictures of B1, B2, and B3 are included in the output order. Further, B1 is referred to from E1. E1, E3, and B2 are referred to from E2. E1 and B3 are referred to from E3. The decoded images of the reference layer are decoded by external means and the base decoded sequence is included in the output order.

The base decoded image setting process at the time of the decoding of each picture of the target layer (the enhancement layer) will be described with reference to FIG. 27(b). The values of 6, 8, and 10 are assumed to be allocated as the POC indicating the output order to E1, E2, and E3.

(1) initial: Before the decoding of the enhancement layer starts, the reference image set (EL-RPS), the inter-layer reference image set (IL-RPS), and the base decoded image buffer are all empty.

(2) the time of the decoding of E1: E1 is the first decoded picture of the enhancement layer and 4 obtained by subtracting a predetermined value of 2 from 6 which is the POC of E1 is set in the value of the variable currBaseSeekPoc. The predetermined value of 2 is a product of 1 (the number of pictures of the enhancement layer corresponding to one picture of the target layer) and 2 (the POC interval of the pictures of the higher layer (the enhancement layer)) (S801). B1 is included in the IL-RPS in E1 (S802). Since the base decoded image buffer is empty at this time, it is not necessary to erase the base decoded image (S803). The base decoded image with the most recent display order included in the IL-RPS is B1, and 6 which is the POC of the picture E1 of the enhancement layer which is the same display order as B1 is set in the variable maxBasePoc (S804). Since the value of the variable currBaseSeekPoc is 4 and is less than the value of 6 in the variable maxBasePoc, the base decoded image is read (S805). By adding the predetermined value of 2 to the value of the variable currBaseSeekPoc, the value of 6 is set (S806a). The base decoded image of B1 is read from the base decoded sequence and the value of 6 in the variable currBaseSeekPoc is recorded as the corresponding POC in the base decoded image buffer (S806b). Since the value of 6 in the currBaseSeekPoc is the same as the value of 6 in the variable maxBasePoc (S805), the base decoded image setting process at the time of the decoding of E1 ends (S807).

(3) the time of the decoding of E3: B1 and B3 are included in the IL-RPS in E3 (S802). The base decoded image buffer includes B1 at this time. Since B1 is included in the IL-RPS, B1 is not erased from the base decoded image buffer (S803). The base decoded image with the lastest display order included in the IL-RPS is B3, and 10 which is the POC of the picture E3 of the target layer (the enhancement layer) of which the display order is the same as B3 is set in the variable maxBasePoc (S804). Since the value of the variable currBaseSeekPoc is 6 and is less than the value of 10 in the variable maxBasePoc, the base decoded image is read (S805). By adding the predetermined value of 2 to the value of the variable currBaseSeekPoc, the value of 8 is set (S806a). The base decoded image of B2 is read from the base decoded sequence and the value of 8 in the variable currBaseSeekPoc is recorded as the corresponding POC in the base decoded image buffer (S806b). Since the value of 8 in the variable currBaseSeekPoc is less than the value of 10 in the variable maxBasePoc, the subsequent base decoded image is read (S805). By adding the predetermined value of 2 to the value of the variable currBaseSeekPoc, the value of 10 is set (S806a). The base decoded image of B3 is read from the base decoded sequence and the value of 10 in the variable currBaseSeekPoc is recorded as the corresponding POC in the base decoded image buffer (S806b). Since the value of 10 in the currBaseSeekPoc is the same as the value of 10 in the variable maxBasePoc (S805), the base decoded image setting process at the time of the decoding of E3 ends (S807).

(4) the time of the decoding of E2: B2 is included in the IL-RPS in E2 (S802). Since the base decoded image buffer includes B1, B2, and B3 and B1 and B3 are not included in the IL-RPS, the base decoded image is erased from the base decoded image buffer (S803). The base decoded image with the most recent display order included in the IL-RPS is B2, and 8 which is the POC of the picture E1 of the target layer (the enhancement layer) which is the same display order as B2 is set in the variable maxBasePoc (S804). Since the value of 10 in the variable currBaseSeekPoc is greater than the value of 8 in the variable maxBasePoc (S805), the base decoded image setting process at the time of the decoding of E3 ends (S807).

According to the foregoing base decoded image setting process, the base control section 31 can read the base decoded image necessary to decode the target picture on the target layer (the enhancement layer) from the base decoded sequence based on the base control information and the parameter set included in the SPS of the target layer supplied from the variable-length decoding section 32, and record the base decoded image in the base decoded image buffer 37. When the base control information or the parameter set is not used, it may not be determined how many pieces of data are read as the base decoded images from the base decoded sequence to be recorded in the base decoded image buffer 37 before the decoding of a specific picture on the target layer (the enhancement layer).

According to the foregoing order, the base control section 31 can erase the base decoded image unnecessary to decode the picture later than the target picture in the decoding order on the enhancement layer from the base decoded image buffer 37 at a proper timing based on the base control information and the parameter set supplied from the variable-length decoding section 32. Accordingly, since the unnecessary base decoded image does not remain in the base decoded image buffer 37, it is possible to reduce a buffer size necessary in the base decoded image buffer.

(Advantageous Effects of Moving Image Decoding Device 3)

The moving image decoding device 3 according to the above-described embodiment includes the base control section that reads the base decoded image from the base decoded image buffer based on the parameter set and the base control information included in the SPS of the target layer (the enhancement layer). Thus, it is possible to read the base decoded images of a proper amount of data from the input base decoded sequence and record the base decoded images in the base decoded image buffer.

According to the foregoing order, the base control section 31 sets the picture position currBaseSeekPoc set based on the POC of the target layer as the POC of the read base decoded image when the base decoded image is read from the base decoded sequence and is recorded in the base decoded image buffer 37. By setting the POC of the base layer decoded image based on the POC of the image of the enhancement layer, it is possible to specify the base decoded image included in the reference image set (the inter-layer reference image set) managed using the POC even when the POC indicating the output order (the display order) is not present in the base decoded image included in the base decoded sequence.

According to the foregoing order, the base control section 31 performs the format conversion according to the base control information (BLI). Specifically, when the image size of the base decoded image indicated by the base control information is less than the image size of the target picture, the upsampling is performed. By referring to the information regarding the base decoded image included in the base control information (BLI) included in the target layer coded data DATA#T, it is possible to change the image format of the base decoded image to the image format necessary to decode the target picture even in the case of a moving image decoding device which does not include the base decoding section therein and thus may not decode the reference layer coded data (the base coded data) included in the hierarchically coded data. Thus, even when the reference layer (the base layer) is not input as the coded data, the image format information of the base decoded image can be obtained, and thus the decoded image of the reference layer to which the format conversion of the upsampling is applied can be used as the base reference image at the time of the decoding of the target picture. When the base decoded images are input as the base decoded sequence, it is not necessary to perform the format conversion. Therefore, it is possible to prevent the size of the base decoded sequence from increasing due to the upsampling or the expansion of the bit depth.

Modification Example 2: Example in which Inter-Layer Reference Image Set is not Use In the description of the foregoing hierarchical moving image decoding device 3, the process of reading the base reference image from the base reference sequence by using the inter-layer reference picture and recording the base reference image in the base decoded image buffer has been described in the description of the base decoded image setting process by the base control section 31. However, the inter-layer reference set may not be necessarily used. Specifically, in S804 of the base decoded image setting process, the picture which is the picture of the reference layer likely to be referred to at the time of the decoding of the target picture on the enhancement layer from the inter-layer reference image set in the target picture and which is the picture with the most recent display order has been specified and set in the display order (POC) of the pictures of the enhancement layer corresponding to the same display order as the picture in the variable maxBasePoc. However, this information may be included directly in the parameter set (for example, the slice header or the PPS) associated with the target picture. That is, the information indicating the display order of the picture which is the picture of the reference layer likely to be referred to at the time of the decoding of the target picture on the enhancement layer and which is the picture with the most recent display order may be included in the parameter set. Here, the information indicating the display order is, for example, the absolute value of the display order, a difference of the target picture with respect to the display order, or a display time. Not the information regarding to the display order but the number of base decoded images to be read may be included directly in the parameter set.

As described in the hierarchical moving image decoding device 1, the inter-layer reference image set is effective when the base reference image likely to be used for the inter-layer image prediction is designated. Therefore, when the inter-layer reference image set is used in the inter-layer image prediction, there is the advantage that it is not necessary to transmit additional information by performing the base decoded image setting process by using the inter-layer reference image set.

Hierarchical Moving Image Coding Device (Second Embodiment)

Figure 28:
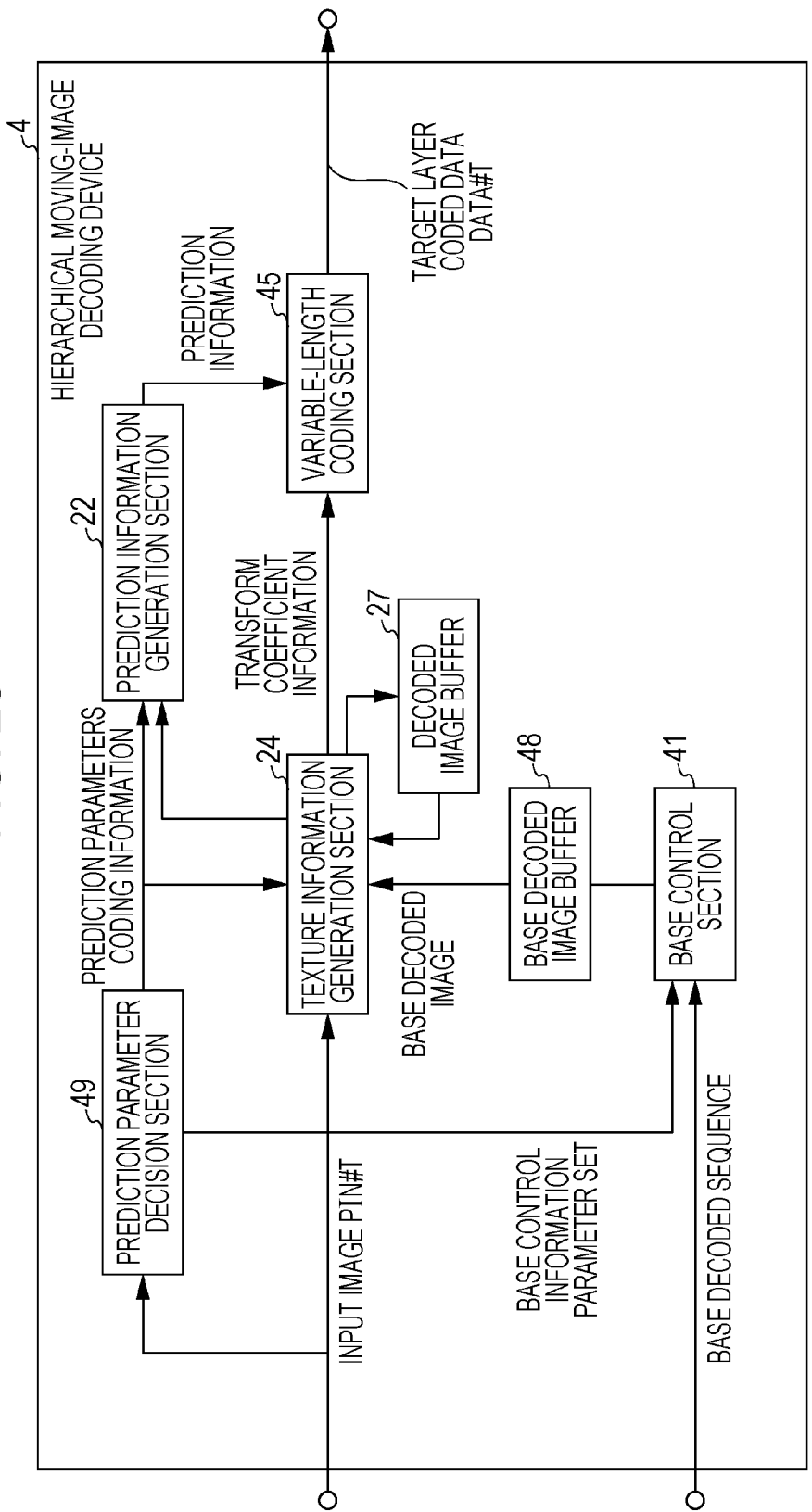
FIG. 28 is a functional block diagram illustrating a schematic configuration of a hierarchical moving image coding device according to still another embodiment of the present invention.

Hereinafter, the configuration of the hierarchical moving image coding device 4 according to the embodiment will be described with reference to FIG. 28. FIG. 28 is a functional block diagram illustrating the schematic configuration of the hierarchical moving image coding device 4. When the base decoded sequence and the input image PIN#T of the target layer are input, the hierarchical moving image coding device 4 outputs the target layer coded DATA#T.

As illustrated in FIG. 28, the hierarchical moving image coding device 4 includes a base control section 41, a variable-length coding section 45, a decoded image buffer 27, a prediction parameter decision section 49, a prediction information generation section 22, a texture information generation section 24, and a base decoded image buffer 48.

The target layer coded DATA#T generated by the hierarchical moving image coding device 4 is input to the above-described hierarchical moving image decoding device 3 in conjunction with the base decoded sequence input at the time of the generation, so that the decoded image of the target layer can be reproduced.

Of the constituent elements of the hierarchical moving image coding device 4, the prediction information generation section 22, the texture information generation section 24, and the decoded image buffer 27 have the same functions as the constituent elements with the same names as the hierarchical moving image coding device 2. Therefore, the same reference numerals are given and the description thereof will be omitted.

The base decoded image buffer 48 is a constituent element corresponding to the base decoded image buffer 37 in the hierarchical moving image decoding device 3, and is a buffer that retains the base decoded image input from the outside in association with the display order (POC) of the picture in the enhancement layer. In the base decoded image buffer 48, it is necessary to record at least the base decoded image used to generate the predicted image in the texture generation section 24 when the target picture in the target layer is coded.

The prediction parameter decision section 49 has not only the function of the prediction parameter decision section 21 but also a function of deriving the base control information. As the base control information, the same information as the base control information described in the variable-length decoding section 32 of the hierarchical moving image decoding device 3 can be used. The base control information is input as a coding control parameter from the outside (not illustrated).

The base control section 41 is a constituent element corresponding to the base control section 31 of the hierarchical moving image decoding device 3. The base control section 41 sets the input base decoded sequence at a proper position of the base decoded image buffer 48 based on the base control information and the parameter set input from the prediction parameter decision section 49. The unnecessary base decoded image is erased from the base decoded image buffer 48 at a proper timing.

In the base control section 41, the base decoded image can be read to the base decoded image buffer at the time of the coding of a specific picture of the target layer and the base decoded image can be erased from the base decoded image buffer by applying the same base decoded image setting process as the base decoded image setting process in the base control section 31 of the hierarchical moving image decoding device 3. Specifically, the base decoded image setting process in the base control section 31 of the hierarchical moving image decoding device 3 described with reference to FIG. 26 may be performed by substituting "the time of the decoding" with the "time of the coding" and substituting "the base decoded image buffer 37" with "the base decoded image buffer 48".

In the foregoing the base decoded image setting process, the base control section 41 can read the base decoded image necessary to decode the target picture on the target layer (the enhancement layer) from the base decoded sequence based on the base control information and the parameter set included in the SPS of the target layer (the enhancement layer) supplied from the prediction parameter decision section 49, and can record the base decoded image in the base decoded image buffer 48. When the base control information or the parameter set is not used, it may not be determined how many pieces of data are read as the base decoded images from the base decoded sequence to be recorded in the base decoded image buffer 48 before the coding of a specific picture on the target layer (the enhancement layer).

According to the foregoing order, the base control section 41 can erase the base decoded image unnecessary to decode the picture later than the target picture in the coding order on the enhancement layer from the base decoded image buffer 48 at a proper timing based on the base control information and the parameter set supplied from the prediction parameter decision section 49. Accordingly, since the unnecessary base decoded image does not remain in the base decoded image buffer 48, it is possible to reduce a buffer size necessary in the base decoded image buffer.

(Advantageous Effects of Moving Image Coding Device 4)

The moving image coding device 4 according to the above-described embodiment includes the base control section that reads the base decoded image from the base decoded image buffer based on the parameter set and the base control information included in the SPS of the target layer (the enhancement layer). Thus, it is possible to read the base decoded images of a proper amount of data from the input base decoded sequence and record the base decoded images in the base decoded image buffer.

[Supplementary 1: Application to Use Other than Inter-Layer Image Prediction]

In the description of the foregoing hierarchical moving image decoding devices (the hierarchical moving image decoding device 1 and the hierarchical moving image decoding device 3) and the hierarchical moving image coding devices (the hierarchical moving image coding device 2 and the hierarchical moving image coding device 4), it has been described that the base decoded image recorded in the base decoded image buffer is used as the base reference image for the inter-layer image prediction, but the use of the base decoded image is not limited thereto. The present invention can also be applied even when the base decoded image is used to decode or code the picture on the target layer (the enhancement layer). For example, in a scheme called generalization residual prediction in which a prediction residual of a target picture is estimated from a plurality of base decoded images in a target layer, the inter-layer reference image set described in the present invention can be used to specify the base decoded images likely to be used as the plurality of base decoded images. Further, a scheme of estimating motion vectors of a target picture from a plurality of base decoded images, the inter-layer reference image set described in the present invention can be used to specify the base decoded image likely to be used as the plurality of base decoded images.

[Supplementary 2: Application to Hierarchical Coding of Two or More Layers]

In the description of the foregoing hierarchical moving image decoding devices (the hierarchical moving image decoding device 1 and the hierarchical moving image decoding device 3) and the hierarchical moving image coding devices (the hierarchical moving image coding device 2 and the hierarchical moving image coding device 4), the examples of the two layers, the target layer and the reference layer (the base layer), has been described, but the present invention can be applied even when three or more layers are used. When the hierarchical coding of three or more layers is performed, a configuration is also assumed in which two or more reference layers are set for the target layer, and the coding and the decoding of the target layer is performed by using the decoded image of each reference layer. Even in this case, the control of the base decoded image buffer using the inter-layer reference image set described in the present invention may be effective and the inter-layer reference image set may be set for each of the two reference layers.

(Examples of Application to Other Hierarchical Moving Image Coding/Decoding Systems)

The hierarchical moving image coding device 2 and the hierarchical moving image decoding device 1 described above can be mounted on various apparatuses transmitting, receiving, recording, and reproducing a moving image for use. The moving image may be a natural moving image captured by a camera or the like or may be an artificial moving image (including a CG and a GUI) created by a computer or the like.

Figure 29:
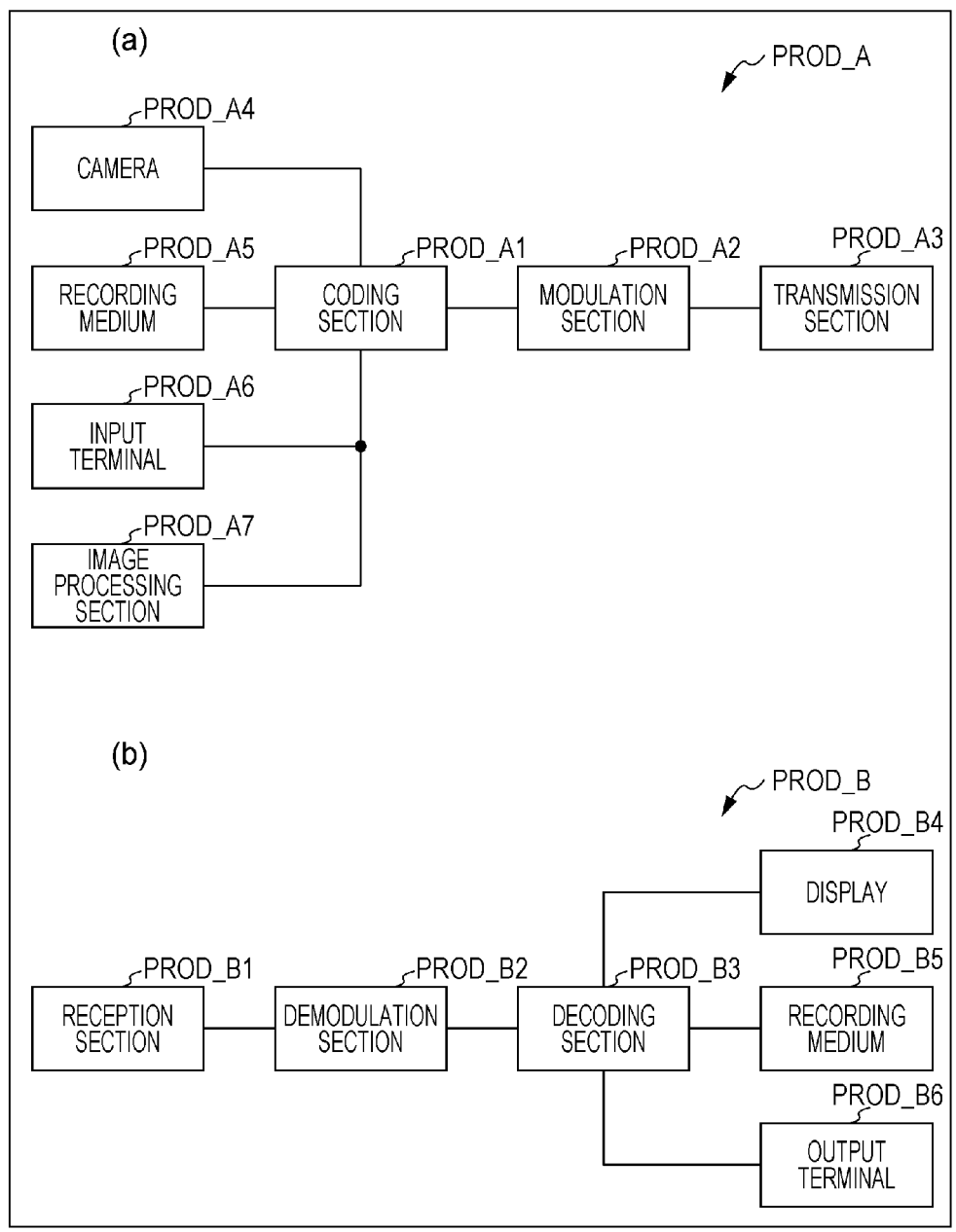
FIG. 29 is a diagram illustrating the configuration of a transmission apparatus on which the hierarchical moving image coding device is mounted and the configuration of a reception apparatus on which the hierarchical moving image decoding device is mounted, FIG. 29($a$) illustrates the transmission apparatus on which the hierarchical moving image coding device is mounted, and FIG. 29($b$) illustrates the reception apparatus on which the hierarchical moving image decoding device is mounted.

First, the fact that the hierarchical moving image coding device 2 and the hierarchical moving image decoding device 1 described above can be used to transmit and receive a moving image will be described with reference to FIG. 29. FIG. 29(*a*) is a block diagram illustrating the configuration of a transmission apparatus PROD_A on which the hierarchical moving image coding device 2 is mounted.

As illustrated in FIG. 29(a), a transmission apparatus PROD_A includes a coding section PROD_A1 that obtains coded data by coding a moving image, a modulation section PROD_A2 and that obtains a modulation signal by modulating carrier waves using the coded data obtained by the coding section PROD_A1, and a transmission section PROD_A3 that transmits the modulation signal obtained by the modulation section PROD_A2. The above-described hierarchical moving image coding device 2 is used as the coding section PROD_A1.

The transmission apparatus PROD_A may further include a camera PROD_A4 that captures a moving image as a supply source of a moving image input to the coding section PROD_A1, a recording medium PROD_A5 that records the moving image, an input terminal PROD_A6 that inputs the moving image from the outside, and an image processing section A7 that generates or processes an image. In FIG. 29(a), the configuration of the transmission apparatus PROD_A including all of the sections is exemplified, but some of the sections may be omitted.

The recording medium PROD_A5 may be a recording medium that records an uncoded moving image or may be a recording medium that records a moving image coded according to a coding scheme for recording different from a coding scheme for transmission. In the latter case, a decoding section (not illustrated) that decodes coded data read from the recoding medium PROD_A5 according to the coding scheme for recording may be interposed between the recording medium PROD_A5 and the coding section PROD_A1.

FIG. 29(b) is a block diagram illustrating a reception apparatus PROD_B on which the hierarchical moving image decoding device 1 is mounted. As illustrated in FIG. 29(b), the reception apparatus PROD_B includes a reception section PROD_B1 that receives a modulated signal, a demodulation section PROD_B2 that obtains coded data by demodulating the modulated signal received by the reception section PROD_B1, and a decoding section PROD_B3 that obtains a moving image by decoding the coded data obtained by the demodulation section PROD_B2. The above-described hierarchical moving image decoding device 1 is used as the decoding section PROD_B3.

The reception apparatus PROD_B may further include a display PROD_B4 that displays the moving image as a supply destination of the moving image output by the decoding section PROD_B3 a recording medium PROD_B5 that records the moving image, and an output terminal PROD_B6 that outputs the moving image to the outside. In FIG. 29(b), the configuration of the reception device PROD_B including all of these sections is exemplified, but some of the sections may be omitted.

The recording medium PROD_B5 may be a recording medium that records an uncoded moving image or may be a recording medium that records a moving image coded according to a coding scheme for recording different from a coding scheme for transmission. In the latter case, a coding section (not illustrated) that codes the moving image acquired from the decoding section PROD_B3 according to the coding scheme for recording may be interposed between the decoding section PROD_B3 and the recording medium PROD_B5.

A transmission medium through which a modulated signal is transmitted may be a wireless medium or a wired medium. A transmission form in which a modulated signal is transmitted may be broadcasting (here, a transmission form in which a transmission designation is not specified in advance) or may be communication (here, a transmission form in which a transmission destination is specified in advance). That is, the transmission of the modulated signal may be realized by any one of wireless broadcasting, wired broadcasting, wireless communication, and wired communication.

For example, a broadcast station (broadcast equipment or the like)/reception station (a television receiver or the like) for terrestrial digital broadcasting is an example of the transmission apparatus PROD_A/reception apparatus PROD_B transmitting or receiving a modulated signal by wireless broadcasting. Further, a broadcast station (broadcast equipment or the like)/reception station (television receiver or the like) for cable television broadcasting is an example of the transmission apparatus PROD_A/reception apparatus PROD_B transmitting or receiving a modulated signal by wired broadcasting.

A server (a workstation or the like)/client (a television receiver, a personal computer, a smartphone, or the like) for a Video On Demand (VOD) service in which the Internet is used, a moving image sharing service, or the like is an example of the transmission apparatus PROD_A/reception apparatus PROD_B transmitting or receiving a modulated signal by communication (typically, one of wireless and wired media is used as a transmission medium in a LAN and a wired medium is used as a transmission medium in a WAN). Here, the personal computer includes a desktop PC, a laptop PC, and a tablet PC. The smartphone also includes a multi-function portable phone terminal.

The client for the moving image sharing service has not only a function of decoding coded data downloaded from the server and displays the coded data on a display but also a function of coding a moving image captured by a camera and uploading the coded moving image to the server. That is, the client for the moving image sharing service functions as both of the transmission apparatus PROD_A and the reception apparatus PROD_B.

Figure 30:
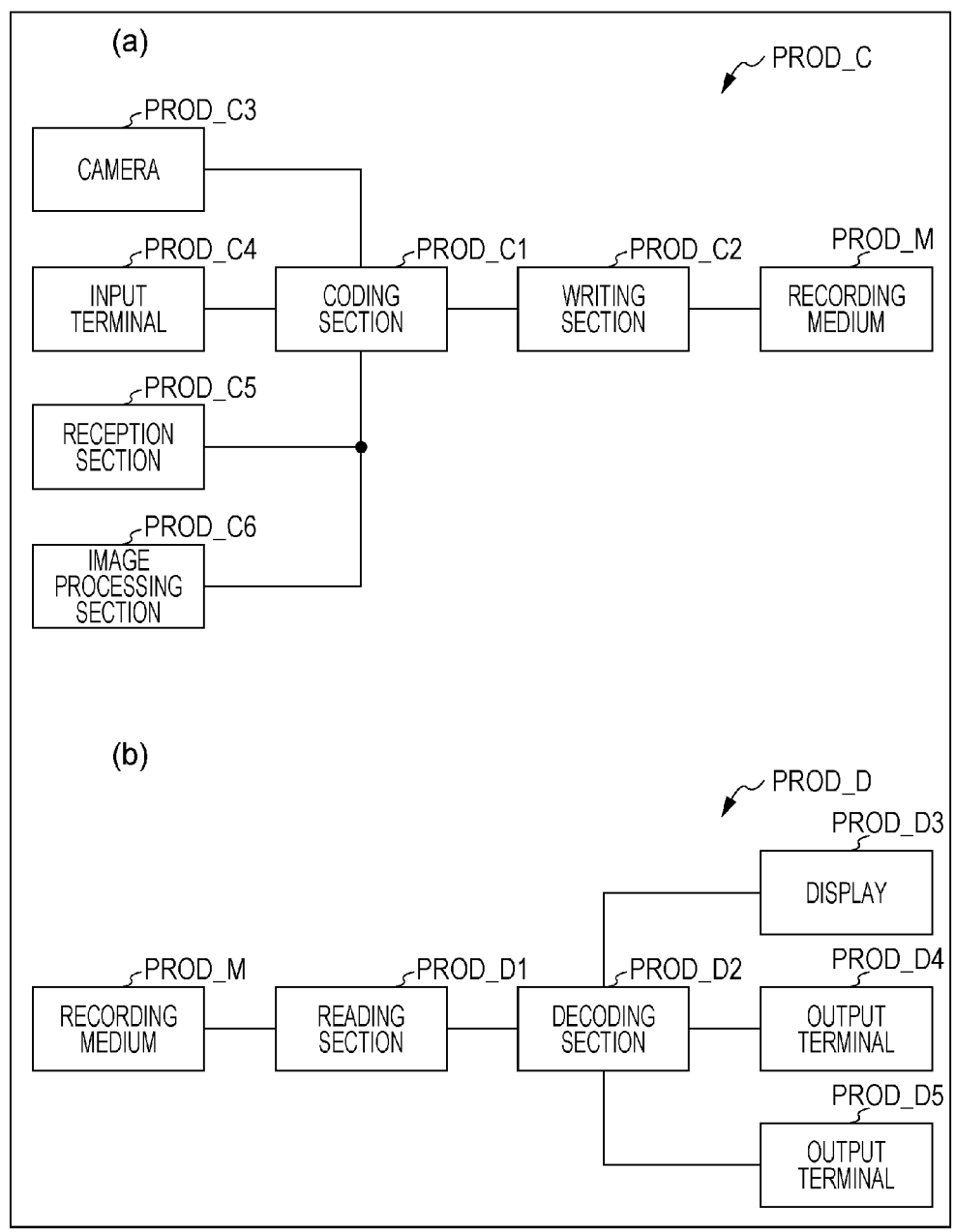
FIG. 30 is a diagram illustrating the configuration of a recording apparatus on which the hierarchical moving image coding device is mounted and the configuration of a reproduction apparatus on which the hierarchical moving image decoding device is mounted, FIG. 30($a$) illustrates the recording apparatus on which the hierarchical moving image coding device is mounted, and FIG. 30($b$) illustrates the reproduction apparatus on which the hierarchical moving image decoding device is mounted.

The fact that the hierarchical moving image coding device 2 and the hierarchical moving image decoding device 1 described above can be used to record and reproduce a moving image will be described with reference to FIG. 30. FIG. 30(a) is a block diagram illustrating the configuration of a recording apparatus PROD_C on which the above-described hierarchical moving image coding device 2 is mounted.

As illustrated in FIG. 30(a), the recording apparatus PROD_C includes a coding section PROD_C1 that obtains coded data by coding a moving image and a writing section PROD_C2 that writes the coded data obtained by the coding section PROD_C1 on a recording medium PROD_M. The above-described hierarchical moving image coding device 2 is used as the coding section PROD_C1.

The recording medium PROD_M may be (1) a type of medium that is included in the recording apparatus PROD_C, such as a hard disk drive (HDD) or a solid state drive (SSD), may be (2) a type of medium that is connected to the recording apparatus PROD_C, such as an SD memory card or a Universal Serial Bus (USB) flash memory, or may be (3) a medium that is loaded on a drive device (not illustrated) included in the recording apparatus PROD_C, such as a Digital Versatile Disc (DVD) or a Blu-ray (registered trademark) disc (BD).

The recording apparatus PROD_C may further include a camera PROD_C3 that captures a moving image as a supply source of a moving image to be input to the coding section PROD_C1, an input terminal PROD_C4 that inputs a moving image from the outside, a reception section PROD_C5 that receives a moving image, and an image processing section C6 that generates or processes an image. In FIG. 30(a), the configuration of the recording apparatus PROD_C including all of the sections is exemplified, but some of the sections may be omitted.

The reception section PROD_C5 may be a reception section that receives an uncoded moving image or may be a reception section that receives coded data coded according to a coding scheme for transmission different from a coding scheme for recording. In the latter case, a decoding section (not illustrated) for transmission that decodes the coded data coded according to the coding scheme for transmission may be interposed between the reception section PROD_C5 and the coding section PROD_C1.

As the recording apparatus PROD_C, for example, a DVD recorder, a BD recorder, and a Hard Disk Drive (HDD) recorder can be exemplified (in this case, the input terminal PROD_C4 or the reception PROD_C5 is a main supply source of a moving image). A camcorder (in this case, the camera PROD_C3 is a main supply source of a moving image), a personal computer (in this case, the reception section PROD_C5 or the image processing section C6 is a main supply source of a moving image), a smartphone (in this case, the camera PROD_C3 or the reception section PROD_C5 serves a main supply source of a moving image), and the like are also examples of the recording apparatus PROD_C.

FIG. 30(b) is a block diagram illustrating the configuration of a reproduction apparatus PROD_D on which the above-described hierarchical moving image decoding device 1 is mounted. As illustrated in FIG. 30(b), the reproduction apparatus PROD_D includes a reading section PROD_D1 that reads coded data written on a recording medium PROD_M and a decoding section PROD_D2 that obtains a moving image by decoding the coded data read by the reading section PROD_D1. The above-described hierarchical moving image decoding device 1 is used as the decoding section PROD_D2.

The recording medium PROD_M may be (1) a type of medium that is included in the reproduction apparatus PROD_D, such as an HDD or an SSD, may be (2) a type of medium that is connected to the reproduction apparatus PROD_D, such as an SD memory card or a USB flash memory, or may be (3) a medium that is loaded on a drive device (not illustrated) included in the reproduction apparatus PROD_D, such as a DVD or a BD.

The reproduction apparatus PROD_D may further includes a display PROD_D3 that displays a moving image as a supply destination of the moving image output by the decoding section PROD_D2, an output terminal PROD_D4 that outputs the moving image to the outside, and a transmission section PROD_D5 that transmits the moving image. In FIG. 30(b), the configuration of the reproduction apparatus PROD_D including all of the sections is exemplified, but some of the sections may be omitted.

The transmission section PROD_D5 may be a transmission section that transmits an uncoded moving image or may be a transmission section that transmits the coded data coded according to a coding scheme for transmission different from a coding scheme for recording. In the latter case, a coding section (not illustrated) that codes a moving image according to the coding scheme for transmission may be interposed between the decoding section PROD_D2 and the transmission section PROD_D5.

As the reproduction apparatus PROD_D, for example, a DVD player, a BD player, and an HDD player can be exemplified (in this case, the output terminal PROD_D4 connected to a television receiver or the like is a main supply destination of a moving image). A television receiver (in this case, the display PROD_D3 is a main supply destination of a moving image), a digital signage (which is also referred to as an electronic signboard or an electronic bulletin board and the display PROD_D3 or the transmission section PROD_D5 is a main supply destination of a moving image), a desktop PC (in this case, the output terminal PROD_D4 or the transmission section PROD_D5 is a main supply destination of a moving image), a laptop or tablet PC (in this case, the display PROD_D3 or the transmission section PROD_D5 is a main supply destination of a moving image), a smartphone (in this case, the display PROD_D3 or the transmission section PROD_D5 is a main supply destination of a moving image), and the like are examples of the reproduction apparatus PROD_D.

(Hardware Realization and Software Realization)

Finally, each block of the hierarchical moving image decoding device 1 and the hierarchical moving image coding device 2 may be realized by hardware such as a logical circuit formed on an integrated circuit (IC chip) or may be realized by software using a central processing unit (CPU).

In the latter case, each of the foregoing devices includes a CPU that executes a command of a control program realizing each function, a read-only memory (ROM) that stores the program, a random access memory (RAM) on which the program is loaded, and a storage device (recording medium) such as a memory that stores the program and various kinds of data. An object of the present invention can also be achieved by providing each of the foregoing devices with a recording medium that records a program code (an execution format program, an intermediate code program, or a source program) of a control program of each of the foregoing devices which is software realizing the above-described functions in a computer-readable manner and by causing a computer (a CPU or an MPU (Micro Processing Unit)) to read and execute the program code recorded on the recording medium.

As the recording medium, for example, a kind of tape such as a magnetic tape or a cassette tape, a kind of disc including a magnetic disk such as floppy (registered trademark) disk/hard disk and an optical disc such as Compact Disc Read-Only Memory (CD-ROM)/Magneto-Optical Disc (MO discs)/Mini Disc (MD)/Digital Versatile Disk (DVD)/CD Recordable (CD-R), a kind of card such as an IC card (including a memory card)/optical card, a kind of semiconductor memory such as mask ROM/Erasable Programmable Read-Only Memory (EPROM)/Electrically Erasable and Programmable Read-Only Memory (EEPROM) (registered trademark)/flash ROM, or a kind of logical circuit such as a Programmable Logic device (PLD) or a Field Programmable Gate Array (FPGA) can be used.

Each of the foregoing devices may be configured to be connected to a communication network and the program code may be supplied via the communication network. The communication network may be able to transmit the program code and is not particularly limited. For example, the Internet, an intra-net, an extra-net, a Local Area Network (LAN), an Integrated Services Digital Network (ISDN), a Value-Added Network (VAN), a Community Antenna Television (CATV) communication network, a virtual private network, a telephone circuit network, a mobile communication network, or a satellite communication network can be used. A transmission medium configuring the communication network may be a medium capable of transmitting the program code and is not particularly limited to a specific configuration or a kind of medium. For example, a wired medium such as Institute of Electrical and Electronic Engineers (IEEE) 1394, a USB, power line broadcasting, a cable TV circuit line, a telephone line, or an Asymmetric Digital Subscriber Line (ADSL) circuit, an infrared medium such as Infrared Data Association (IrDA) or a remote controller, or a wireless medium such as Bluetooth (registered trademark), IEEE 802.11 wireless, High Data Rate (HDR), Near Field Communication (NFC), Digital Living Network Alliance (DLNA), a portable telephone network, a satellite circuit, or a terrestrial digital network can be used. The present invention can also be realized in a form of a computer data signal in which the program code is embodied through electronic transmission and is embedded in a carrier wave.

The present invention is not limited to the above-described embodiments, but may be modified in various forms within the scope indicated by the claims. Embodiments obtained by properly combining technical means disclosed in different embodiments are also included in the technical scope of the present invention.

INDUSTRIAL APPLICABILITY

The present invention can be properly applied to a hierarchical moving image decoding device decoding coded data in which the image data is hierarchically coded and a hierarchical moving image coding device generating the coded data in which the image data is hierarchically coded. Further, the present invention can be properly applied to a data structure of coded data generated by the hierarchical moving image coding device and referred to by the hierarchical moving image decoding device.

REFERENCE SIGNS LIST 1, 3 hierarchical moving image decoding device (image decoding device)
11 NAL demultiplexing section
12, 32 variable-length decoding section (variable-length decoding means)
13, 27 decoded image buffer
14 prediction parameter restoration section
15 texture restoration section
151 inverse orthogonal transform and inverse quantization section
152 texture prediction section (predicted image generation means)
152T inter-prediction section
152S intra-prediction section
152B inter-layer image prediction section (inter-layer image prediction means)
154 loop filter section
155 reference image list setting section
156 inter-layer reference image list setting section
16, 23 base decoding section
161 variable-length decoding section
162 base prediction parameter restoration section
163 base transform coefficient restoration section
164 base texture restoration section
17, 28 base decoded image buffer
2 hierarchical moving image coding device (image coding device)
21 prediction parameter decision section (prediction parameter decision means)
22 prediction information generation section
24 texture information generation section
25 variable-length coding section
26 NAL multiplexing section
31, 41 base control section (base control means)
37, 48 base decoded image buffer

The invention claimed is:

1. An image decoding device that restores a decoded image of a higher layer using coded data of the higher layer included in coded data that is hierarchically coded, the image decoding device comprising:
a variable-length decoding circuit that decodes a parameter set from the coded data of the higher layer;
a base decoded image buffer that retains a decoded image of a lower layer, wherein a picture display order of the decoded image of the lower layer is as same as a picture display order of a picture of the higher layer derived from the parameter set;
a base control circuit that inputs an image decoded by an external device in the base decoded image buffer; and
an inter-layer image prediction circuit that generates a predicted image through inter-layer prediction using a decoded image of the lower layer.

2. An image coding device that generates coded data of a higher layer from an input image, the image coding device comprising:
a variable-length coding circuit that codes a parameter set included in the coded data of the higher layer;
a base decoded image buffer that retains a decoded image of a lower layer, wherein a picture display order of the decoded image of the lower layer is as same as a picture display order of a picture of the higher layer derived from the parameter set;
a base control circuit that inputs images decoded by an external device in the base decoded image buffer; and
an inter-layer image prediction section that generates a predicted image through inter-layer prediction using a decoded image of the lower layer.

* * * * *